(12) United States Patent
Nakae et al.

(10) Patent No.: US 7,958,549 B2
(45) Date of Patent: *Jun. 7, 2011

(54) ATTACK DEFENDING SYSTEM AND ATTACK DEFENDING METHOD

(75) Inventors: Masayuki Nakae, Tokyo (JP); Masaya Yamagata, Tokyo (JP)

(73) Assignee: NEC Corporation, Tokyo (JP)

( * ) Notice: Subject to any disclaimer, the term of this patent is extended or adjusted under 35 U.S.C. 154(b) by 915 days.

This patent is subject to a terminal disclaimer.

(21) Appl. No.: 11/782,801

(22) Filed: Jul. 25, 2007

(65) Prior Publication Data

US 2008/0282339 A1 Nov. 13, 2008

Related U.S. Application Data

(62) Division of application No. 10/643,864, filed on Aug. 20, 2003, now Pat. No. 7,464,407.

(30) Foreign Application Priority Data

| Aug. 20, 2002 | (JP) | 2002-238989 |
| Mar. 19, 2003 | (JP) | 2003-074781 |
| Aug. 19, 2003 | (JP) | 2003-295020 |

(51) Int. Cl.
*G06F 9/00* (2006.01)
*G06F 15/16* (2006.01)
(52) U.S. Cl. ............... 726/11; 726/13; 726/21
(58) Field of Classification Search ............ 726/11, 726/13, 21

See application file for complete search history.

(56) References Cited

U.S. PATENT DOCUMENTS

| 7,010,698 B2 * | 3/2006 | Sheymov | 713/194 |
| 7,272,625 B1 * | 9/2007 | Hannel et al. | 709/200 |
| 2002/0166063 A1 * | 11/2002 | Lachman et al. | 713/200 |

FOREIGN PATENT DOCUMENTS

| JP | 60-110001 | 6/1985 |
| JP | 07-306794 | 11/1995 |
| JP | 844642 | 2/1996 |
| JP | 09-204385 | 8/1997 |

(Continued)

OTHER PUBLICATIONS

Takada et al., 98-CSEC-1-9, Concerning the System Log Collection Function Which Considers Inappropriate Access, Information Processing Academic Research Report, May 29, 1998, vol. 98, No. 54, pp. 47-52.

(Continued)

*Primary Examiner* — Christopher J Brown
(74) *Attorney, Agent, or Firm* — Young & Thompson

(57) ABSTRACT

An attack defending system allows effective defense against attacks from external networks even when a communication system uses a communication path encryption technique such as SSL. A firewall device and a decoy device are provided. The firewall device refers to the header of an input IP packet and, when it is determined that the input IP packet is suspicious, it is guided into the decoy device. The decoy device monitors a process providing a service to detect the presence or absence of attacks. When an attack has been detected, an alert including the attack-source IP address is sent to the firewall device so as to reject subsequent packets from attack source.

66 Claims, 55 Drawing Sheets

FOREIGN PATENT DOCUMENTS

| | | |
|---|---|---|
| JP | 9224053 | 8/1997 |
| JP | 10-164064 | 6/1998 |
| JP | 2000-261483 | 9/2000 |
| JP | 2000261483 | 9/2000 |
| JP | 2000-354034 | 12/2000 |
| JP | 2001-057554 | 2/2001 |
| JP | 2001350678 | 12/2001 |
| JP | 2002-152281 | 5/2002 |
| JP | 2003173300 | 6/2003 |
| JP | 2003-258910 | 9/2003 |
| JP | 2003264595 | 9/2003 |
| JP | 2003-309607 | 10/2003 |
| JP | 2003-531430 | 10/2003 |
| JP | 2004-507978 | 3/2004 |
| JP | 2004229091 | 7/2007 |
| WO | 01/80480 | 10/2001 |
| WO | WO 01/84285 | 11/2001 |
| WO | 02/19661 | 3/2002 |

OTHER PUBLICATIONS

Asaka et al., "Remote Attack Detection Method in IDA: MLSI-Based Intrusion Detection with Discriminant Analysis", Electronic Information Communication Academic Treatise Journal (J85-B), Jan. 1, 2002, No. 1, pp. 60-74.

Andou et al., "Increasing Security with Free Software", Nikkei Internet Technology, May 22, 1999, No. 23, pp. 125-143.

Taguchi et al., 6G-4, Investigation of the Log Collection Function which Focused on Traces, $57^{th}$ ($2^{nd}$ half of 1998), National Symposium Treatise Collection (3), Oct. 7, 1998, pp. 3-514 to 3-515.

Japanese Patent Office issued a Japanese Office Action dated Jan. 19, 2010, Application No. 2007-179436.

Japanese Patent Office issued a Japanese Office Action dated Aug. 26, 2009, Application No. 2007-179436.

Japanese Patent Office issued a Japanese Office Action dated Jun. 17, 2009, Application No. 2007-179435.

* cited by examiner

1021

ACCESS CONTROL LIST DATABASE

| SOURCE IP ADDRESS (SRC) | DESTINATION IP ADDRESS (DST) | PACKET FILTERING PROCESS (PROC) |
|---|---|---|
| * | 1.2.3.1 | ACCEPT |
| * | 1.2.3.2 | ACCEPT |
| 12.34.1.1 | * | ACCEPT |
| * | 1.2.3.3 | DROP |
| * | * | DENY |

* : MATCHED WITH ARBITRARY ADDRESS
ACCEPT : ACCEPTANCE OF PACKET
DENY : DENIAL OF PACKET (WITH ICMP ERROR NOTIFICATION)
DROP : DROPPING OF PACKET (WITHOUT ICMP ERROR NOTIFICATION)

GUIDING LIST

| DEFENSE RULE DETERMINATION SECTION | | | |
|---|---|---|---|
| ATTACK TYPE | SOURCE IP ADDRESS (SRC) | DESTINATION IP ADDRESS (DST) | PACKET FILTERING PROCESS (PROC) |
| RECON | — | — | — |
| INTRUSION | ${SRC_IP_ADDRESS} | * | DROP |
| DESTRUCTION | ${SRC_IP_ADDRESS} | * | DROP |

— : WITHOUT ANY ADDRESS (NO PROCESSING)
${} : VARIABLE TO BE REPLACED

3704 EVENT TYPE TABLE

| EVENT NAME | EVENT TYPE |
|---|---|
| PROC_EXEC | PROCESS |
| PROC_FORK | PROCESS |
| NW_ACCEPT | NETWORK |
| FILE_OPEN | FILE |

3701 EVENT MANAGEMENT SECTION

"NETWORK" EVENT MANAGEMENT QUEUE

"PROCESS" EVENT MANAGEMENT QUEUE

"FILE" EVENT MANAGEMENT QUEUE

FIG. 38

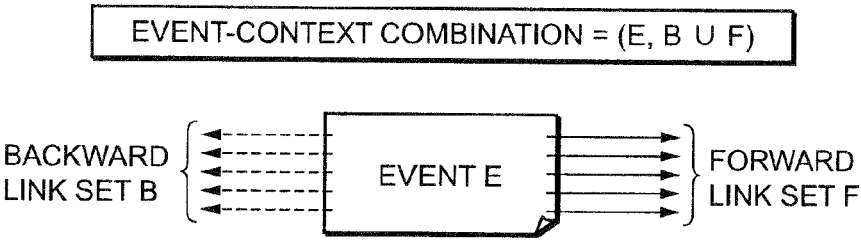

EVENT-CONTEXT COMBINATION = (E, B ∪ F)

BACKWARD LINK SET B — EVENT E — FORWARD LINK SET F

FIG. 39

4101 DT DEFINITION FILE

```
#(RULE 1)  ALLOW WWW SERVER TO WRITE LOG.
0.0.0.0/0,<Inetinfo.exe>,FILE_WRITE,C:¥winnt¥system32¥LogFiles¥.*;ALLOW
#(RULE 2) ALLOW WWW SERVER TO READ CONTENT REGION
0.0.0.0/0,<Inetinfo.exe>,FILE_READ,C:¥Inetpub¥wwwroot¥,*;ALLOW

#(RULE 3) ALLOW REGISTERED CGI THAT IS A SUBSYSTEM
OF WWW SERVER TO UPDATE DATABASE.
0.0.0.0/0,<Inetinfo.exe><regist.exe> $ ,FILE_WRITE,C:¥data¥client.db;ALLOW
#(RULE 4) ALLOW OUTPUT CGI THAT IS A SUBSYSTEM
OF WWW SERVER TO READ DATABASE.
0.0.0.0/0,<Inetinfo.exe><view.exe> $ ,FILE_READ,C:¥data¥client.db;ALLOW

#(RULE 5) ALLOW FTP SERVER TO WRITE ONTO CONTENT REGION
# BUT ONLY FROM MANAGEMENT DOMAIN 10.56.192.0/24.
10.56.192.0/24.^<ftpd.exe>+ $ ,FILE_WRITE,C:¥Inetpub¥wwwroot¥.*;ALLOW

#(RULE 6) WWW SERVER DOES NOT WRITE TO FILE UNLESS
SPECIFICALLY ALLOWED
0.0.0.0/0,<inetinfo.exe>.FILE_WRITE,.*;DENY
#(RULE 7) INHIBIT ACCESS TO DATABASE REGION FROM
OTHER THAN ALLOWED PROGRAMS
0.0.0.0/0,.*,.*,FILE_READ|FILE_WRITE,C:¥data¥.*;DENY
#(RULE 8) REWRITING OF CONTENT REGION BY OTHER THAN
ALLOWED PROGRAMS IS AN ATTACK
0.0.0.0/0,.*,.*,FILE_WRITE,C:¥Inetpub¥wwwroot¥.*;DENY

#(DEFAULT RULE) IF NO MATCH IS FOUND FOR ANY RULE,
THEN "ALLOWANCE"
DEFAULT;ALLOW
```

| REQUEST DATA | CONFIDENCE LEVEL |
|---|---|
| D0 | 1 |
| D1 | 0 |
| . . . | . . . |
| Dn | 1 |

| REQUEST DATA | CONFIDENCE LEVEL |
|---|---|
| D0 | 1 |
| D1 | 0 |
| ... | ... |
| 1 | 0 |

8003 REFERENCE TABLE

| SERVER IDENTIFIER | REQUISITE CONFIDENCE LEVEL |
|---|---|
| D1 | M1 |
| D2 | M2 |
| ... | ... |
| Dk | Mk |

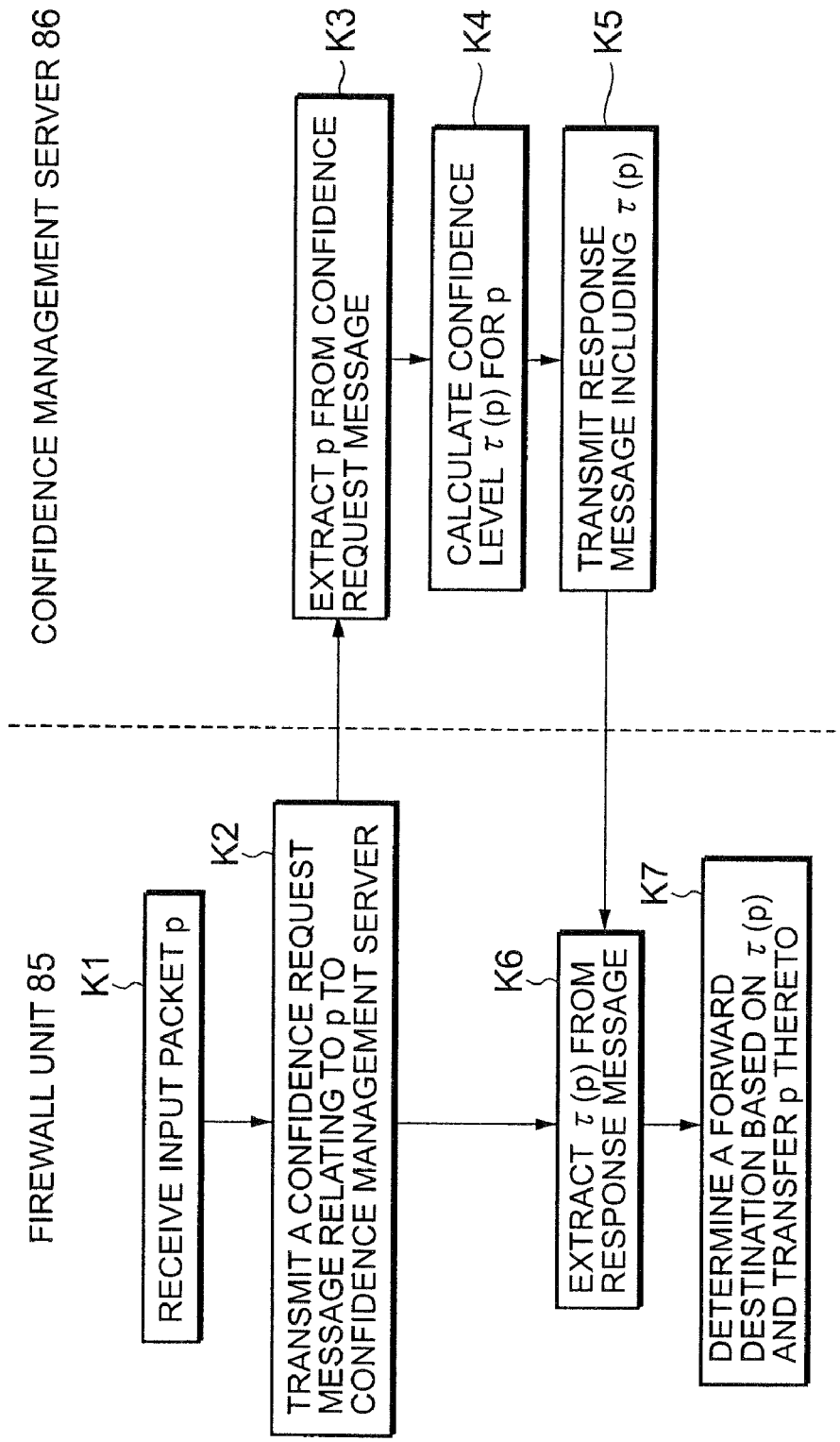

ATTACK DEFENDING SYSTEM AND ATTACK DEFENDING METHOD

BACKGROUND OF THE INVENTION

1. Field of the Invention

The present invention relates generally to a security countermeasure technique in a computer network, and more particularly to a system and a method allowing protection of resources on an internal network against attacks from external networks.

2. Description of the Related Art

As defense techniques against attacks from external networks, the following approaches have been proposed: (1) firewall; (2) intrusion detection system; and (3) decoy (or honeypot) system.

An example of the firewall is disclosed in Japanese Patent Application Unexamined Pub. No. HE-44642 (hereafter referred to as Patent Document 1). According to the Patent Document 1, a firewall is installed at an interface between an external IP network and an internal Ethernet. The firewall determines whether a packet to be inspected should pass through from the external network to the internal network. Specifically, the firewall is provided with a packet filter. The packet filter determines whether a packet is allowed to pass through according to a predetermined rule, by looking at the type of protocol (such as TCP, UDP, HTTP), the contents of a payload as well as the header information of the packet (such as a source address and a destination address). Setting an appropriate rule can block the entrance of unauthorized packets containing worms into a Web server open to general external networks. See paragraph numbers 0029-0030 and FIG. 5 of the Patent Document 1.

An example of the intrusion detection system is disclosed in Japanese Patent Application Unexamined Pub. No. 2001-350678 (hereafter called Patent Document 2). This conventional intrusion detection system is provided with an unauthorized-intrusion determination rule executing section and unauthorized-intrusion determination rules for respective ones of applications such as WWW server and MAIL server. First, from a source IP address or a destination IP address of a packet flowing on an internal network, an IP address table obtaining section determines which application is currently running on the server having either of the IP addresses. Next, in the unauthorized-intrusion determination rule executing section, the unauthorized-intrusion determination rule for the determined application is executed to determine whether the packet is unauthorized or not. By processing as above, more accurate intrusion detection depending on the application can be enabled. See paragraph numbers 0062-0084 and FIG. 1 of the Patent Document 2.

A first example of the decoy system is disclosed in Japanese Patent Application Unexamined Pub. No. 2000-261483 (hereafter called Patent Document 3). This conventional decoy unit is provided with a traffic monitoring device, attack patterns and a disguised server on an internal network structured under a router 10. First, in the traffic monitoring device, packets flowing on the internal network are monitored and an attack pattern matching a specific attack pattern is detected as an unauthorized packet, then, its identification information (including the source IP address and the destination IP address) is notified to the router. Next, in the router, as to the subsequent packets from an external network, the packets having identification information coinciding with that of the detected packet are all transferred to the disguised server. The disguised server mimicking a regular server on the internal network interprets appropriately the transferred packets and creates counterfeit response packets. Thereafter the disguised server transmits the counterfeit response packets toward the host having transmitted the unauthorized packet before. By processing as above, it is possible to cause an attacker present on the external network to keep on attacking without adversely influencing the internal network, and to clarify the identity of the attacker by tracing back the packets. See paragraph numbers 0024-0030 and FIG. 1 of the Patent Document 3.

A second example of the decoy system is disclosed in Japanese Patent Application Unexamined Pub. No. 2002-7234 (hereafter called Patent Document 4). This conventional decoy unit is provided with a fraud detecting server and a decoy server as a so-called gateway at the interface between an internal network and an external network (Internet). The fraud detecting server monitors packets flowing from external networks to the internal network, and determines whether a packet is unauthorized or not by, for example, executing a predetermined pattern matching process to the payloads of receiving packets. A packet having been determined to be unauthorized is transferred to the decoy server or to an information processing server on the internal network after being added with a specific mark. The information processing server is previously provided with a fraud avoiding processing section. In the case where an unauthorized packet having the specific mark is transferred to the information processing server, the information processing server further transfers it to the decoy server. In either way, the unauthorized packet detected at the fraud detecting server finally reaches the decoy server. Then, the decoy server creates a counterfeit response packet and transmits it toward the source host of the unauthorized packet. By processing as above, all the packets determined to be unauthorized can be shut up on the decoy server. See paragraph numbers 0036-0040 and FIGS. 1 and 2 of the Patent Document 4.

A third example of the decoy system is described in Japanese Patent Application Unexamined Pub. No. H09-224053 (hereafter called Patent Document 5). This conventional decoy unit is provided with a screening system and an agent network at the interface between a public network (Internet) and a private network (intra network). The screening system executes a filtering process for packets arrived from each network connected with the screening system itself according to screening criteria based on information described in the headers of the packets, incoming packet history etc. However, one of the characteristics of the communication interface of the screening system is that it does not have any IP address and it can hide itself from tracing it back using Traceroute. As another characteristic, it can change the route of an arriving packet being directed to the private network, to the agent network. Zero (0) or more agent host is provided on the agent network and it can act as an agent of a host on the private network. By processing as above, a private network can be protected against attacks from a public network. See paragraph numbers 0037-0043, 0066-0067 and FIG. 6 of the Patent Document 5.

However, the above conventional techniques have problems listed below.

A first problem is that attacks cannot be effectively detected or defended against when a communication path encryption technique such as SSL (Secure Socket Layer) and IPSec (that has obtained RFC2401) is used between an attack-source host on an external network and a server on an internal network. The reason is that encrypted data (such as in payload) necessary for detecting attacks can not be referred to.

A second problem is that there are some packets overlooked by an inspection or the speediness of a network is lost since the performance of an attack detecting section cannot catch up completely with the speedup of networks in recent years. In order to improve the accuracy of sensing attacks, more various or more complicated determination rules are needed. However, the number of packets to be inspected is drastically increasing due to the speedup of networks.

In the intrusion detection systems described in Patent Document 2 and Patent Document 3 and in the first example of a decoy unit, at least one unauthorized packet can reach the server to be protected on an internal network. The reason is that the packets checked by an attack detecting section are just the copies of the packets and therefore the distribution of the packets on the internal network can not be blocked even when the copied packets have been determined as unauthorized.

Furthermore, in the third example of a decoy unit described in Patent Document 5, conditions and methods for changing the route of a packet incoming from the Internet to a substitute network are not discussed. Therefore, it is not possible to distribute packets correctly, permitting normal accesses to be guided to the substitute network and anomalous accesses to be guided to the internal network.

A third problem is that it is difficult to improve the accuracy of detecting attacks. The general form of operating a server is a remote maintenance work and the work includes modification of data in the server and updating of the system. Therefore, an intrusion detection system often mistakenly detects this maintenance work as attacks.

As is known with Web applications, various application programs such as database operation as a subsystem of a server are often run and attacks causing unauthorized operation taking advantage of such vulnerability of the subsystem are often seen. An intrusion detection system is provided with attack patterns well known commonly against servers or their subsystems as its knowledge. However, there is a risk of receiving unknown attacks in the case where there is a subsystem created specifically for a site or where configuration of a server or a subsystem is not complete though the server or the subsystem is a commonly-used one.

A fourth problem is as follows. In a server system provided with subsystems such as databases and plug-in modules, in which a specific access procedure is defined in a communication protocol between the server system and a client (that is, in the case of a stateful protocol), the client/server communication fails at both of the decoy server and the regular server when using such a method that only suspicious accesses are lured into a server which is not a regular server, such as a decoy server. Especially when an access has been mistakenly lured into the decoy server, a server failure will occur since processes to be executed on the regular server are not executed thereon.

SUMMARY OF THE INVENTION

It is therefore an object of the present invention to provide an attack defending system and an attack defending method as well as a firewall unit, which allow effective defense against attacks from external networks even when a communication system uses a communication path encryption technique.

Another object of the invention is to provide an attack defending system and an attack defending method as well as a firewall unit, which can support a high-speed network environment.

Yet another object of the invention is to provide an attack defending system and an attack defending method as well as a firewall unit, which can block securely unauthorized packets directed to a server to be protected.

An attack defending system according to the present invention is provided at an interface between an internal network and an external network.

According to a first aspect of the present invention, a decoy device includes an attack detector for detecting presence or absence of an attack by executing a service process for the input IP packet transferred from the firewall device. A firewall device includes: a packet filter for determining whether the input IP packet inputted from the external network is to be accepted, based on header information of the input IP packet and a filtering condition corresponding to the input IP packet; s destination selector for selecting one of the internal network and the decoy device as a destination of the input IP packet accepted by the packet filter, based on the header information of the input IP packet and a distribution condition; and a filtering condition manager for managing the filtering condition depending on whether the attack detector detects an attack based on the input IP packet forwarded to the decoy device.

According to a second aspect of the present invention, the firewall device includes a destination selector for selecting one of the internal network and the decoy device as a destination of the input IP packet based on header information of the input IP packet and a distribution condition; and a confidence manager for managing confidence levels for source IP addresses of a plurality of input IP packets. The destination selector obtains a confidence level for a source IP address of the input IP packet from the confidence manager and selects a destination of the input IP packet depending on whether the confidence level satisfies the distribution condition.

An attack defending method according to the present invention performs acceptance or discard of the input IP packet based on header information of the input IP packet and a filtering condition corresponding to the input IP packet. Based on the header information of the input IP packet and the distribution condition, a destination of the input IP packet accepted is determined to be one of the internal network and the decoy device. When the input IP packet is transferred to the decoy device, the decoy device executes a service process for the input IP packet while monitoring the service process thereof. By determining whether a rule associated with a predetermined attack category is violated, the decoy device detects the presence or absence of an attack. The filtering condition corresponding to the input IP packet is set depending on whether an attack is detected based on the input IP packet. And the packet filtering is performed according to the filtering condition corresponding to the input IP packet.

Preferably, the firewall device includes: a packet filter for determining whether the input IP packet inputted from the external network is to be accepted, based on header information of the input IP packet and a filtering condition corresponding to the input IP packet; a destination selector for selecting one of the internal network and the decoy device as a destination of the input IP packet accepted by the packet filter, based on the header information of the input IP packet and a distribution condition; a confidence manager for managing a confidence level of a source IP address in a plurality of input IP packets; and a filtering condition manager for managing the filtering condition corresponding to the input IP packet forwarded to the decoy device depending on whether the attack detector detects an attack based on the input IP packet. The second destination selector obtains a confidence level for a source IP address of the input IP packet from the confidence manager and selects a destination of the input IP packet depending on whether the confidence level satisfies a second predetermined condition.

According to a third aspect of the present invention, the decoy device is provided with an event manager which relates each process status inputted from a processor to past process statuses which are causes of the generation of each inputted process status, and stores a sequence of process statuses related in a memory. Further, an attack detecting means is provided. When it is determined whether a process status is normal or not, the attack detecting means scans the sequence of process statuses to analyze the sequence of relational process statuses. The attack detecting means determines whether the process status is normal or not, under the constraint such as the relationship between a process causing the occurrence of the process status in question and its parent process and the relationship between a process causing the occurrence of the process status in question and the access-source IP address.

According to a fourth aspect of the present invention, the firewall device is provided with a hash-table manager and a destination selector. The hash-table manager stores a combination of application data including a request or the like to a server or its subsystem and past attack detection results in the decoy device. The destination selector extracts application data by referring to the payload of the input IP packet and inquires of the hash-table manager about registration state of the application data and, depending on the result, selects one or both of the internal network and the decoy device as a destination of the input IP packet. The destination selector determines whether the application data is registered or not and, if registered, is detected as an attack. When the application data is not registered or has been detected as an attack, the application data is guided into the decoy device and otherwise into both of the internal network and the decoy device.

According to a fifth aspect of the present invention, a decoy cluster is provided, which includes a plurality of decoy devices, which correspond to a server on the internal network. A firewall device manages the server by assigning at least one requisite confidence level to each of the plurality of decoy devices in the decoy cluster. When an IP packet is inputted, the firewall device obtains a confidence level of the input IP packet from the confidence manager and determines a decoy device having a requisite confidence level, which is not greater than the obtained confidence level, as a destination of the input IP packet.

According to a sixth aspect of the present invention, at least one attack detecting system is provided in at least one of the internal network and the external network. The firewall device receives an attack detection alert from the at least one attack detecting system and transforms it to an alert including at least an attack-source IP address and an attack-target IP address.

According to a seventh aspect of the present invention, the attack defending system includes a firewall device, a decoy device, and at least one confidence management server, wherein the firewall device transmits a request message including at least a part of data of an input IP packet, to the at least one confidence management server, and the at least one confidence management server generates a confidence level for the input IP packet from data included in the request message in response to the request message, and transmits a response message including at least the confidence level back to the firewall device. In addition, the firewall device includes a destination selector for selecting one of the internal network and the decoy device as a destination of the input IP packet, based on header information of the input IP packet and a distribution condition; and a management server connection section for transmitting the request message to the at least one confidence management server and obtaining the confidence level for the input IP packet as a response to the request message. The destination selector selects a destination of the input IP packet depending on whether the confidence level for the input IP packet satisfies the distribution condition.

As described above, according to the invention, since an input IP packet is guided based on the header information of the input IP packet, the system can effectively detect and defend against attacks even when an encryption technique is employed in accesses from an external network to an internal network. Even when any communication path encryption technique is employed, at least the source IP address or the destination IP address described in an IP header is not encrypted. Further, the guiding to the decoy unit by the firewall unit can be executed based on the information described in the IP header.

Furthermore, according to the invention, the network performance can be maintained at a high level in a high-speed network environment because the method of guiding to the decoy unit at the firewall unit can be realized with a simple algorithm based on a small number of parameters.

Furthermore, according to the invention, when the decoy device detects an attack from an input IP packet, all subsequent accesses from the same source host can be dynamically rejected, allowing the internal network to be defended against all subsequent attacks by the firewall device. Since communication paths to the internal network for the attack-detected packets are blocked by the firewall device, these attack-intended packets cannot reach the internal network at all.

BRIEF DESCRIPTION OF THE DRAWINGS

FIG. 6 is a diagram exemplifying models of access control rules held in a defense rule determination section 107;

FIG. 38 is a conceptual diagram showing an event-context pair outputted by the event management section in the twelfth embodiment;

FIG. 39 is a diagram showing an example of a normal operation definition with domain-type constraints (DT definition);

FIG. 67 is a flowchart showing the operation of an attack defending system according to the nineteenth embodiment of the invention.

DESCRIPTION OF THE PREFERRED EMBODIMENTS

Network Configuration

Figure 1:
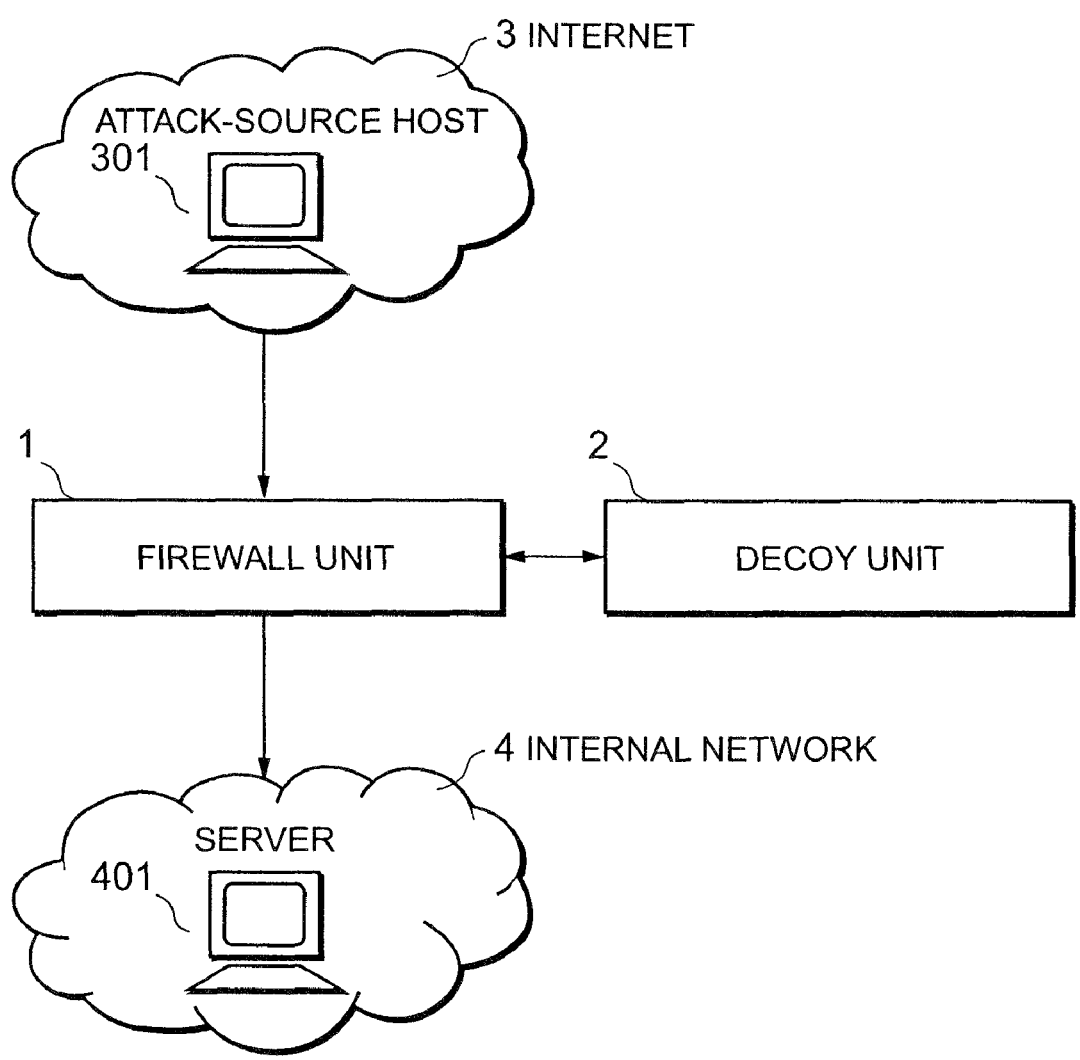
FIG. 1 is a schematic block diagram showing an attack defending system according to the invention.

Referring to FIG. 1, an attack defending system according to the invention basically has a firewall unit 1 and a decoy unit 2. The firewall unit 1 is installed at the interface between the Internet 3 and an internal network 4. The internal network 4 includes one (1) or more server 401 for providing services such as WWW (World Wide Web). Here it is assumed that an attack-source host 301 exists on the Internet 3.

The firewall unit 1 allows packets to pass and sends them to the internal network 4 when the packets are regular authorized packets. When received packets are unauthorized or suspicious, the firewall unit 1 lures the packets into the decoy unit 2. The decoy unit 2 detects the presence or absence of attacks and, when having detected some attack, it outputs an alert to the firewall unit 1. Furthermore, it may create a counterfeit response packet to the unauthorized packet and return the counterfeit response packet to the firewall unit 1. The firewall unit 1 transmits the counterfeit response packet to the attack-source host 301 being the sender of the unauthorized packet.

First Embodiment 1.1) Structure

Figure 2:
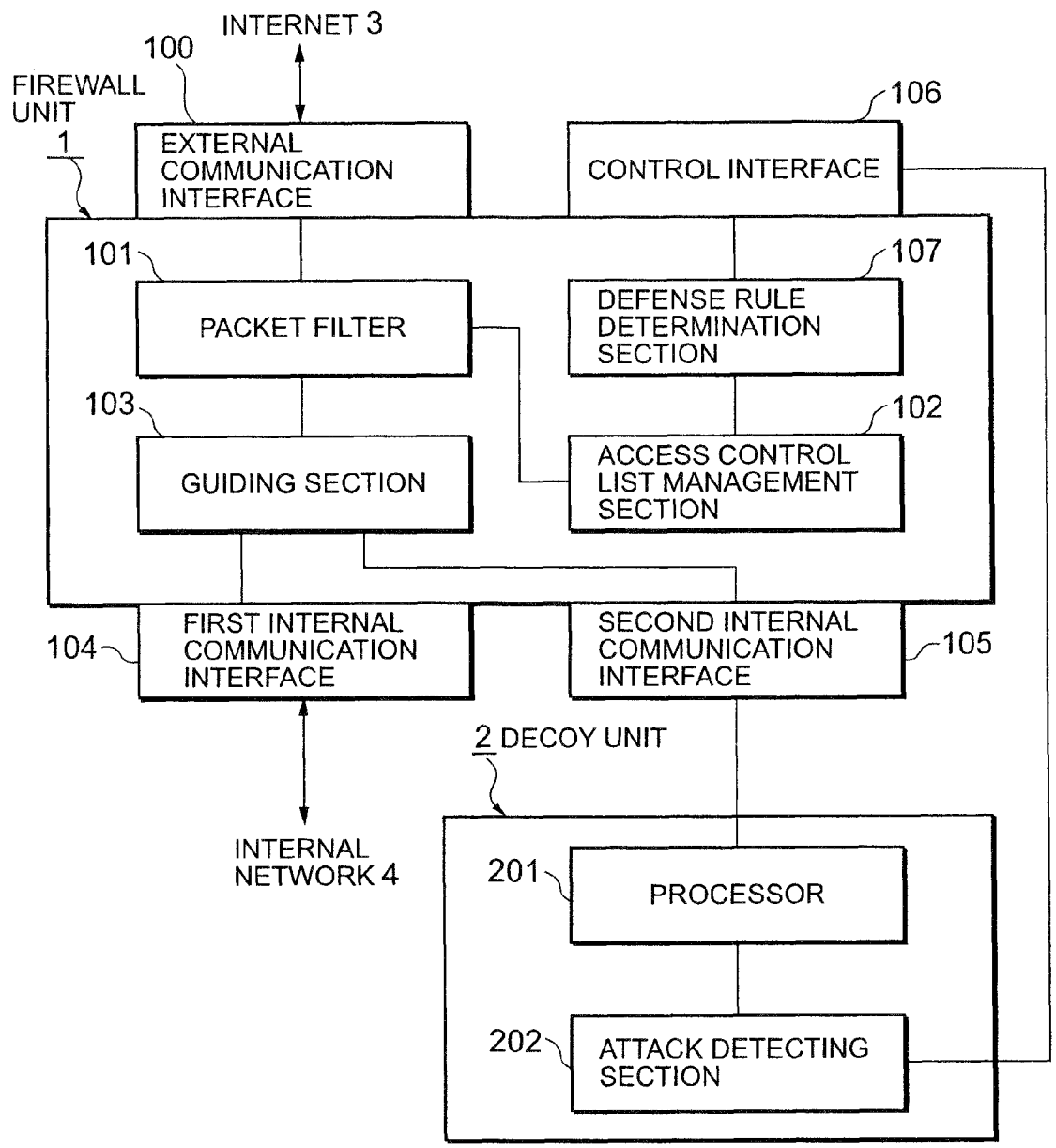
FIG. 2 is a block diagram showing the structure of a firewall unit 1 and a decoy unit 2 of an attack defending system according to the first embodiment of the invention.

Referring to FIG. 2, the firewall unit 1 is connected with the Internet 3 through an external communication interface 100 and is connected with the internal network 4 through a first internal communication interface 104.

A packet filter 101 is connected between the external communication interface 100 and a guiding section 103, and executes packet filtering according to access control rules obtained from an access control list management section 102. As described later, the packet filter 101 transfers an IP packet received from one of the external communication interface 100 and the guiding section 103 to the other, or discards the received packet without transferring it.

A packet accepted by the packet filter 101 is sent to the guiding section 103. The guiding section 103 refers to a guiding list (FIG. 5), which will be described later, to guide the IP packet received from the packet filter 101 to either of the first internal communication interface 104 or a second internal communication interface 105 depending on its destination IP address. To the contrary, when having received an IP packet bound for the Internet 3 from the first internal communication interface 104 or the second internal communication interface 105, the guiding section 103 transfers it to the packet filter 101.

The first internal communication interface 104 transfers IP packets received from the guiding section 103, to the internal network 4, and transfers IP packets bound for the Internet 3 received from the internal network 4, to the guiding section 103. The second internal communication interface 105 transfers IP packets guided by the guiding section 103, to the decoy unit 2, and transfers IP packets bound for the Internet 3 received from the decoy unit 2, to the guiding section 103.

The decoy unit 2 includes a processor 201 and an attack detecting section 202. The processor 201 executes processes for providing network services such as WWW and Telnet while outputting the status of the processes to the attack detecting section 202 whenever necessary. The attack detecting section 202 monitors the process status received from the processor 201 to check the presence or absence of an attack. When an attack is detected, the attack detecting section 202 creates an alert for reporting the contents of the attack and sends it to the firewall unit 1.

When having received the alert through a control interface 106, the defense rule determination section 107 instructs the access control list management section 102 to update the access control list according to the contents of the alert.

Figure 3:
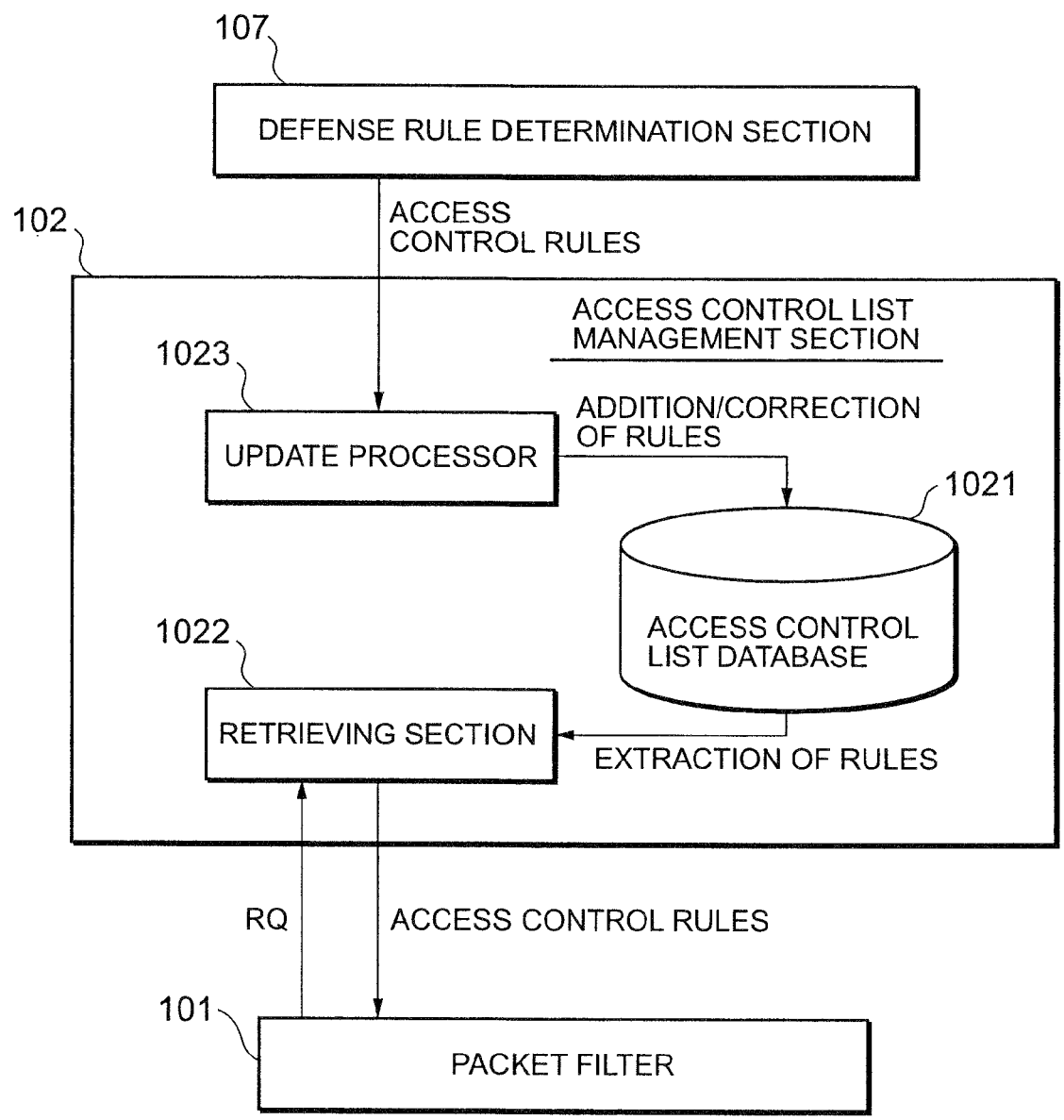
FIG. 3 is a block diagram showing an access control list management section 102 in the firewall unit 1 shown in FIG. 2.

Referring to FIG. 3, the access control list management section 102 has an access control list database 1021, a retrieving section 1022 and an update processor 1023. The access control list database 1021 holds retrievably a set of entries (address control rules) having at least the following fields: "source IP address", "destination IP address" and "filtering method". When the retrieving section 1022 receives a request (RQ) containing IP address etc. from the packet filter 101, it retrieves a corresponding access control rule from the access control list database 1021 and returns it to the packet filter 101. The update processor 1023 updates (adds or corrects) the contents of the access control list database 1021 according to an access control rule for update, which has been received from the defense rule determination section 107.

Figures 4, 5:
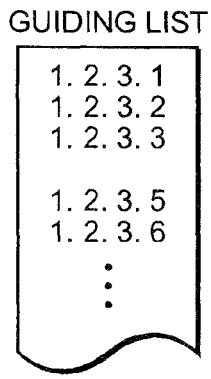
FIG. 4 is a diagram exemplifying the contents of an access control list database 1021.
FIG. 5 is a diagram showing an example of a guiding list provided to a guiding section 103.

As shown in FIG. 4, the access control list database 1021 stores a plurality of access control rules according to a predetermined rule. Each access control rule is composed of a combination of rule matching conditions including a source IP address (SPC) and a destination IP address (DST), and an identifier denoting a predetermined processing method (PROC) such as acceptance (ACCEPT), denial (DENY) and dropping (DROP) of a packet. Since a plurality of access control rules are generally set, a set of access control rules is held in the access control list database 1021. In FIG. 4, an asterisk (*) denotes an arbitrary address. "ACCEPT", "DENY" and "DROP" for packet filtering process denote acceptance of a packet, a denial of a packet with ICMP error notification and a drop of a packet without any ICMP error notification.

FIG. 5 shows an example of a guiding list provided to the guiding section 103. In the guiding section 103, a guiding list containing at least one IP address is held in advance. In the guiding list of the present embodiment, unused IP addresses of the internal network 4 are listed. As described later, a packet addressed to an IP address that is not used in the internal network 4 has a high possibility of being a suspicious packet.

FIG. 6 shows an example of a defense rule script held in the defense rule determination section 107. Describing later in detail, the defense rule determination section 107 lists the defense rules for each attack type such as reconnaissance (RECON), INTRUSION, or DESTRUCTION and holds them in, for example, a file form. Each defense rule uses a description for designating a model of one access control rule in such a form that each rule is in a one-to-one correspondence to a predetermined attack category. For example, for each line, a description such as:

INTRUSION:(SRC:$(SOURCE_IP_ADDRESS), DST:*, PROC:DROP) is listed for a corresponding attack type. As described later, in this description, the part "${SOURCE_IP_ADDRESS}" is a variable which can be substituted by information (source IP address of an attacking packet) described in an alert received from the decoy unit 2.

1.2) Operations 1.2.1) Packet Filtering

Figure 7:
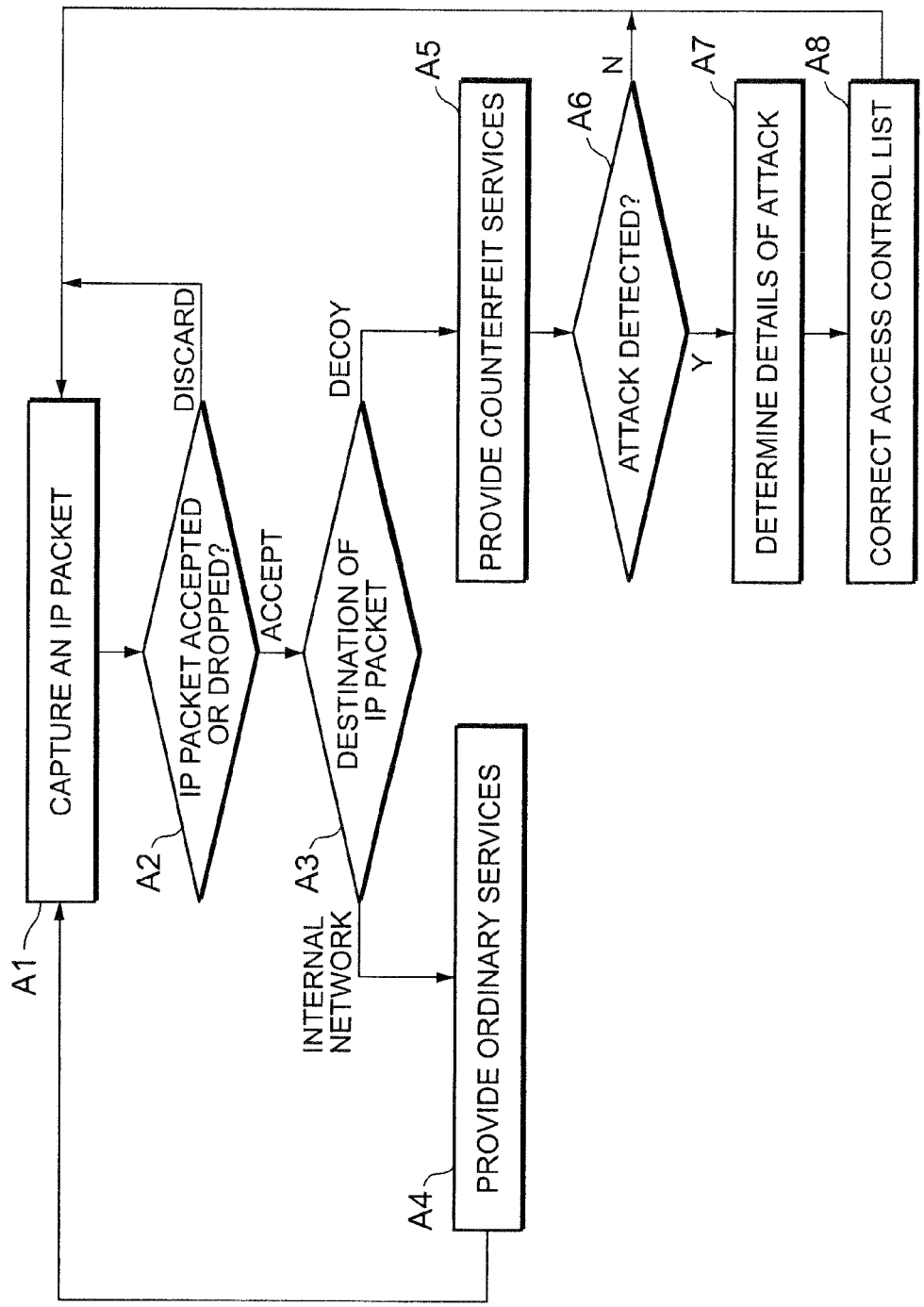
FIG. 7 is a flowchart showing an operation of an attack defending system according to the first embodiment of the invention.

Referring to FIG. 7, first, in the firewall unit 1, an IP packet to be transferred from the Internet 3 toward the internal network 4 is captured by the external communication interface 100 and thereafter the captured packet is transferred to the packet filter 101 (Step A1).

Next, the packet filter 101 refers to the header of the IP packet and outputs to the access control list management section 102 the information described in the header such as a source IP address and a destination IP address. As described above, the access control list management section 102 searches the access control list database 1021 using the inputted IP address, and returns the first-hit access control rule to the packet filter 101. When having obtained the access control rule, the packet filter 101 accepts or drops the IP packet according to its processing method (Step A2). The packet filter 101 transfers the IP packet to the guiding section 103 when it has accepted the IP packet. The packet filter 101 immediately shifts the control to the processing of the next packet when it has dropped the current IP packet.

In retrieval of an access control rule in the access control list management section 102, when the retrieving section 1022 has received a source IP address inputted from the packet filter 101, the retrieving section 1022 compares the matching conditions for each access control rule with the source IP address, extracts the first-hit access control rule meeting the matching conditions, and returns it to the packet filter 101.

1.2.2) Packet Guiding

When the IP packet have been accepted by the packet filter 101, the guiding section 103 refers to the destination IP address of the IP packet and a previously set guiding list to determine an internal communication interface (104 or 105) to which the IP packet should be transferred (Step A3). More specifically, a guiding list as shown in FIG. 5 is compared with the destination IP address and, when a hit is found, the IP packet is transferred to the decoy unit 2 through the second internal communication interface 105. When no hit is found, the IP packet is transferred to the internal network 4 through the first internal communication interface 104.

In the case where the IP packet is transmitted to the internal network 4, the IP packet reaches an appropriate server 301 on the internal network 4 and a predetermined service providing process is executed (Step A4).

Figure 8:
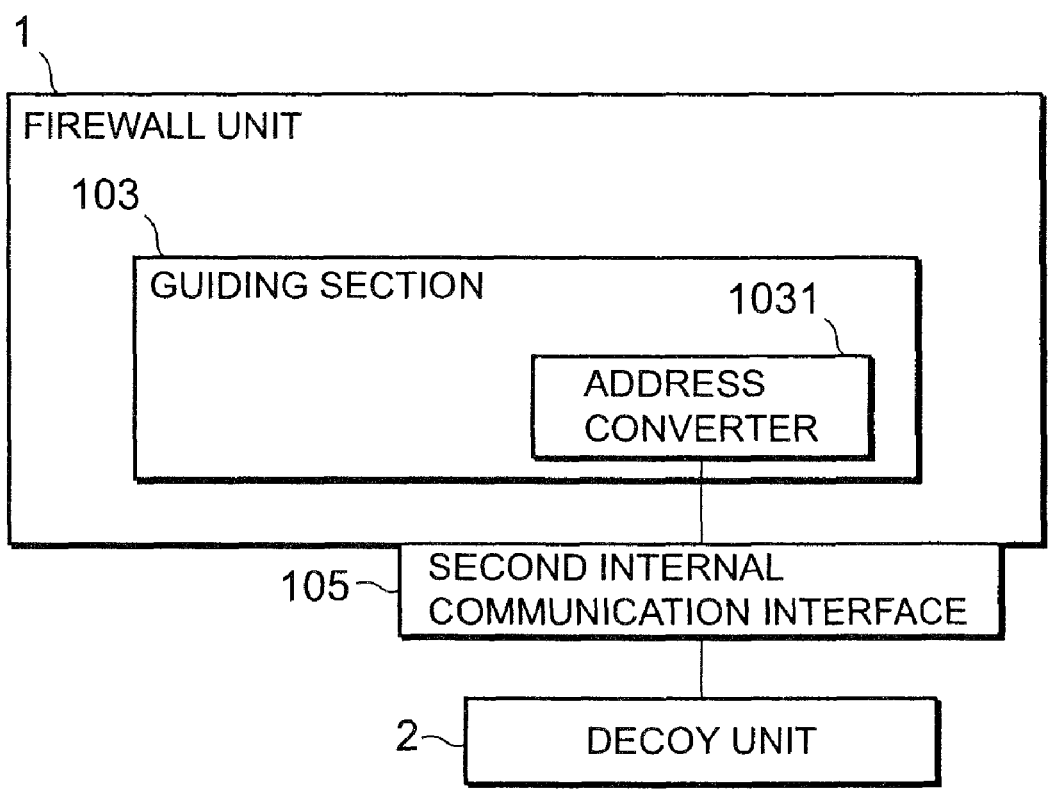
FIG. 8 is a block diagram showing a preferable example for the case where an address conversion process is executed by a firewall unit according to the first embodiment of the invention.

On the other hand, when the IP packet is transferred to the decoy unit 2, the processor 201 performs a process to provide a counterfeit service while sequentially notifying the attack detecting section 202 of the contents of input data and the processing status (Step A5). The decoy unit 2 can receive any IP packet from the firewall unit 1 regardless of its destination IP address. More specifically, a plurality of IP addresses may be assigned to the decoy unit 2. Alternatively, as shown in FIG. 8, an address converter 1031 may be provided in the guiding section 103 to convert the destination IP address of the input IP packet to the IP address of the decoy unit 2 before transferring to the decoy unit 2.

1.2.3) Counterfeit Service

After receiving the IP packet, the decoy unit 2 provides one or more arbitrary service(s), for example, WWW and Telnet. However, in the present embodiment, it is enough that at least the communication protocol is appropriately processed. There is no need of providing services such as accessing file systems and database processing as provided in actual services. For example, in the case of Telnet service, it may be designed to permit log-in for all of arbitrary inputs to Login/Password prompt and start up a counterfeit shell that responds to the user with a counterfeit response.

1.2.4) Attack Detection

The attack detecting section 202 of the decoy unit 2 compares the processing status notified from the processor 201 with a normal operation definition to determine whether an attack exists (Step A6). The normal operation definition is a set of conditions relating to correct behaviors of the services provided on the decoy unit 2, for example, a set of conditions for WWW services such as "a process corresponding to a WWW service does not make any network access to other servers by itself" and "file writing is not made for directories other than the directory: /usr/local/www/logs" (see FIG. 12 for details). Each of these conditions is compared with the processing status notified and, when there is at least one condition which the processing status does not meet, it is determined that an attack is present.

When an attack is detected, the type of the attack is determined depending on which one of the conditions is not met and the result is transmitted as an alert to the firewall unit 1 (Step A7).

The type of an attack is determined under a classification, which is sufficient for deriving out a defending method against the attack. For example, the type of an attack is as follows:

"Reconnaissance": a so-called "finger printing" such as port scanning and banner attacking;

"Intrusion": setup of a backdoor such as Trojan Horse and addition of account; or "Destruction": a service disabling attack such as Ping Of Death.

For each condition in the normal operation definition, the imaginable types of attacks which are imagined in the event of a violation of a corresponding condition may be listed. For example, an attack that does not meet the above-described condition "file writing is not made for directories other than the directory: /usr/local/www/logs" has a high possibility of installing a backdoor. Accordingly, an identifier denoting "intrusion" is written as a condition.

1.2.5) Update of Access Control List

Finally, the defense rule determination section 107 in the firewall unit 1 creates an access defense rule by referring to the alert received from the decoy unit 2 through the control interface 106 and using the defense rule. The defense rule determination section 107 instructs the access control list management section 102 to add the created access defense rule (Step A8).

More specifically, defense rule scripts as shown in FIG. 6 are set in advance for each attack type. In each defense rule scrip, a combination of an attack type and a model of an access control rule to be updated is described according to the form as shown in FIG. 6. A variable to which information described in an alert is assigned can be described in a model of an access control rule. For example, in the case where (SRC:$(SOURCE_IP ADDRESS), DST:1. 2. 3. 4, PROC: DROP) is described, the part, "($SOURCE_IP_ADDRESS)", is replaced with a source IP address described in the alert and is converted into an access control rule in a complete form such as (SRC:12. 34. 56. 78, DST:1. 2. 3. 4, PROC:DROP). Then, the access control rule is transmitted to the update processor 1023 in the access control list management section 102 and the update processor 1023 appropriately adds it to the access control list database 1021. When an access control rule having the same combination of a source IP address and a destination IP address is found in the access control list database 1021, the update processor 1023 updates appropriately the access control list database 1021 such that the newly added access control rule is valid. For example, the newly added access control rule is added such that it is placed at the head of the access control list database 1021 in the retrieval scanning direction.

1.3) Advantages

In the firewall unit 1 according to the first embodiment, the guiding section 103 employs a guiding method such that a suspicious packet is guided to the decoy unit 2 depending on the result of a comparison of the guiding list with its destination IP address. Therefore, the decoy unit 2 can be installed without the need of changing the existing structure of the internal network 4. Furthermore, since unused IP addresses in the internal network 4 are included in the guiding list, the same advantage as that would be obtained when a plurality of the decoy units are installed on the internal network 4 can be obtained by using one decoy unit 2.

Usually, a worm having an automatic infection function such as "CodePed" and "Nimda" acts such that it were trying to infect IP addresses randomly selected from a section of successive IP addresses. Therefore, the larger the number of the decoy units, the higher the possibility of detecting the worm. In the present embodiment, such an advantage can be obtained by using the guiding list as shown in FIG. 5.

Furthermore, by including the IP address assigned to the external communication interface 100 of the firewall unit 1, the firewall unit 1 and the decoy unit 2 become indistinguishable from each other to the Internet 3. Since an attack incoming from the Internet 3 in general starts with discovering a firewall, the embodiment has an effect of "hiding" the firewall unit 1.

1.4) Example

Figure 9:
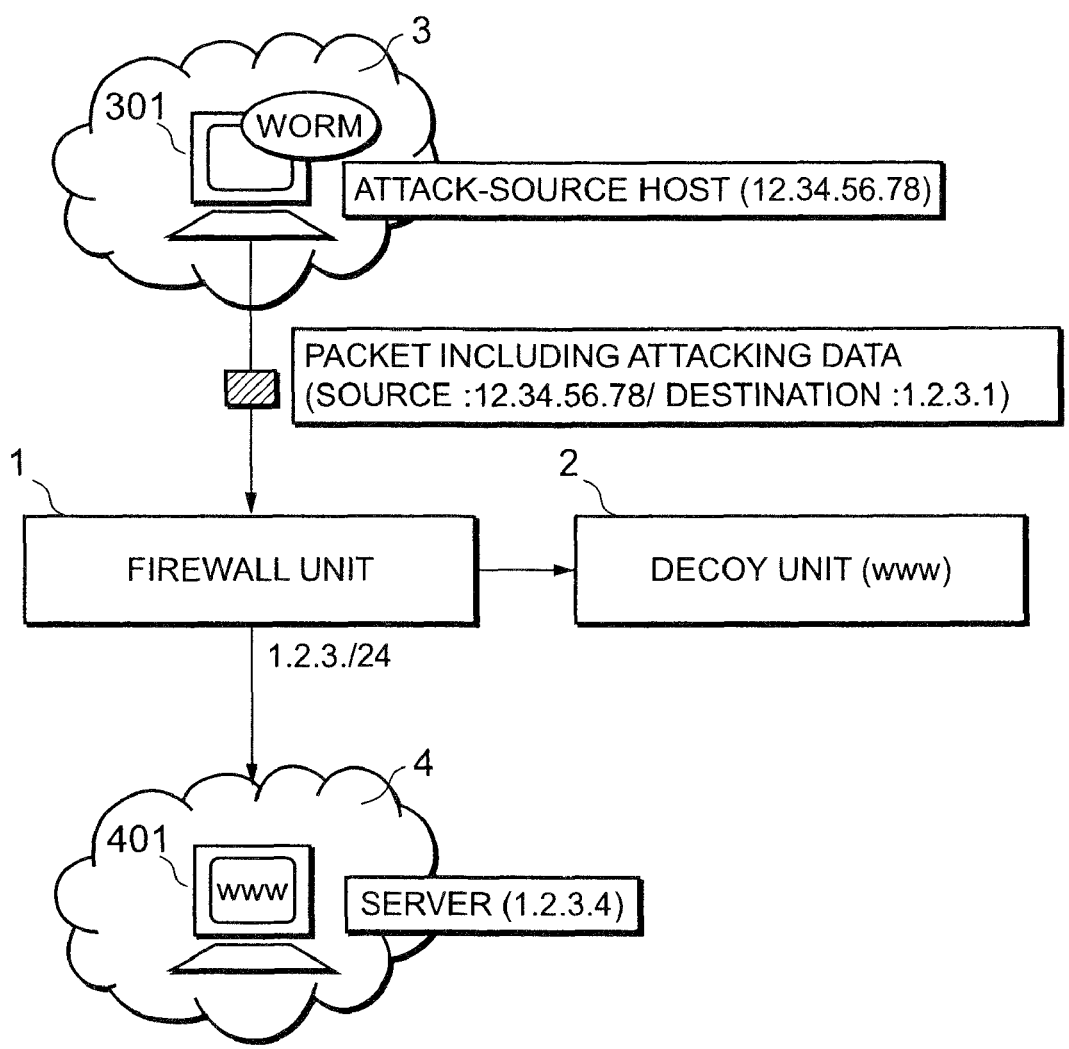
FIG. 9 is a network diagram for describing an example of specific operation of the first embodiment.
Figure 10:
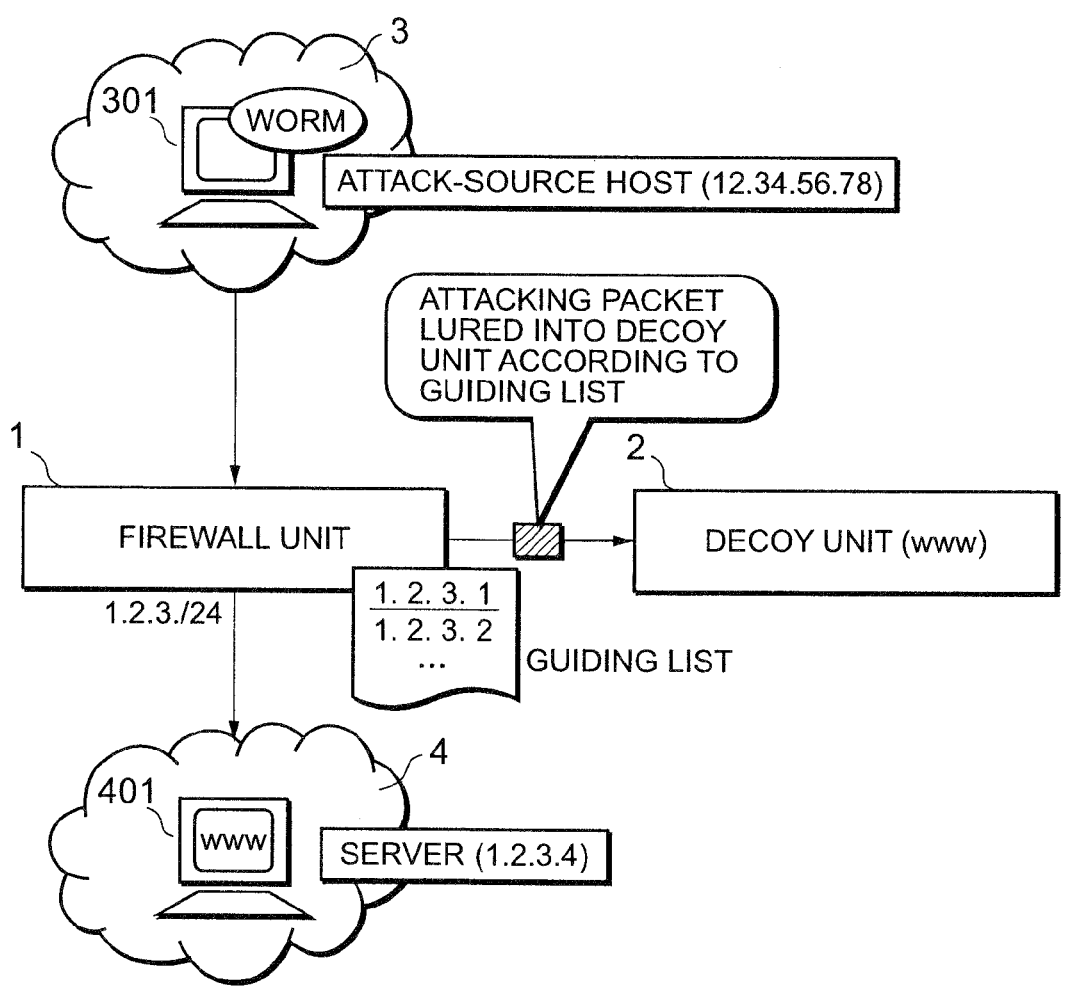
FIG. 10 is a network diagram for describing the example of specific operation of the first embodiment.
Figure 11:
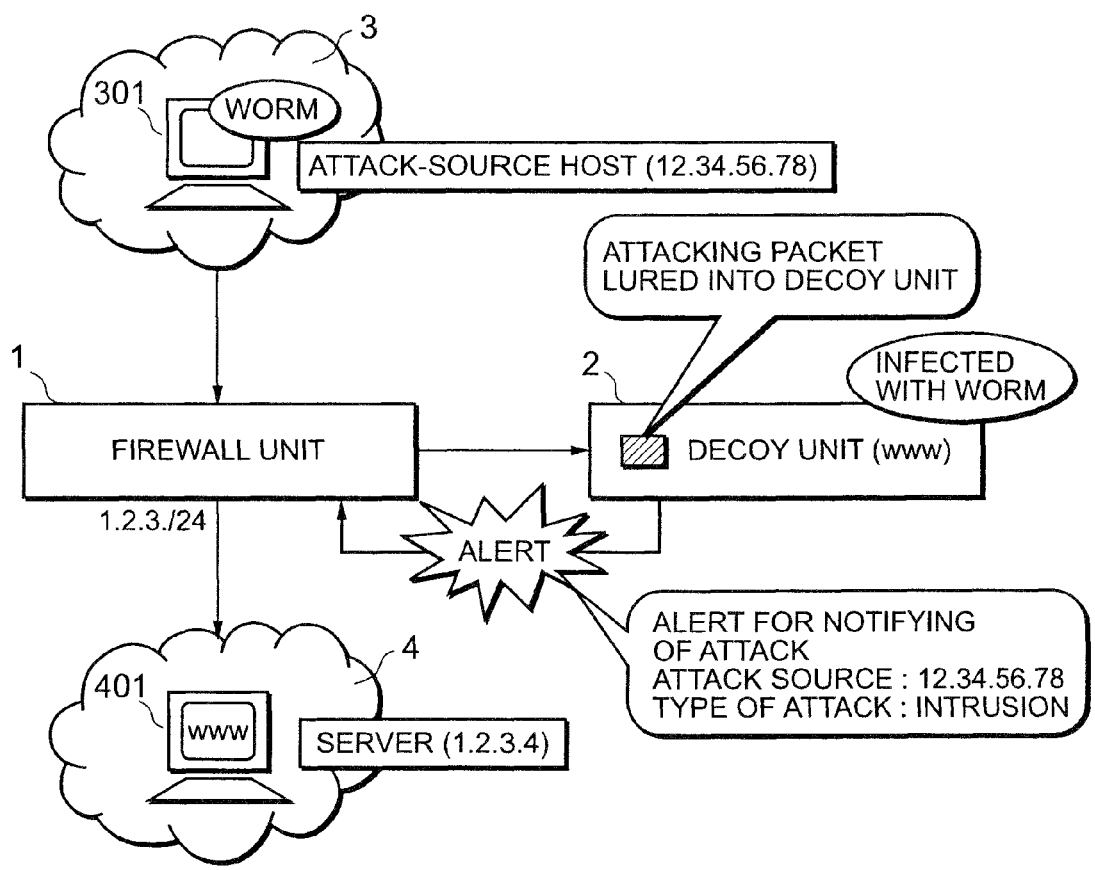
FIG. 11 is a network diagram for describing the example of specific operation of the first embodiment.
Figure 12:
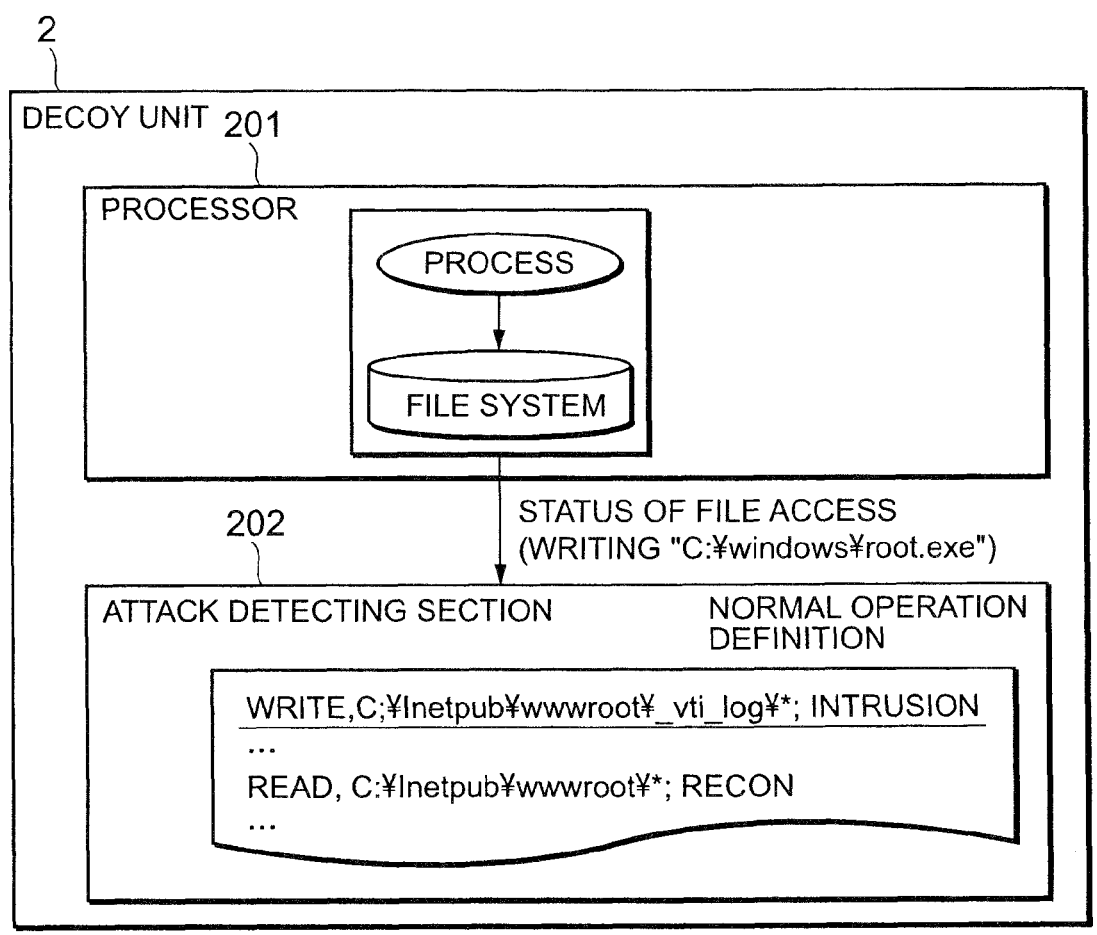
FIG. 12 is a schematic diagram showing an attack detecting operation in the decoy unit 2.

FIGS. 9-11 will be used to describe a specific example of the first embodiment and FIG. 12 is used to describe the attack detecting operation of the decoy unit 2.

As shown in FIG. 9, it is assumed that the attack-source host 301 (IP address: 12. 34. 56. 78) is present on the Internet 3 and the Internet server 401 is present on the internal network 4. The firewall unit 1 is installed at the interface between the Internet 3 and the internal network 4. The decoy unit 2 is installed, which is assumed to provide WWW services at TCP port 80 being a standard port number. Further, it is assumed that "1. 2. 3. x/24" is used as a network address of the internal network 4 and an IP address of "1. 2. 3. 4" is assigned to the server 401.

It is furthermore assumed that the attack-source host 301 is infected with a worm having an automatic infection function to WWW services, wherein the worm is aiming at "1. 2. 3. x/24" corresponding to the internal network 4 as a next infection target and selects "1. 2. 3. 1" as the first infection target. In this case, a SYN packet (source IP address: 12. 34. 56. 78, destination IP address: 1. 2. 3. 1) is transmitted from the attack-source host 301 toward the internal network 4.

The SYN packet first reaches the external communication interface 100 of the firewall unit 1 and thereafter is transmitted to the packet filter 101 immediately. The packet filter 101 outputs at least the source IP address "12. 34. 56. 78" and the destination IP address "1. 2. 3. 1" of the SYN packet to the access control list management section 102. In addition, a protocol number "6" (indicating TCP) or a port number, "80" etc. may be output to improve the accuracy of an access control rule. In the present example, only the source IP address and the destination IP address are outputted to the access control list management section 102.

It is assumed that the access control list database 1021 of the access control list management section 102 holds, for example, an access control list described in text form as shown in FIG. 4. As described above, each line denotes a single access control rule, in which a combination of a SRC field and a DST field denotes a matching condition and a PROC field denotes a filtering method.

The retrieving section 1022 searches the access control list database using as a retrieval key a combination of the source IP address "12. 34. 56. 78" and the destination IP address "1. 2. 3. 1" inputted from the packet filter 101. The access control list database is searched such that the retrieval key is compared with the matching condition of each access control rule sequentially selected starting with the first line of the access control list database to find the access control rule whose matching condition first matches the retrieval key. At this moment, when an access control rule "(SPC: *, DST:1. 2. 3. 1, PROC: ACCEPT)" where "PROC: ACCEPT" denotes acceptance of an input IP packet) matches the retrieval key, the retrieving section 1022 returns "(SRC: 12. 34. 56. 78, DST: 1. 2. 3. 1, PROC: ACCEPT)" to the packet filter 101.

When having received the access control rule from the access control list management section 102, the packet filter 101 refers to the PROC field thereof. If it indicates "ACCEPT", then the packet filter 101 immediately forwards the input IP packet to the guiding section 103.

Subsequently, the guiding section 103 compares the destination IP address of the received input IP packet with the guiding list held therein to determine where the input IP packet is to be forwarded. If the unused IP addresses of the internal network 4 listed in the guiding list includes "1. 2. 3. 1", then the guiding section 103 forwards the input IP packet to the second internal communication interface 105 to which the decoy unit 2 is connected (see FIG. 10).

The decoy unit 2 accepts all the IP packets forwarded to the second internal communication interface 105 regardless of their destination IP addresses. The decoy unit 2 operates counterfeit WWW services and, when having received the SNY packet issued by the worm, the decoy unit 2 sends a SYN-ACK packet back to the source IP address of the SYN packet (i.e., attack-source host 301).

After this, the similar processing is repeated in the firewall unit 1 to perform communication for establishing a TCP connection and (unauthorized) communication for worm infection between the attack-source host 301 and the decoy unit 2.

In the decoy unit 2, the processor 201 provides WWW services to the attack-source host 301 and sequentially notifies the attack detecting section 202 of the operation status such as file accesses and network accesses. The worm on the attack-source host 301 tries to cause a WWW service on the decoy unit 2 to get infected. For example, the worm tries to execute an arbitrary command by giving rise to so-called "buffer overflow". More specifically, "buffer overflow" can be generated by inputting to the WWW service a huge message starting with a string of characters, for example, "GET /default. ida?NNNNNNN (repetition of approximately 200 bytes)... %u0000%u00=a HTTP/1. 1". In such a case, a common worm copies its own code in a system area on a disk and, subsequently, issues a command for execution of the code. Therefore, when a worm has intruded, the processor 201 informs the attack detecting section 202 that a write-out of a file has been executed to the system area or that the written file has been executed. At this moment, concurrently, the processor 201 also sends the copy of the input IP packet accepted by the decoy unit 2.

The attack detecting section 202 holds information relating to appropriate operation of the WWW service on the processor 201 as a normal operation definition file in advance. The normal operation definition file is described in, for example, a form as shown in FIG. 12, in which conditions relating to read-in, write-out, execution of files etc. are listed.

Now, assuming that the worm writes out a copy of its own into "C:¥Windows", the operation of the worm violates the second condition in the normal operation definition file shown in FIG. 12: "WRITE, C:¥Inetpub¥wwwroot¥_vti_log¥*;INTRUSION" (this means that the file is written out only under the "C:¥Inetpub¥wwwroot¥_vti_log" directory). At this moment, the attacker detecting section 202 refers to the portion starting with ";" of the condition and determines that there is an attack belonging to the category of INTRUSION.

Subsequently, the attack detecting section 202 creates an alert including at least the source IP address contained in the input IP packet and the detected category of the attack "INTRUSION" and transmits the alert to the control interface 106 of the firewall unit 1 (see FIG. 11).

The alert received at the control interface 106 is transferred to the defense rule determination section 107. As described above, the defense rule determination section 107 holds a script having defense rules listed therein, for example, in a file form. For each defense rule, a single model of an access control rule is designated in such a form that the defense rules is a one-to-one correspondence with the predetermined attack categories (see FIG. 6). For example, defense rules such as the following description are each listed for lines:

INTRUSION:(SRC:${SOURCE_IP_ADDRESS}, DST:*, PROC:DROP)     (1).

The defense rule determination section 107 refers to the defense rule definition file line by line and extracts the formula (1) which is the defense rule corresponding to the "INTRUSION" category. Then, the defense rule determination section 107 creates an access control rule:

(SRC: 12. 34. 56. 78, DST:*, PROC:DROP)     (2)

by substituting the source IP address "12. 34. 56. 78" described in the alert (i.e., the IP address of the attack-source host) for "${SOURCE_IP_ADDRESS}" in the model of the access control rule. In the formula (2), "DST:*" matches an arbitrary destination IP address. Then, the defense rule determination section 107 outputs the access control rule to the access control list management section 102.

In the access control list management section 102, the input of the access control rule from the defense rule determination section 107 is processed by the update processor 1023. The update processor 1023 outputs the access control rule denoted by the formula (2) to the access control list database 1021 and instructs it to add the access control rule to the database. The access control list database 1021 executes the update processing such that the access control rule as denoted by the formula (2) is added. The update processing is performed such that a result obtained by future retrieval reflects the latest update.

Figure 13:
FIG. 13 is a schematic diagram showing an example of an updating operation of the access control list in the first embodiment.

For example, in the case where retrieval is sequentially executed from the line at the head using an access control list described in text form as shown in FIG. 4, the formula (2) is added to the line at the head. In other words, even when an access control rule such as the following formula (3) is previously set, the access control list database 1021 does not output the formula (3) but the formula (2) as the result of the retrieving if the retrieving section 1022 receives an input containing the source IP address "12. 34. 56. 78" after the above-described updating (see FIG. 13).

(SRC:12. 34. 56. 78, DST:*, PROC:ACCEPT)     (3)

Figure 14:
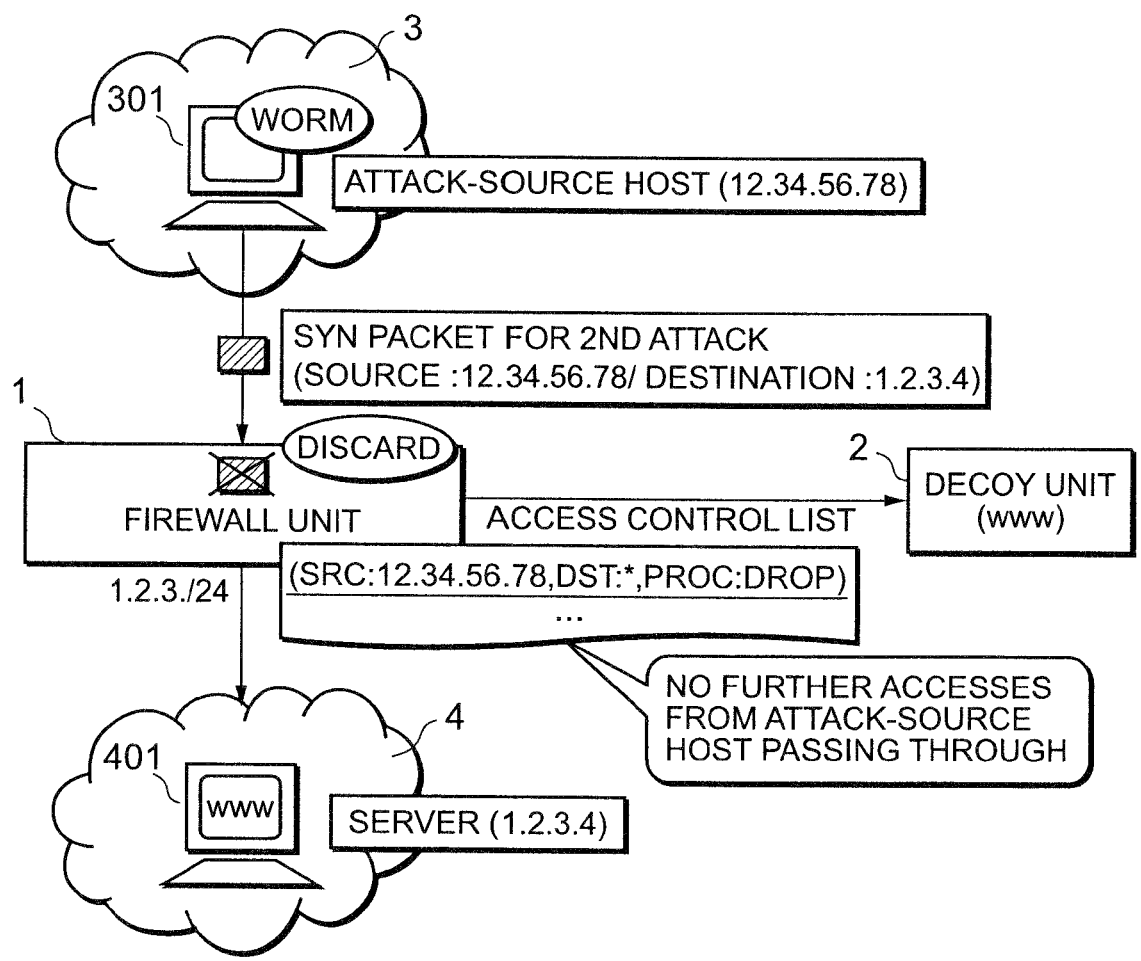
FIG. 14 is a network diagram showing an example of specific operation of the first embodiment.

Next, it is assumed that the worm on the attack-source host 301 has selected an IP address "1. 2. 3. 4" as the next target to attack. Thereafter, similarly to the previous attack, a SYN packet directed to the server 401 on the internal network 4 reaches the firewall unit 1. When the packet filter 101 has received the SYN packet, the packet filter 101 receives the formula (2) as a matching access control rule from the access control list management section 102. Accordingly, the packet filter 101 drops the received SYN packet according to the instruction of the PROC field "DROP" (see FIG. 14).

As described above, the attack defending system according to the first embodiment can effectively protect the server 401 on the internal network 4 against attacks from the worm on the attack-source host 301.

Second Embodiment 2.1) Structure

Figure 15:
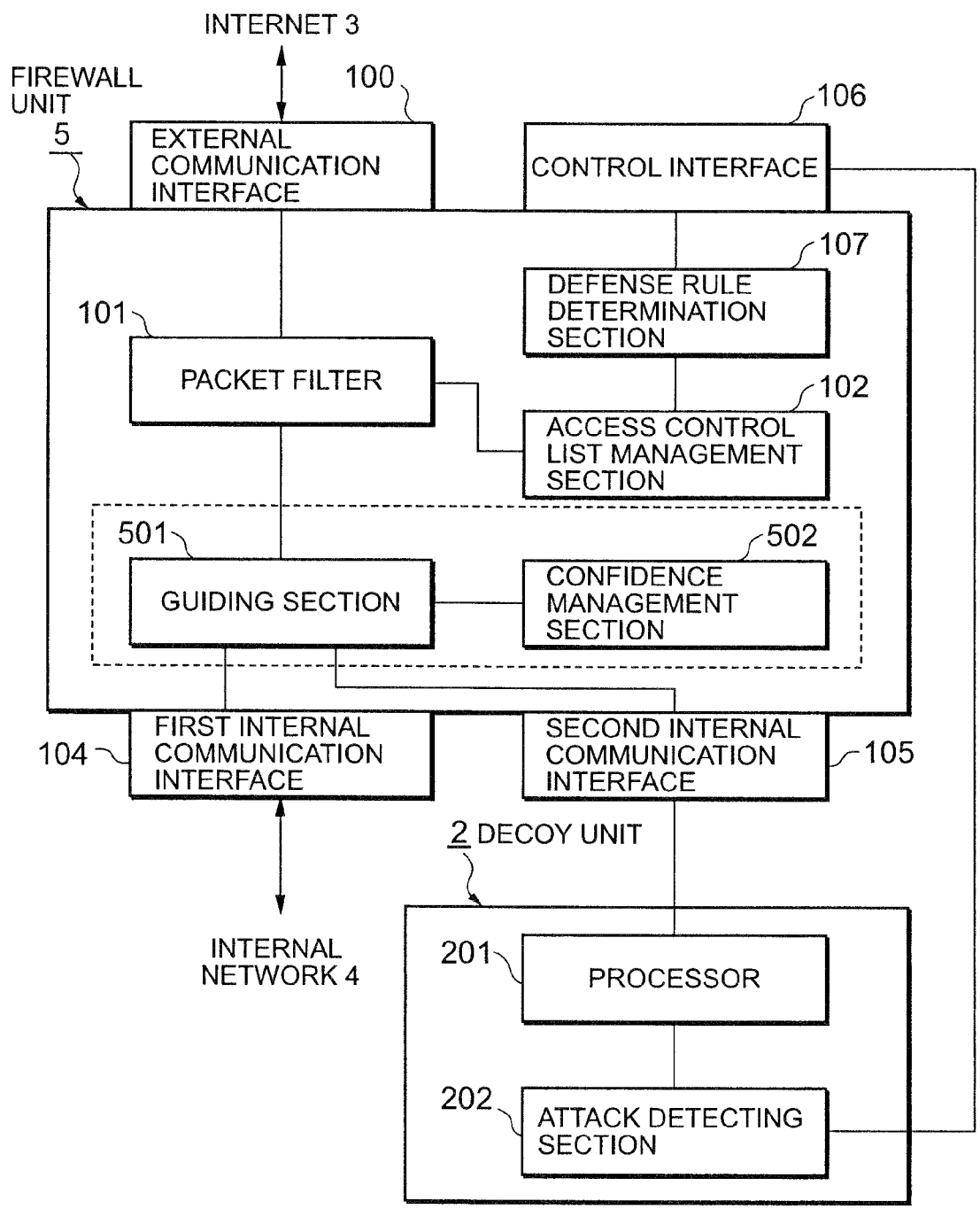
FIG. 15 is a block diagram showing an attack defending system according to a second embodiment of the invention.

Referring to FIG. 15, a firewall unit 5 according to a second embodiment of the present invention is provided with a confidence management section 502 added to the firewall unit 1 of the first embodiment as shown in FIG. 2, and is further provided with a guiding section 501 instead of the guiding section 103. The guiding section 501 is capable of determining a packet forwarding direction depending on a confidence level. Hereinafter, blocks similar to those previously described with reference to FIG. 2 are denoted by the same reference numerals and detailed descriptions on them will be omitted.

In FIG. 15, when having received a packet, the guiding section 501 outputs the source IP address of the received IP packet to the confidence management section 502 and obtains a corresponding confidence level. When having received the confidence level, the guiding section 501 compares the confidence level with a predetermined threshold value and, depending on its comparison result, forwards the received IP packet to a selected one of the first internal communication interface 104 and the second internal communication interface 105.

The confidence management section 502 manages a set of combinations of IP addresses and corresponding confidence levels. When requested from the guiding section 501, the confidence management section 502 retrieves a confidence level corresponding to the request, returns it to the guiding section 501, and updates confidence in a manner described later.

2.2) Operation

Figure 16:
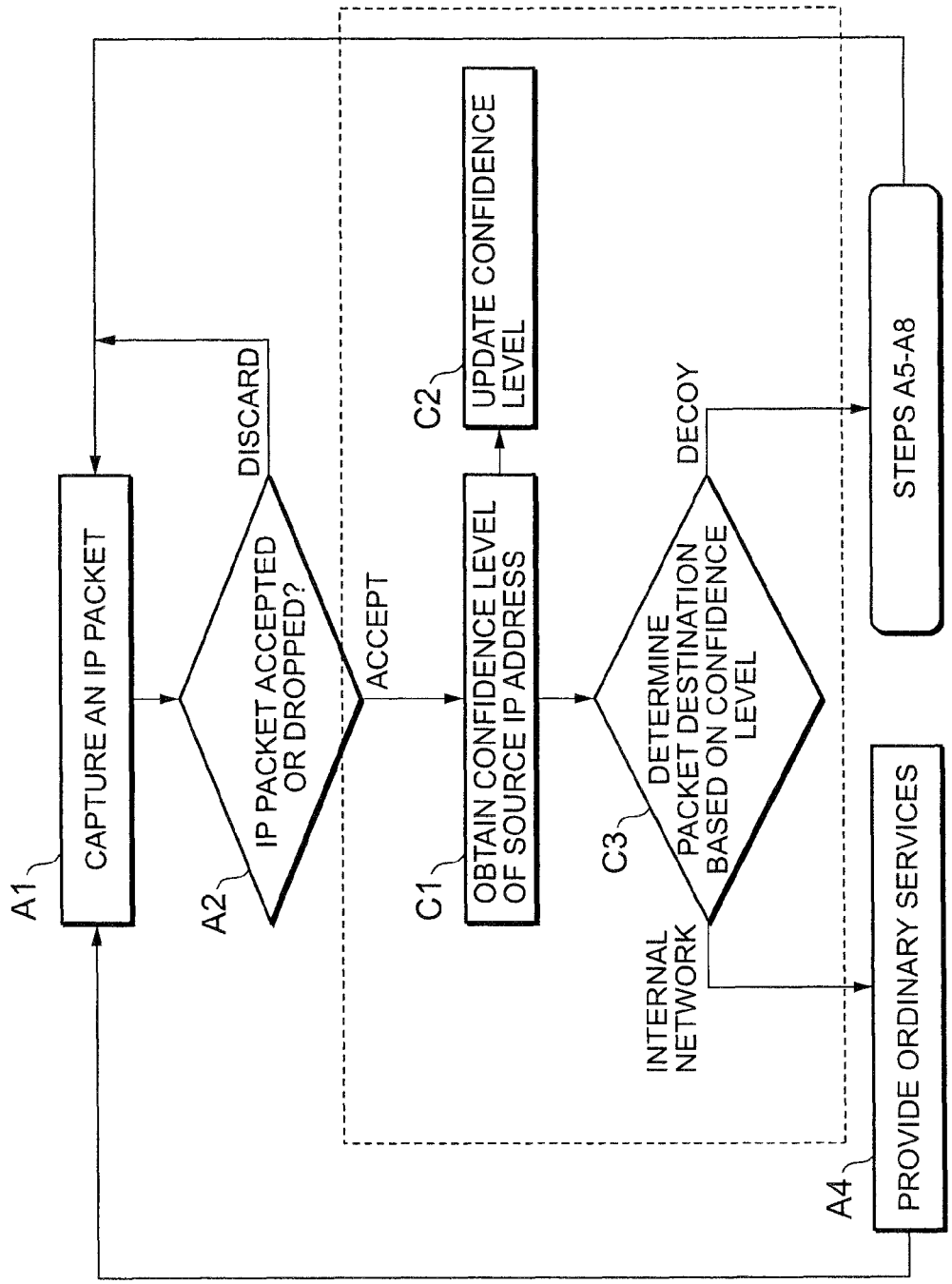
FIG. 16 is a flowchart showing the operation of an attack defending system according to the second embodiment of the invention.

Referring to FIG. 16, similarly to the firewall unit 1 of the first embodiment, when having received an input IP packet from the Internet 3 (Step A1), the packet filter 101 accepts or drops the input IP packet according to an access control rule held in the access control list management section 102 (Step A2). If accepted, the IP packet is transferred to the guiding section 501.

2.2.1) Confidence Level Management

The guiding section 501 outputs at least the source IP address contained in the input IP packet to the confidence management section 502 and obtains a confidence level corresponding to the IP address from the confidence management section 502 (Step C1). The confidence management section 502 holds a set of combinations of IP addresses and their confidence levels and, when an IP address is given, it can out put a confidence level corresponding to the IP address. More specifically, the confidence management section 502 may contain a text file consisting of lines each having a form, "<IP address>:<confidence>", for example, "1. 2. 3. 4:10".

In addition, in order to execute the retrieving and the updating effectively, a relational database may be used. In either way, for an arbitrary IP address, a corresponding confidence level can be appropriately retrieved and updated. When at least one combination of the same IP address as the input IP address and a corresponding confidence level has been found, the confidence management section 502 outputs the confidence level to the guiding section 501. If no hit has been found, the confidence level for the IP address is reset to an initial value (for example, 0) and the confidence level of the initial value is outputted to the guiding section 501. at the same time, the confidence management section 502 adds the combination "<the IP address>:<the initial value>" as a new entry.

After outputting the confidence level, the confidence management section 502 updates the stored confidence data such that the relevant confidence level is increased (Step C2). For example, as shown in the following formula (4), a constant C ($\geq 1$) is added to the confidence level $c[n]$ to produce an updated confidence level $c[n+1]$.

$$c[n+1]=c[n]+C \quad (4)$$

2.2.2) Packet Guiding based on Confidence

The guiding section 501 determines a destination of the IP packet according to the obtained confidence level (Step C3). A preferred example of an evaluation method of a confidence level c uses a threshold value T previously set in the guiding section 501 to compare the confidence level with the threshold value T to evaluate its comparison result.

Figure 17:
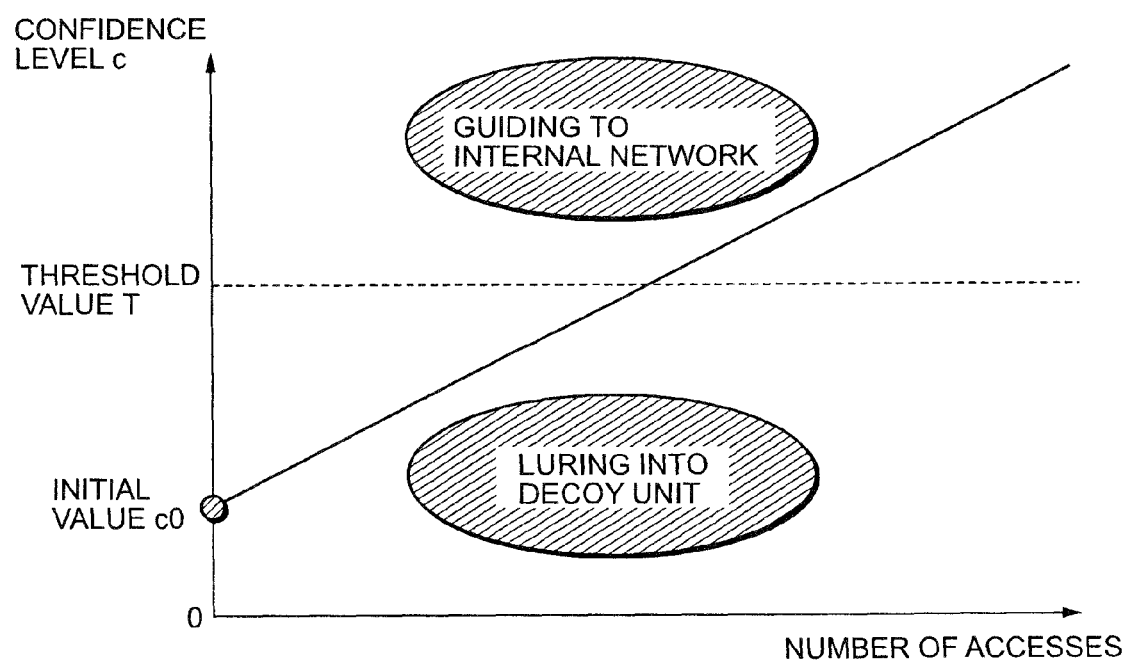
FIG. 17 is a graph showing a relationship between confidence and a packet transfer destination in the second embodiment.

As shown in FIG. 17, when $c \geq T$, the input IP packet is determined to be trustworthy and the IP packet is forwarded to the internal network 4 through the internal communication interface 104. On the other hand, when $c<T$, it is forwarded to the decoy unit 2 through the internal communication network 105. The processing after this is the same as the processing (Steps A4-A8) as shown in FIG. 7.

2.2.3) Another Confidence Level Updating

There is an alternative method of updating the confidence level in addition to the above-described formula (4). As shown in the next formula (5), the number of bytes, L (p), of an input IP packet p may be included in information outputted by the guiding section 501 and its inverse number 1/L(p) may be added to the confidence level as follows:

$$c[n+1]=c[n]+1/L(p) \quad (5).$$

In other words, this updating method is a kind of weighting such that the confidence level becomes more resistant to increasing as the size of an IP packet becomes larger. In general, IP packets with the purpose of buffer-overflow attack or Denial of Services (DoS) attack often have a larger size, compared to IP packets having normal communication contents. Therefore, such a weighting allows to lure these IP packets with the potential for attacking into the decoy unit 2 as long as possible. Consequently, it is possible to improve the defending performance of the attack defending system according to the invention.

The above-described updating method may be combined with a still another method in which the protocol number of an input IP packet is included in information outputted by the guiding section 501 and the confidence level is updated only when the protocol number coincides with a preset protocol number. For example, when a protocol number is previously set to "6", the confidence level is updated only when the input IP packet complies with TCP. In this manner, it is possible to suppress an unnecessary increase of confidence caused by a scanning attack carried out as a preparation to a full-scale attack. As a condition for confidence updating, arbitrary information contained in IP header, TCP header, UDP header etc. may be used in addition to the protocol number as described above, and a logic formula combining a plurality of conditions may be used.

Figure 18A:
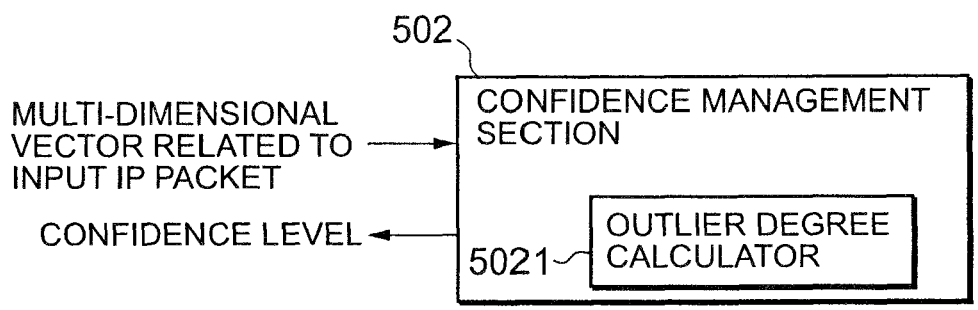
FIG. 18A is a schema-tic diagram showing a confidence management section 502 using calculation of the degree of deviation value.

As yet another example, a confidence level may be obtained for the input IP packet by using the probability of being statistically "irregular", which is generally known as outlier detection. More specifically, as shown in FIG. 18A, the confidence management section 502 does not use a set of combinations of IP addresses and confidence levels but outlier degree calculation disclosed by the present applicant in Japanese Patent Application Unexamined Pub. No. 2001-101154. In this case, a multi-dimensional vector containing a real number value and a discrete value denoting an attribute, for example, x=(arrival time of an input IP packet, the size of the input IP packet, protocol number), is inputted from the guiding section 501.

An outlier degree calculator, when having received such a multi-dimensional vector, calculates a "score value" expressed as a real number, based on the probability density distribution generated from the previous inputs. This "score value" represents the probability of "being irregular", and the larger the score value, the higher its possibility of being attack, which means that its confidence level becomes lower. Therefore, the inverse number of a score value is considered to be the confidence level for the input IP packet.

Figure 18B:
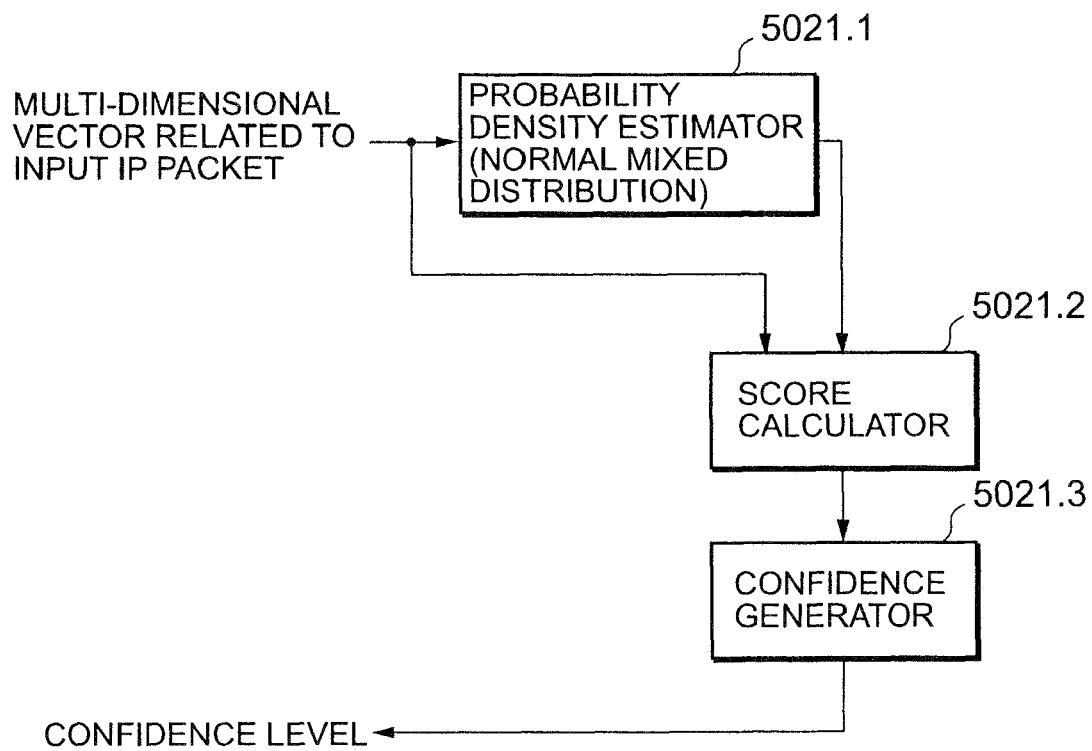
FIG. 18B is a detailed block diagram showing an example of the confidence management section 502.

FIG. 18A shows the confidence management section 502 using outlier degree calculation and FIG. 18B shows an example of the confidence management section 502. The outlier degree calculation allows detection of attacks "in terms of probability", which cannot be detected or predicted by the "crisp" evaluation method of confidence as described above. Therefore, the effective defense against unknown attacks that may occur in the future is possible.

According to the second embodiment of the invention, an advantage of being capable of also countering "active targeting" can be obtained in addition to the advantages of the first embodiment. As specifically described later, active targeting refers to a pattern of attack carried out aiming at, in advance, a specific server or a host, and may be carried out by malicious persons.

2.3) Example

Figure 19:
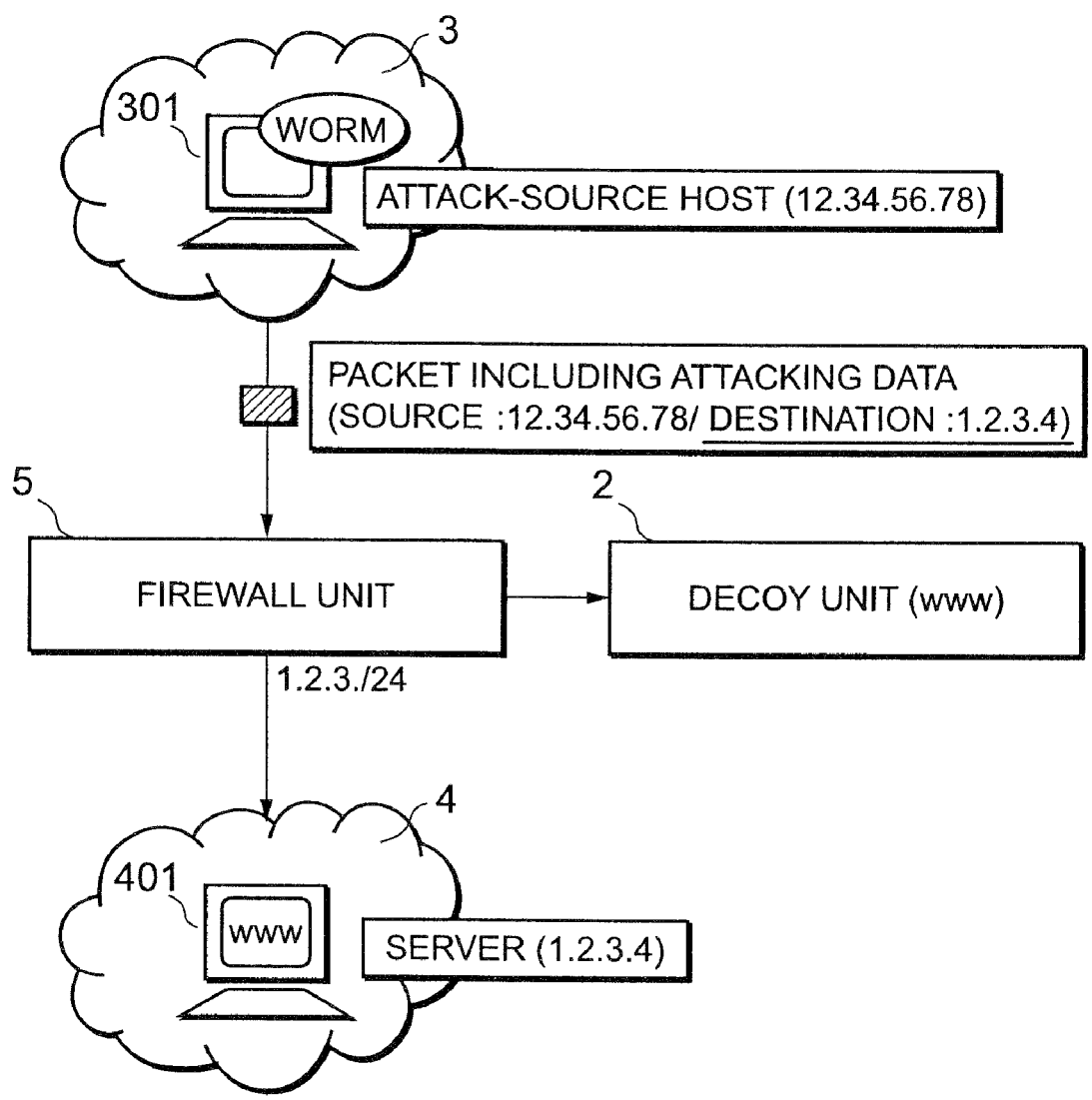
FIG. 19 is a network diagram showing a specific operation of an attack defending system according to the second embodiment.
Figure 20:
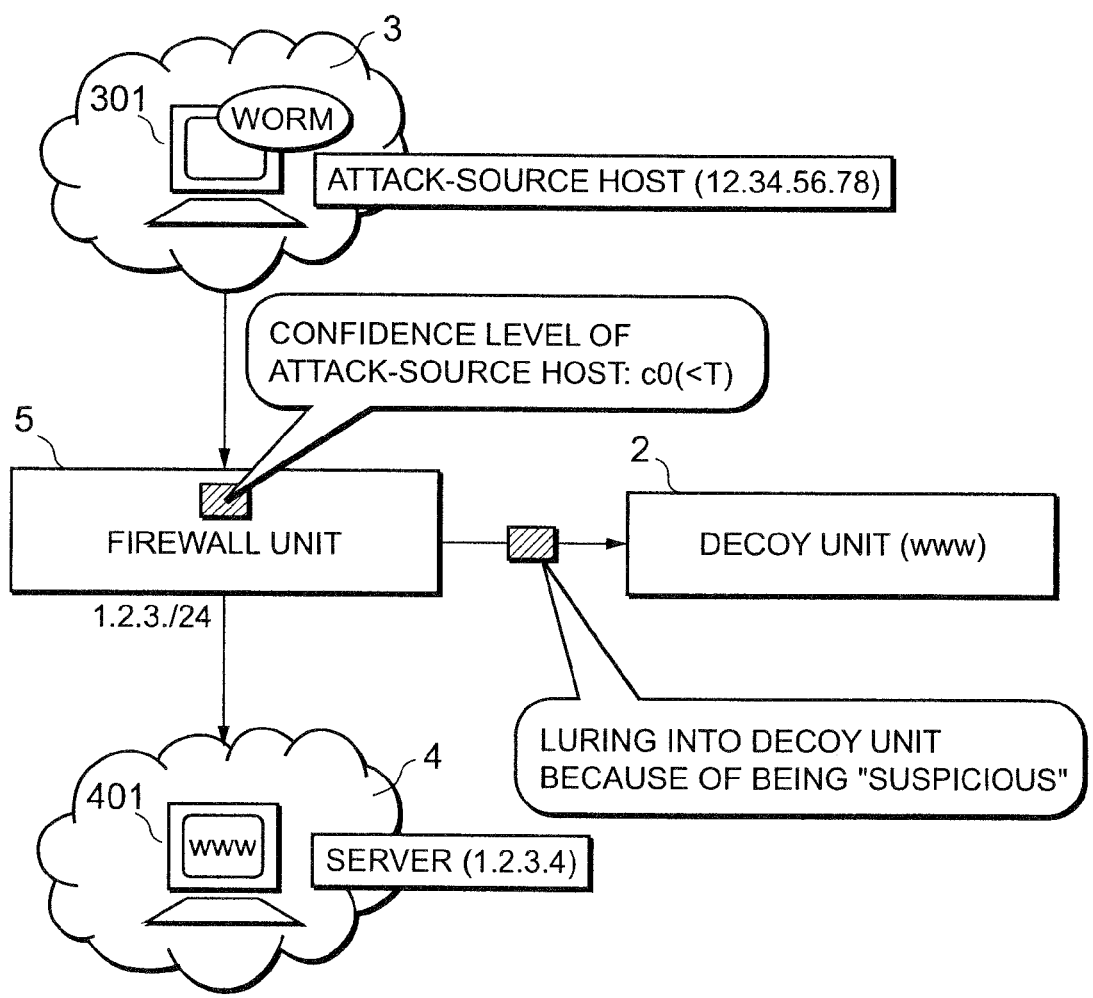
FIG. 20 is a network diagram showing the specific operation of the attack defending system according to the second embodiment.
Figure 21:
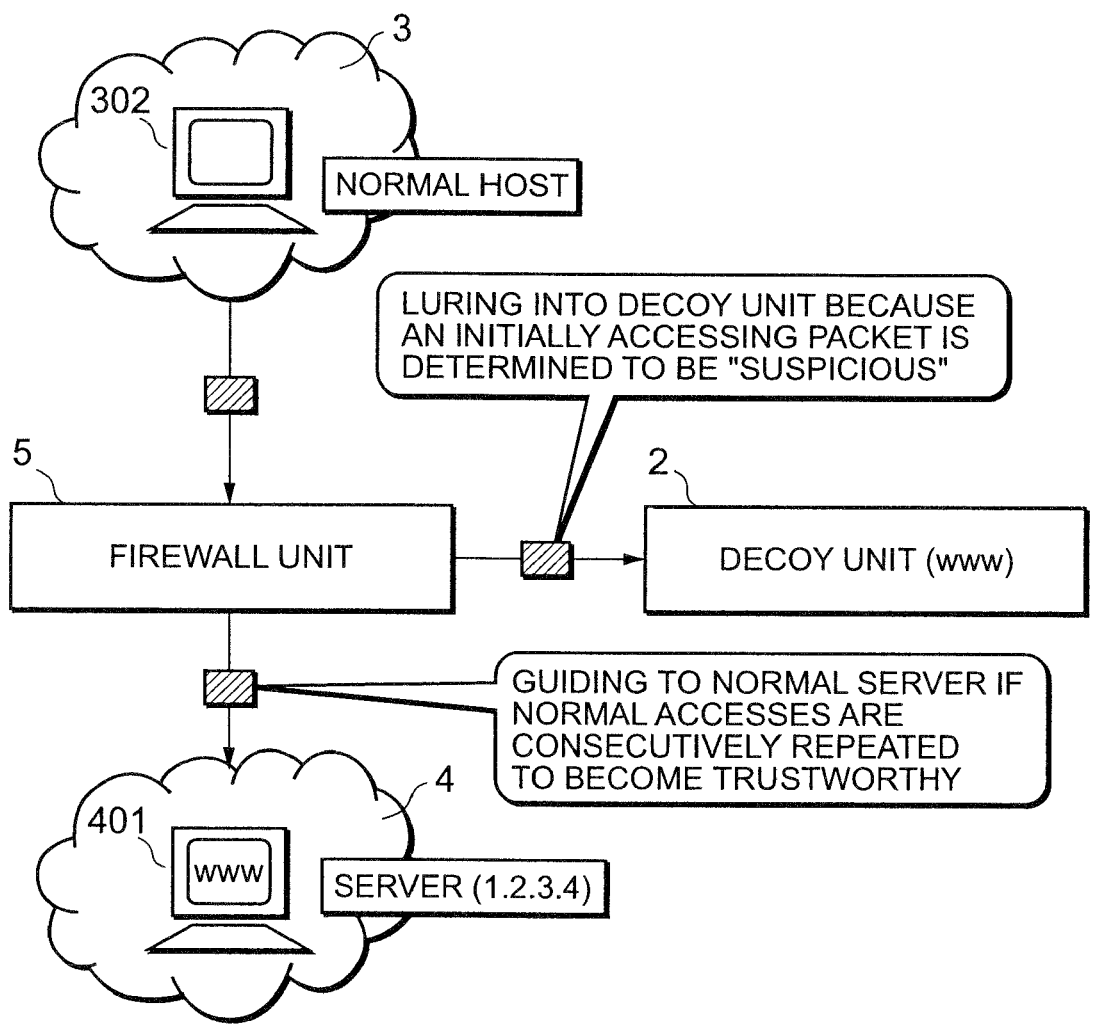
FIG. 21 is a network diagram showing the specific operation of the attack defending system according to the second embodiment.

FIGS. 19-21 are network diagram for describing specific operation of an attack defending system according to the embodiment.

As shown in FIG. 19, consider that the attack-source host 301 on the Internet 3 carries out DoS attack such as Ping Of Death with the purpose of stopping the operation of the server 401 on the internal network 4.

In this case, when the confidence level for the IP address "12. 34. 56. 78" of the attack-source host 301 is lower than the threshold preset in the guiding section 501, an IP packet causing the DoS attack is lured into the decoy unit 2 and therefore the server 401 is protected as shown in FIG. 20. It is considered that the malicious person who tries to make DoS attacks usually will start the attack a while after he/she has determined the target. Therefore, the protection of the server 401 can be effectively protected by the decoy unit 2 when the threshold value is set to a sufficiently large value.

In the case where accesses are made from ordinary users (i.e., bearing no malice of attacking), services by the server 401 on the internal network 4 can be carried out safely. For example, as shown in FIG. 21, when an access to the server 401 is made from an ordinary host 302 on the Internet 3, as described before, the confidence level for the IP address of the ordinary host 302 is evaluated by the confidence management section 502 of the firewall unit 5.

If the confidence of the ordinary host 302 is insufficient, the host 302 is determined to be "suspicious" by the guiding section 501 and IP packets constituting this access are guided to the decoy unit 2. In this case, the decoy unit 2 has been set such that the same processes as the WWW services on the server 401 are executed by the processor 201 of the decoy unit 2. That is, the decoy unit 2 acts as a mirror server of the server 401. More specifically, in the case of WWW services, files such as HTML files and JPEG files are copied to the decoy unit 2. Therefore, the ordinary host 302 can obtain services that it has aimed at. Since attacks are not detected in the decoy unit 2 while normal accesses are being made, the confidence level for the IP address of the ordinary host 302 increases according to the above-described confidence updating method and will exceed the threshold value T sooner or later. After the confidence level c has exceeded the threshold value T, the IP packets of the access from the ordinary host 302 are guided to the server 401 on the internal network 4.

By such operation, as to the accesses from an ordinary user that is trusted, the server 401 responses all of them. Therefore, the system in the embodiment has an advantage that the ordinary user that is trusted can receive services continuously from the server 401 even when the decoy unit 2 receives attacks and thereby stops operating.

The decoy unit 2 may be set completely as a mirror server of the server 401 or, for example, the decoy unit 2 may be set such that it provides only general services except for important services that require user authentication.

Third Embodiment

Figure 22:
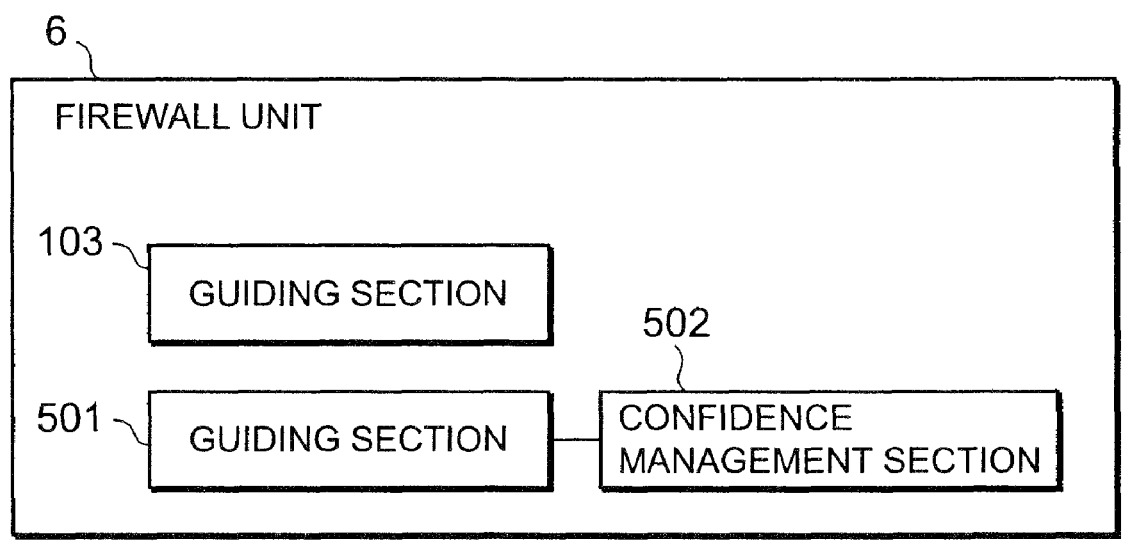
FIG. 22 is a block diagram showing the schematic structure of a firewall unit of an attack defending system according to a third embodiment of the invention.
Figure 23:
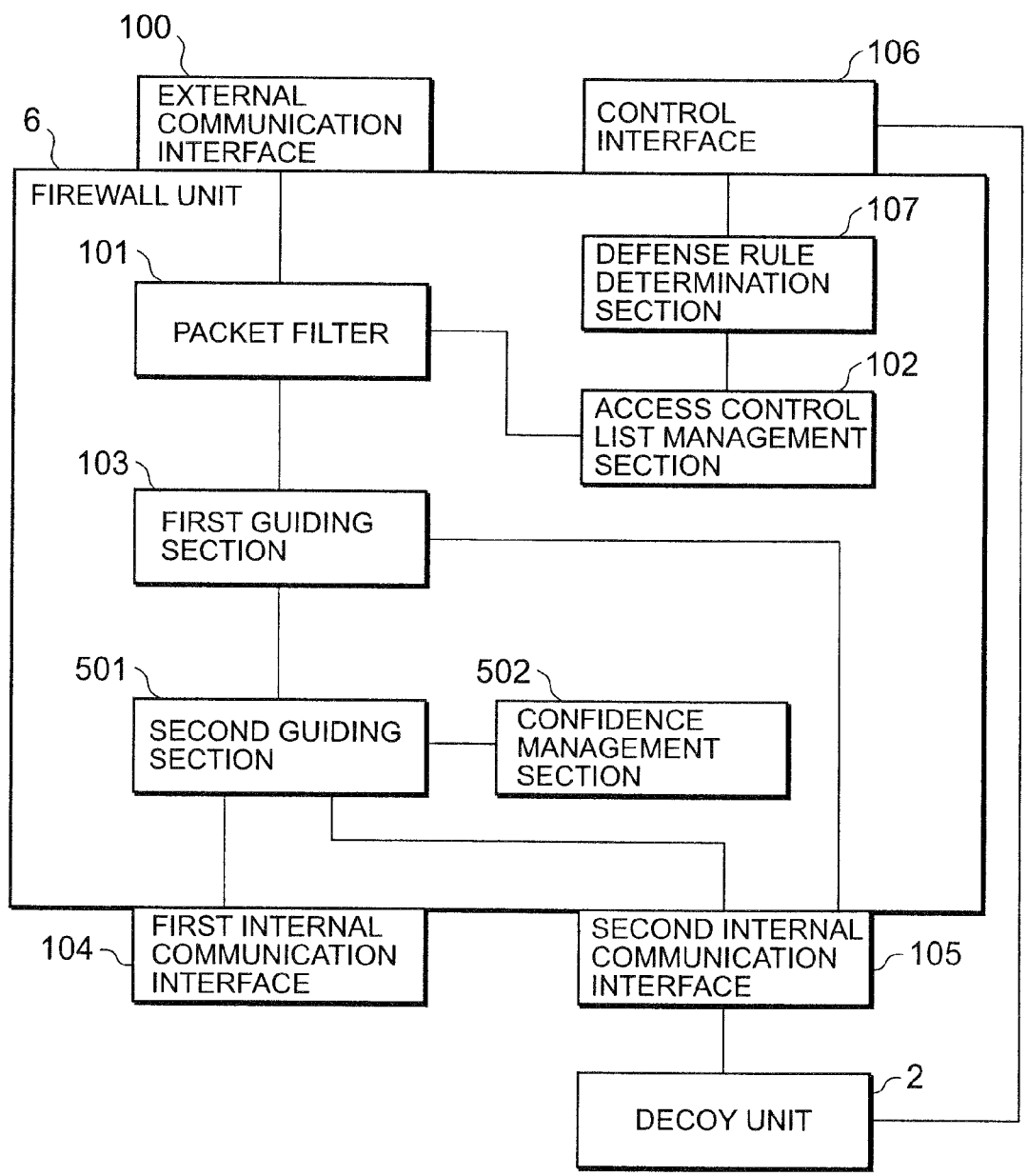
FIG. 23 is a detailed block diagram showing an example of the firewall unit of the attack defending system according to the third embodiment.

FIG. 22 shows a firewall unit of an attack defending system according to a third embodiment of the invention and FIG. 23 shows an example of the firewall unit. A firewall unit 6 in the third embodiment has the guiding section 501 and the confidence management section 502 which are connected as shown in FIG. 15 in addition to the guiding section 103 in the firewall unit 1 as shown in FIG. 2.

More specifically, as shown in FIG. 23, a second guiding section 501 may be provided as a subsequent stage of a first guiding section 103. To the contrary, the second guiding section 501 may be provided as a previous stage of the first guiding section 103.

In either of these structures, effective protection can be achieved against worm-like attacks carried out by randomly selecting IP addresses and active targeting attacks. Furthermore, even when a host is infected with a worm after the host has been trusted by the second guiding section 501, the decoy unit 2 can inspect whether an attack is present or not.

Fourth Embodiment 4.1) Structure

Figure 24:
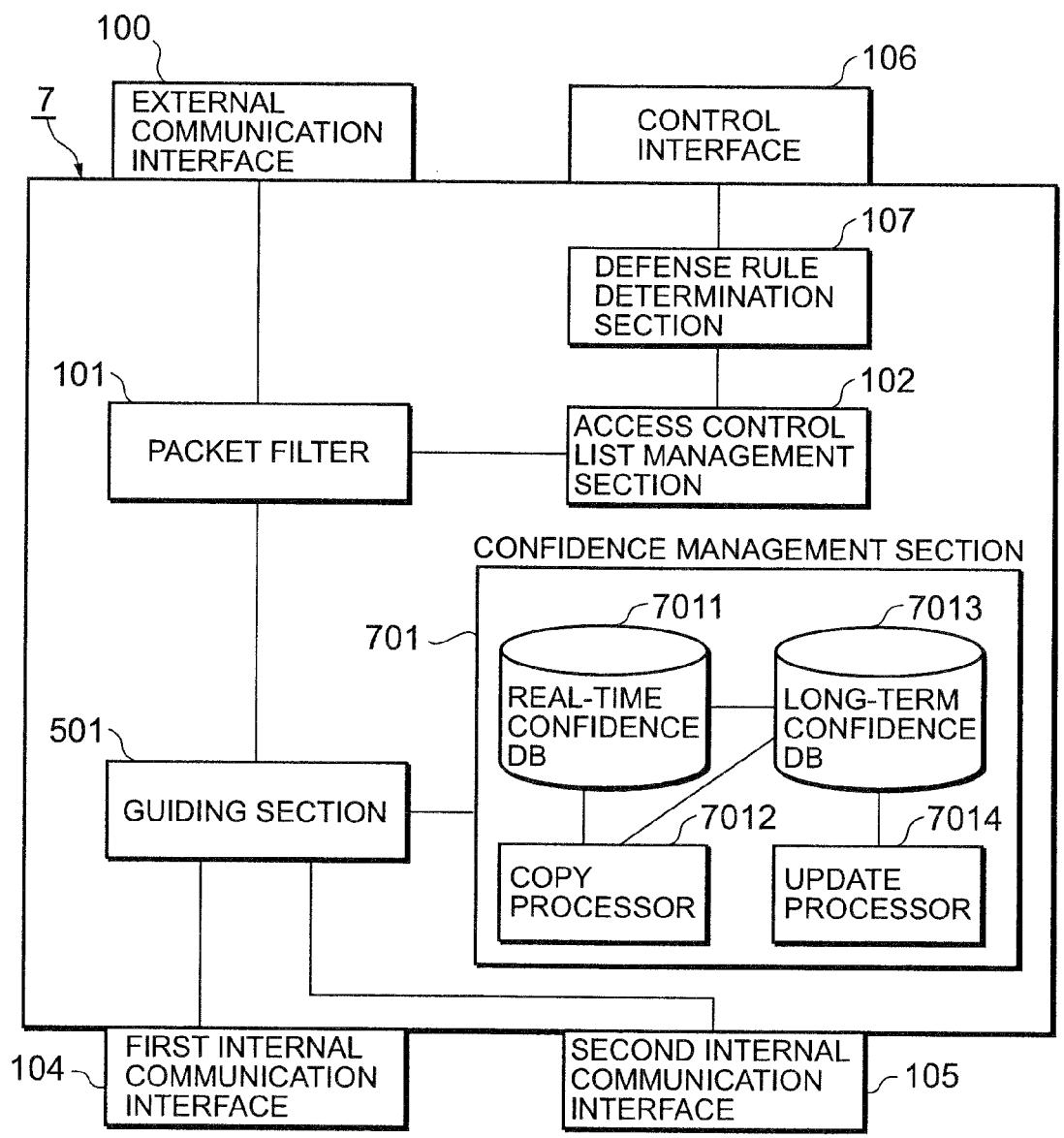
FIG. 24 is a block diagram showing an example of a firewall unit of an attack defending system according to a fourth embodiment of the invention.

FIG. 24 shows a firewall unit of an attack defending system according to a fourth embodiment of the invention and FIG. 23 shows an example of the firewall unit. A firewall unit 7 in the fourth embodiment is provided with a confidence management section 701 instead of the confidence management section 502 in the firewall unit 5 as shown in FIG. 15. Other blocks similar to those previously described with reference to FIG. 15 are denoted by the same reference numerals and descriptions thereof will be omitted.

As shown in FIG. 24, the confidence management section 701 includes a real-time confidence database 7011, a copy processor 7012, a long-term confidence database 7013 and an update processor 7014.

The real-time confidence database 7011 manages a set of combinations of an IP address, a confidence level and a last update time corresponding to the IP address. When a query including an IP address is made from the guiding section 501, the real-time confidence database 7011 returns a confidence level corresponding to the IP address of the query. The copy processor 7012 copies the contents of the real-time confidence database 7011 to the long-term confidence database 7013 at regular time intervals.

The long-term confidence database 7013 manages a set of combinations of an IP address, a confidence level and a last update time corresponding to the IP address. The update processor 7014 searches the long-term confidence database 7013 at regular time intervals. When an old entry is found in the long-term confidence database 7013 such that a predetermined time period has elapsed after the last update of the old entry, the update processor 7014 performs the confidence updating by decreasing a corresponding confidence level.

4.2) Confidence Management

Basically, the filtering of input IP packets and the guiding to one of the decoy unit 2 and the internal network 3 are similar to those of the firewall unit 5 of the second embodiment (Steps A1-A2, C1-C3 and A4-A8 as shown in FIG. 16). However, the confidence management section 701 of the fourth embodiment performs the following confidence management concurrently with the packet processing.

Figure 25:
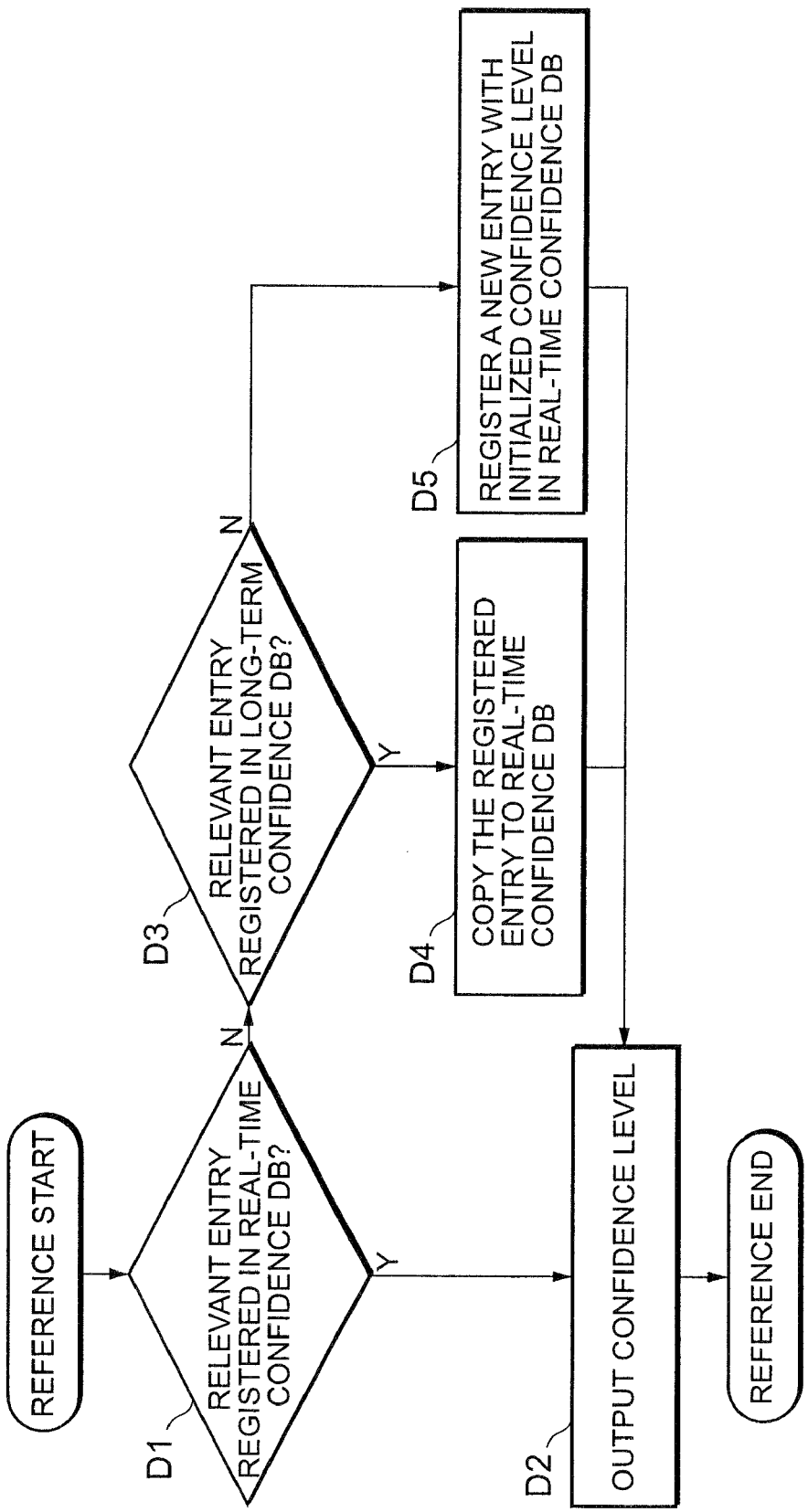
FIG. 25 is a flowchart showing a confidence referencing process in a confidence management section 701.

Referring to FIG. 25, when the retrieval starts at Step C1 shown in FIG. 16, the confidence management section 701 determines whether an entry corresponding to the given IP address has been registered in the real-time confidence database 7011 (Step D1). When the entry corresponding to the given IP address is registered (Y of Step D1), the confidence level corresponding to the given IP address is outputted to the guiding section 501 (Step D2).

On the other hand, when the entry corresponding to the given IP address is registered in the real-time confidence database 7011 (N of Step D1), it is further determined whether the entry corresponding to the given IP address is registered in the long-term confidence database 7013 (Step D3). If the entry in question is registered in the long-term confidence database 7013 (Y of Step D3), then the contents of the entry in question (IP address, confidence level and the last update time) are copied to the real-time confidence database 7011 (Step D4) and then the confidence level corresponding to the IP address is outputted to the guiding section 501 (Step D2). If the entry in question is not registered in the long-term confidence database 7013 (N of Step D3), a new entry is added to the real-time confidence database 7011 with a predetermined initial confidence level (Step D5) and outputs the confidence level to the guiding section 501 (Step D2).

When the confidence level has been updated at Step C2 shown in FIG. 16, the confidence management section 701 registers update time in addition to the IP address and the updated confidence level onto the real-time confidence database 7011.

4.3) Copy of Real-Time Confidence

Concurrently with the above-described processing, the copy processor 7012 scans all the contents of the real-time confidence database 7011 at regular time intervals (for example, daily) to copy each entry to the long-term confidence database 7013. In this processing, the copy processor 7012 checks the last update time of each entry. When it is found that the update processing has not been performed for a predetermined time period or longer (for example, one week), the entry may be deleted from the real-time confidence database 7011.

4.4) Update of Long-Term Confidence

The update processor 7014 scans all the contents of the long-term confidence database 7013 at regular time intervals (for example, daily). In this processing, the update processor 7014 checks the last update time of each entry and, when it is found that the update processing has not been performed for a predetermined time period or longer (for example, one week) the confidence level of the entry is decreased by a predetermined amount. Alternatively, the entry may be deleted from the long-term confidence database 7013.

4.5) Advantages

The above-described operation allows the storage capacity of the real-time confidence database 7011 to be suppressed and thereby a small-capacity and high-speed storage device such as an SDRAM can be employed. On the other hand, since the access frequency of the long-term confidence database 7013 is small, a large-capacity and low-speed storage device such as a hard disk device can be employed.

By the update processor 7014 updating the long-term confidence database 7013, even a source IP address having obtained once a sufficient confidence level can be regarded as "suspicious" again if the accessing of the source IP address has been ceased for a predetermined time period or longer. Accordingly, it is advantageous to automatically re-evaluate the confidence of the source IP address, especially when the use environment of the host corresponding to the source IP address changes drastically, for example, in the case of trading used PCs.

Fifth Embodiment

As a fifth embodiment of the invention, a firewall unit uses the confidence management section 701 in the fourth embodiment as described above, instead of the confidence management section 502 shown in FIG. 23. The basic structure is the same as that in FIG. 23, and the structure and operation of the confidence management section 701 are similar to those described in the fourth embodiment referring to FIGS. 24 and 25. therefore, detailed descriptions of the fifth embodiment are omitted.

Sixth Embodiment 6.1) Structure

Figure 26:
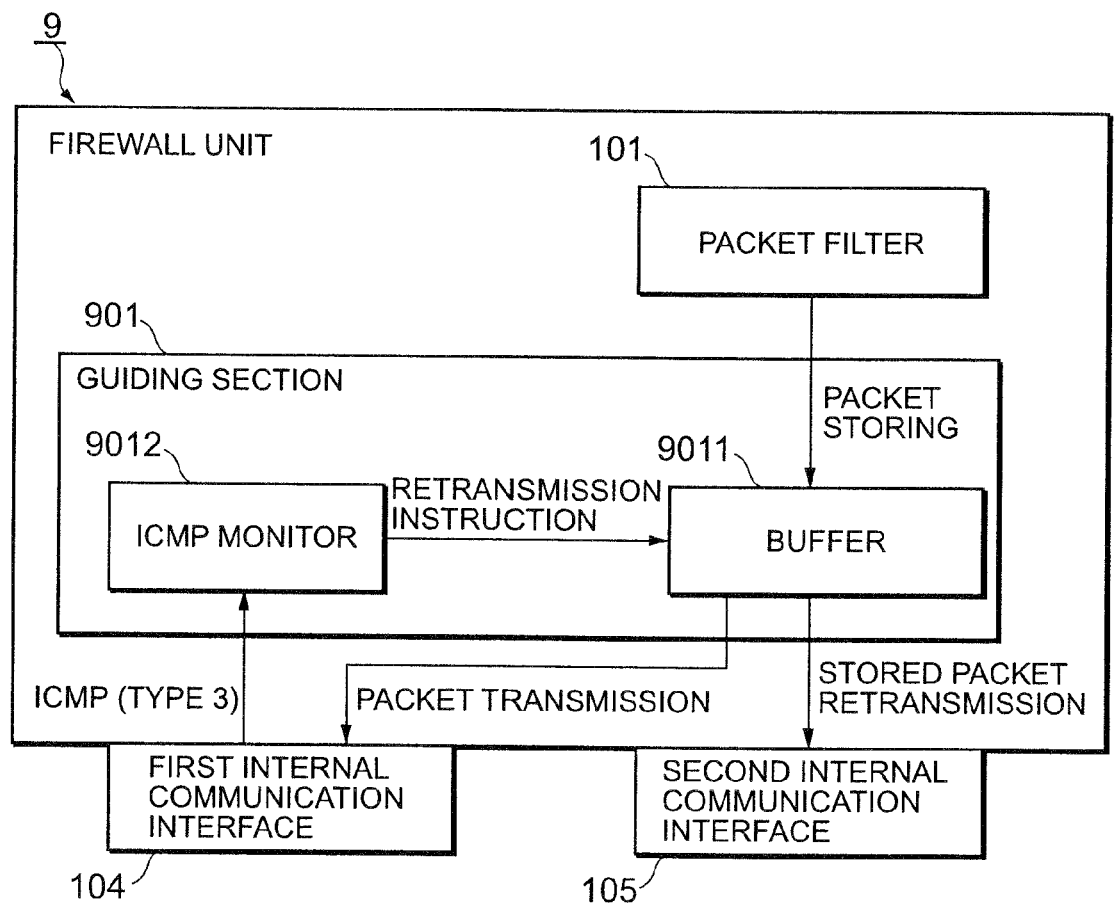
FIG. 26 is a schematic block diagram showing a firewall unit 9 of an attack defending system according to a sixth embodiment of the invention.

FIG. 26 shows a firewall unit 9 of an attack defending system according to a sixth embodiment of the invention. The firewall unit 9 is provided with a guiding section 901, instead of the guiding section 103 in the firewall unit 1 of the first embodiment. The guiding section 901 is comprised of a buffer 9011 and an ICMP monitor 9012. In the sixth embodiment, an ICMP packet is used to implement the same function as that of the guiding list employed in the first embodiment. For the purpose of simplification, other blocks are omitted in FIG. 26.

As described later, the buffer 9011 temporarily accumulates packets received from the packet filter 101 and forwards them to the internal network through the first internal communication interface 104. Further, at a request of the ICMP monitor 9012, the buffer 9011 retransmits the accumulated packets to the decoy unit 2 through the second internal communication interface 105. The ICMP monitor 9012 monitors reception of an ICMP packet through the first internal communication interface 104 and, when a specific ICMP error packet has been received, instructs the buffer 9011 to appropriately retransmit an packet. Hereinafter, the operation of the sixth embodiment will be described in detail.

6.2) Operation

Figure 27:
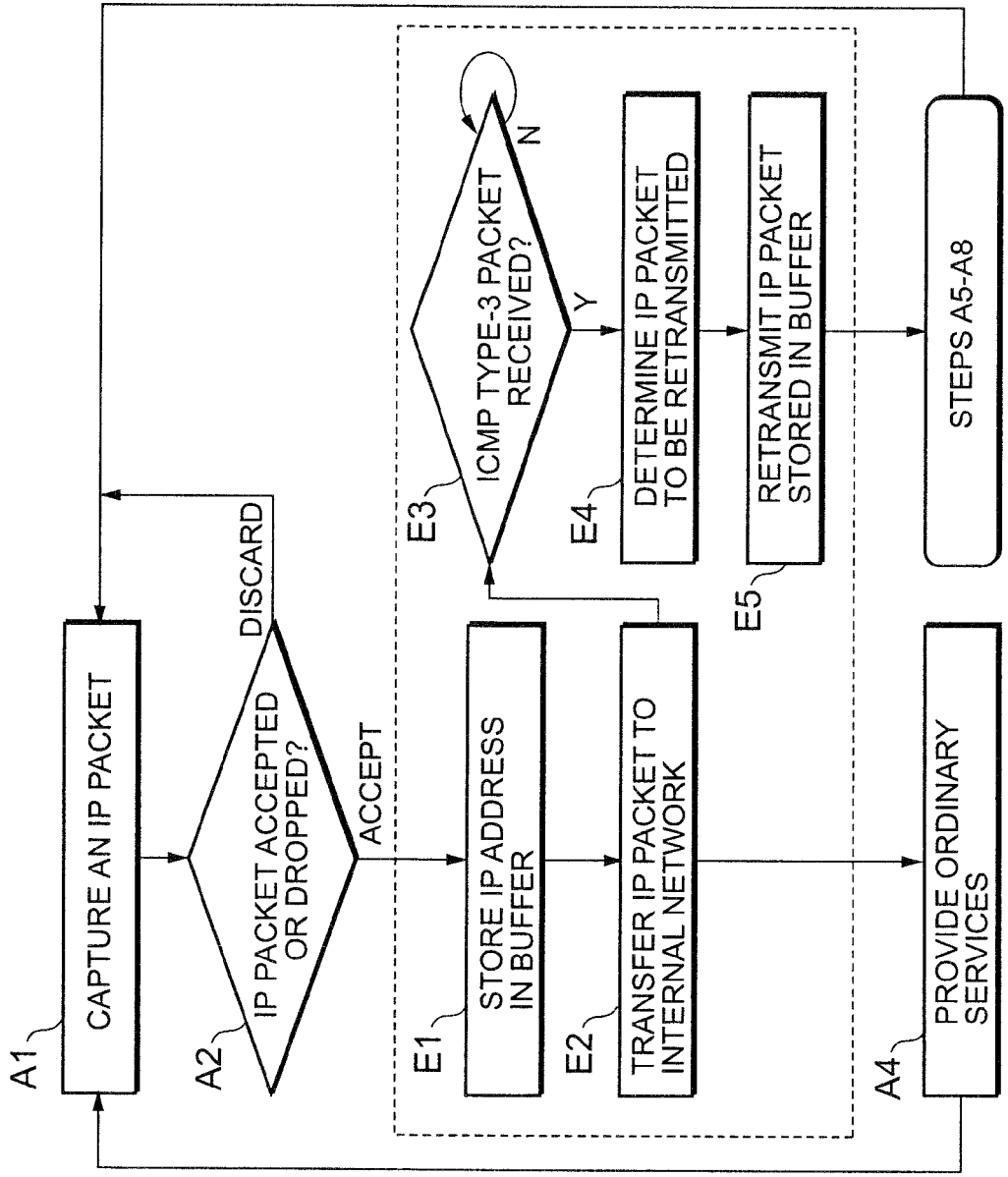
FIG. 27 is a flowchart showing the operation of a firewall unit 9 according to the sixth embodiment.

FIG. 27 shows the operation of the firewall unit 9 according to the embodiment. Similarly to the firewall unit 1 of the first embodiment, when having received an input IP packet from the Internet 3 (Step A1), the packet filter 101 accepts or drops the input IP packet according to an access control rule held in the access control list management section 102 (Step A2).

If accepted, the IP packet is accumulated in the buffer 9011 of the guiding section 901 (Step E1) and is unconditionally sent out to the internal network 4 through the first internal communication interface 104 (Step E2). Thereafter, the regular services are provided (Step A4). In this case, even suspicious packets are also transferred to the internal network. However, since an attacking element is not contained in a SYN packet which is transmitted for establishment of TCP connection before carrying out of actual attacks, only SYN packets can be accepted without problems. If a SYN packet does not reach its destination on the internal network, an ICMP packet (of message type 3) informing that the SYN packet cannot reach its destination is returned.

When an ICMP packet (described in RFC792) has been received by the first internal communication interface 104, the ICMP monitor 9012 refers to the contents of the ICMP packet to check whether it indicates Destination Unreachable (i.e., ICMP type 3) (Step E3). When the ICMP packet indicates Destination Unreachable (Y of Step E3), the ICMP monitor 9012 further refers to the IP header and uses at least the source IP address or the destination IP address to instruct the buffer 9011 to retransmit (Step E3). If it is another message, the ICMP monitor 9012 does nothing and continues monitoring.

When having received the re-transmission request, the buffer 9011 extracts a packet to be retransmitted from the accumulated packets according to at least the source IP address or the destination IP address (Step E4) and retransmits it to the decoy unit 2 through the second internal communication interface 105 (Step E5). Thereafter, the steps A5-A8 already described are executed.

As described above, by utilizing packets for establishing a connection, which does not include any attack elements, an input IP packet addressed to an unused IP address can be automatically guided to the decoy unit 2 without a guiding list composed of unused IP addresses on the internal network 3.

Seventh Embodiment 7.1) Structure

Figure 28:
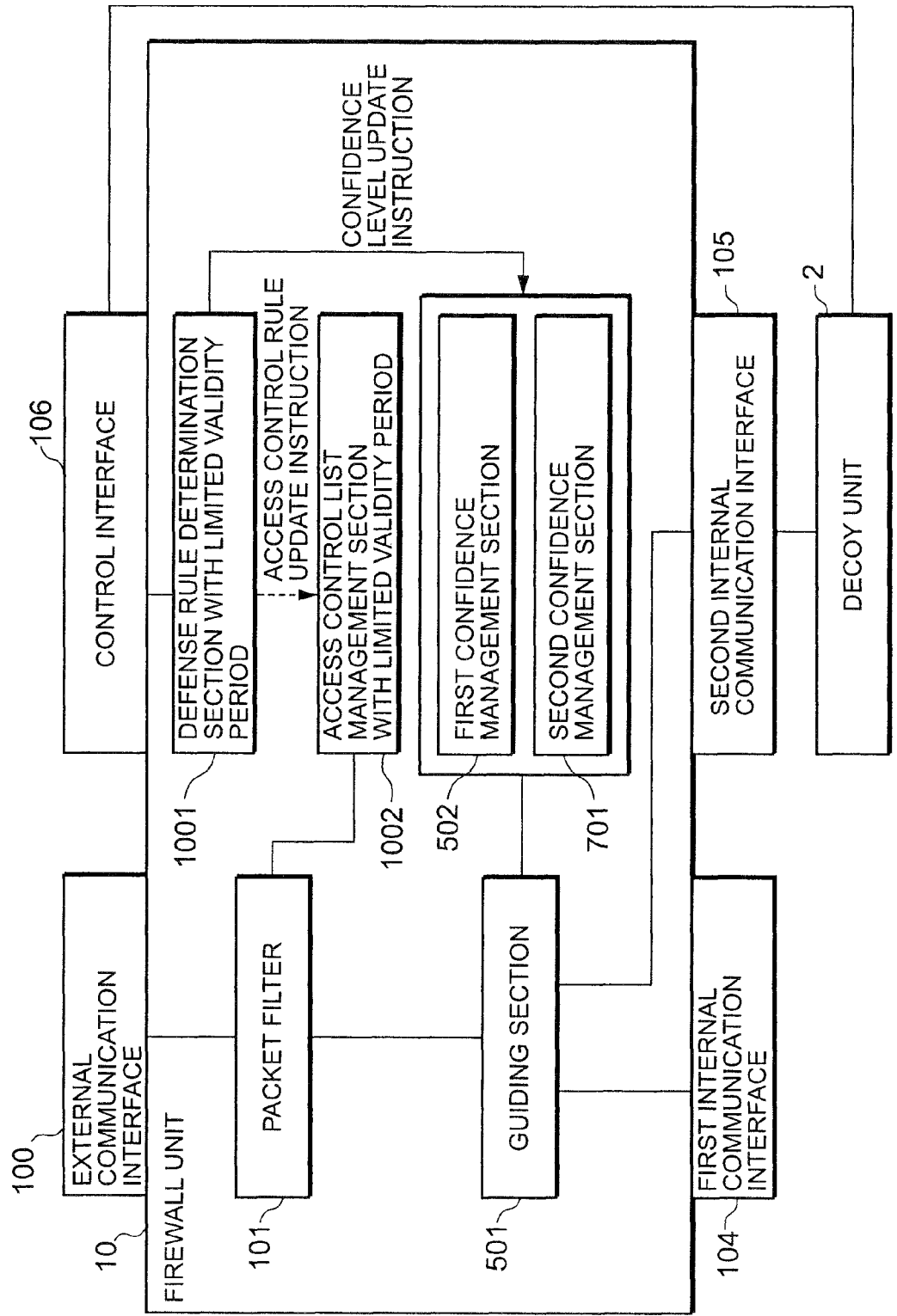
FIG. 28 is a schematic block diagram showing a firewall unit 10 of an attack defending system according to a seventh embodiment of the invention.

FIG. 28 shows a firewall unit 10 of an attack defending system according to a seventh embodiment of the invention. The firewall unit 10 is provided with a defense rule determination section 1001 with a limited validity period and an access control list management section 1002 with a limited validity period, instead of the defense rule determination section 107 and the access control management section 102 of the firewall unit in the second to the fifth embodiments described above.

The defense rule determination section 1001 instructs the confidence management sections 502 and 701 to reset a corresponding confidence level depending on an alert received from the decoy unit 2 through the control interface 106. The defense rule determination section 1001 determines an access control rule to be updated depending on the alert and instructs the access control list management section 1002 to update the rule.

The confidence management sections 502 and 701 receive the update instruction from the defense rule determination section 1001, updates a corresponding confidence level, and outputs the new confidence level to the guiding section 501. When receiving the update instruction from the defense rule determination section 1001, the access control list management section 1002 updates the access control list and outputs an access control rule in response to the request from the packet filter 101.

7.2) Operation

The operation of the attack defending system according to the seventh embodiment will be described in detail.

First, an input IP packet arrived from the Internet 4 is guided to the decoy unit 2 by the firewall unit 10, and when an attack made by the input IP packet is detected by the decoy unit 2, an alert informing of attack detection is sent back to the firewall unit. These steps are the same as those in the attack defending system according to the second to the fifth embodiments as shown in Steps A1 to A7 in FIG. 16.

The defense rule determination section 101 of the firewall unit 10 has defense rules for updating confidence levels previously provided therein, which is difference from the defense rule determination section 107. It is assumed that a description having a format such as the next formula (6) means that a confidence level is decremented by one:

$$\text{RECON:c}(\${\text{SOURCE\_IP\_ADDRESS}\})\text{-=}1 \quad (6).$$

For example, when having received an alert denoting the source IP address "12. 34. 56. 78" through the control interface 106, the defense rule determination section 1001 interprets it as subtracting one (1) from the confidence level for the IP address "12. 34. 56. 78" and instructs the confidence management section 502/701 to decrement the corresponding confidence level by one. In other words, when having received an alert, the confidence level of the source IP address included in the alert is decreased. Since the confidence management section 502 updates confidence as described for the second embodiment and the confidence management section 701 updates confidence as described for the fourth embodiment, more precise confidence management can be achieved by adding the above-described confidence reduction process.

In the firewall unit 10, similarly to the defense rule determination section 107, a defense rule may be set in the defense rule determination section 1001 as a model of an access defense rule. However, on this case, the access defense rule may have a field representing "validity period" newly described therein (therefore, it can be described in the defense rule). For example, as shown in the next formula (7), a limitation as "valid for seven (7) days" can be added by adding a term of EXPIRE to the defense rule of the above-described formula (1).

$$\text{INTRUSION: (SRC:\${SOURCE\_IP\_ADDRESS\},} \\ \text{DST:*, PROC:DROP, EXPIRE:+7DAY)} \quad (7)$$

Therefore, when the defense rule determination section 1001 has received an alert through the control interface 106, the defense rule determination section 1001 creates an access control rule as shown in the next formula (8) in the same manner as the defense rule determination section 107 does and outputs it to the access control list management section 1002.

$$\text{(SRC:12.34.56.78, DST:*, PROC:DROP, EXPIRE:+} \\ \text{7DAY)} \quad (8)$$

Next, the access control list management section 1002 adds the access control rule received from the defense rule determination section 1001, to the access control list database 1021. At this moment, in the case where an EXPIRE field is described in the access defense rule as shown in the formula (8), the access control list management section 1002 updates the database using the time obtained by adding the value designated in the EXPIRE field to the current time (corresponding to Step A8 in FIG. 7).

Figure 29:
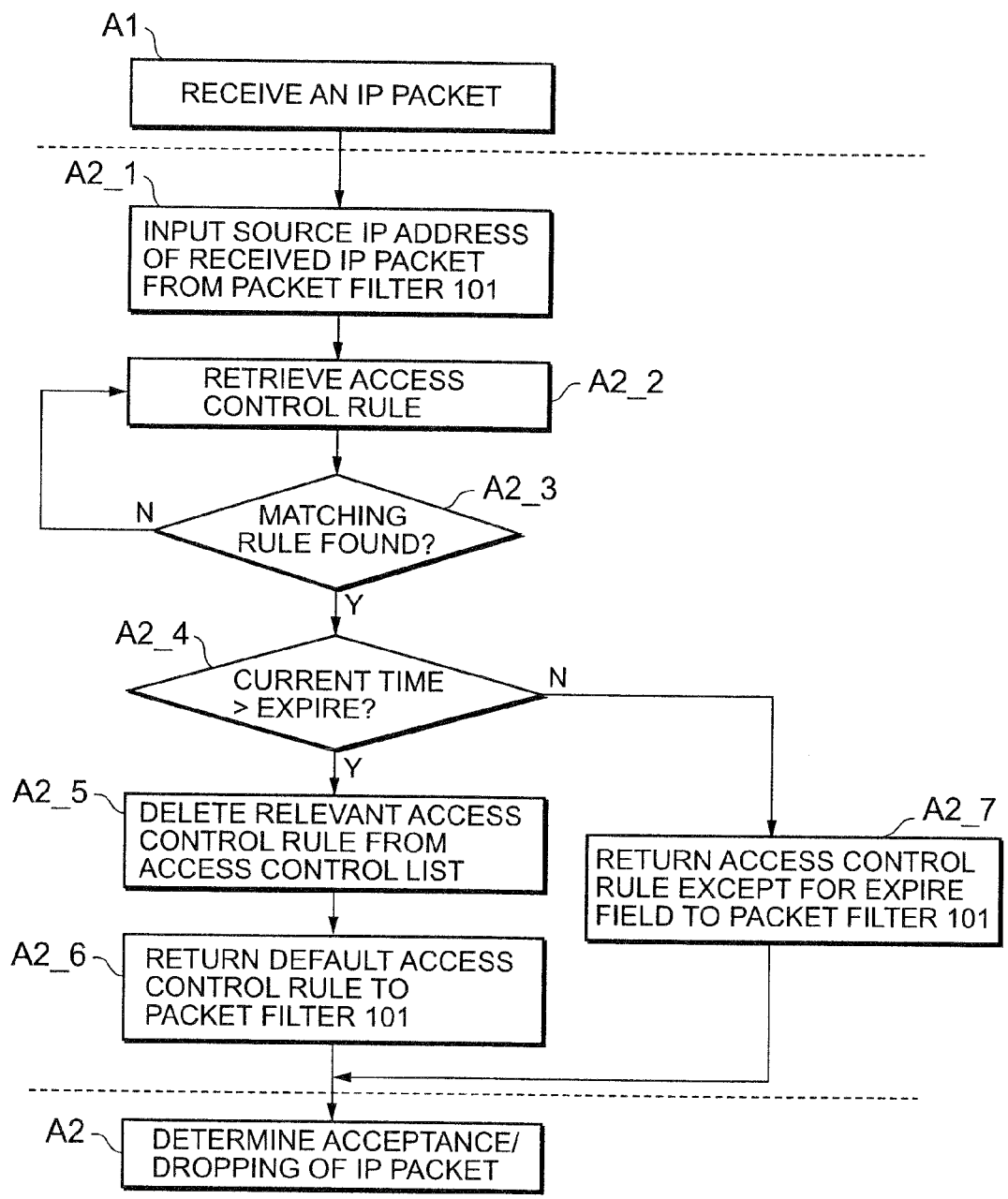
FIG. 29 is a flowchart showing a management operation of an access control list management section 1002.

FIG. 29 shows a management operation of the access control list management section 1002. When the firewall unit 10 receives an IP packet again from the same source address "12. 34. 56. 78" after the access control list database 1021 has been updated, the packet filter 101 transmits the source IP address to the access control list management section 1002 to request the transmission of an access control rule (Step A2_1).

The access control list management section 1002 retrieves an access control rule corresponding to the source IP address (Steps A2_2 and A2_3). When having extracted the access control rule corresponding to the formula (8), the access control list management section 1002 compares the validity period described in the EXPIRE field with the current time (Step A2_4).

When the present time exceeds the validity period (Y of Step A2_4), the access control rule is deleted from the access control list database 1021 (Step A2_5) and the default access control rule is returned to the packet filter 101 (Step A2_6). To the contrary, when the validity period has not been expired (N of Step A2_4), an access control rule from which an EXPIRE field as shown in the next formula (9) is removed is returned to the packet filter 101 (Step A2_7).

$$\text{(SRC:12. 34. 56. 78, DST:*, PROC:DROP)} \quad (9)$$

Using the access control rule obtained as described above, the packet filter 101 determines whether to accept/drop the received IP packet (Step A2).

As described above, a more precise countermeasure can be taken as a defense method after the decoy unit detects an attack. Specifically, an attacker generally makes an attack corresponding to "reconnaissance" such as port scanning or Traceroute as a preparation for an attack corresponding to "intrusion" or "destruction". However, it is known well that all the accesses detected as "reconnaissance" are not always attacks. Therefore, permanent access blocking as a defense method against "reconnaissance" may result in disadvantages.

According to the seventh embodiment, the access blocking with a time limit is made using an access control rule with a limited validity period. Otherwise, as described above, the following method can be used. A confidence level is caused not to exceed the threshold value T (see FIG. 17) by reducing the confidence level that has been accumulated so far by the occurrences of alerts. This causes input IP packets to be continuously guided to the decoy unit. Thereafter, when detecting an attack corresponding to "intrusion" or "destruction", the permanent access blocking is made active.

Eighth Embodiment

Figure 30:
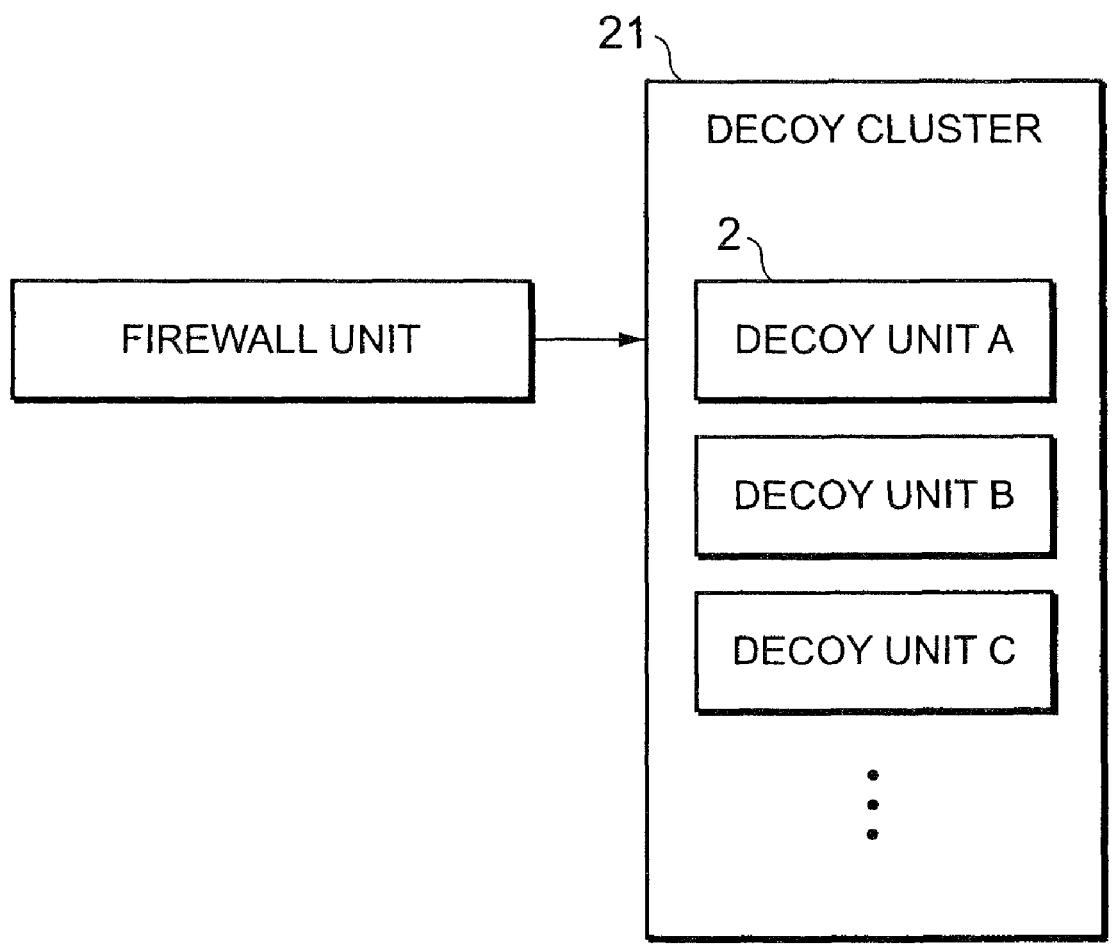
FIG. 30 is a schematic diagram showing an attack defending system according to an eighth embodiment of the invention.

FIG. 30 shows an attack defending system according to an eighth embodiment of the invention. In the eighth embodiment, a decoy cluster 21 including two or more decoy units 2 is provided instead of a single decoy unit 2.

Each decoy unit 2 in the eighth embodiment is adapted to provide counterfeit services only to packets having a specific destination IP address or packets having a specific port number.

By arranging as above, it is possible to provide a plurality of decoy units 2 which are in a one-to-one correspondence with specific servers on the internal network 4, or to provide a decoy unit 2 for providing specific counterfeit services. Therefore, it is possible to provide services closer to those of the regular servers to attackers. Further, Provided with normal operation definitions for specific services, the operability can be improved.

Ninth Embodiment

A firewall unit in a ninth embodiment is further provided with an outgoing packet guiding section in addition to the guiding sections described in the first to the eighth embodiments. The outgoing packet guiding section performs the above-described packet filtering and guiding to the decoy unit for outgoing IP packets which are transmitted from the internal network 4 toward the Internet 5.

In the case where accesses to the Internet 4 are prohibited as an operation rule of the internal network 3, such an outgoing packet guiding section allows detection of unauthorized accesses from the internal network 4 toward the Internet 3 and to make a record of such detected accesses.

Tenth Embodiment

In the descriptions of the above first to ninth embodiments, the firewall unit and the decoy unit are implemented by functional blocks. However, the invention is not limited to those structures and the same functions can be realized by software.

Figure 31:
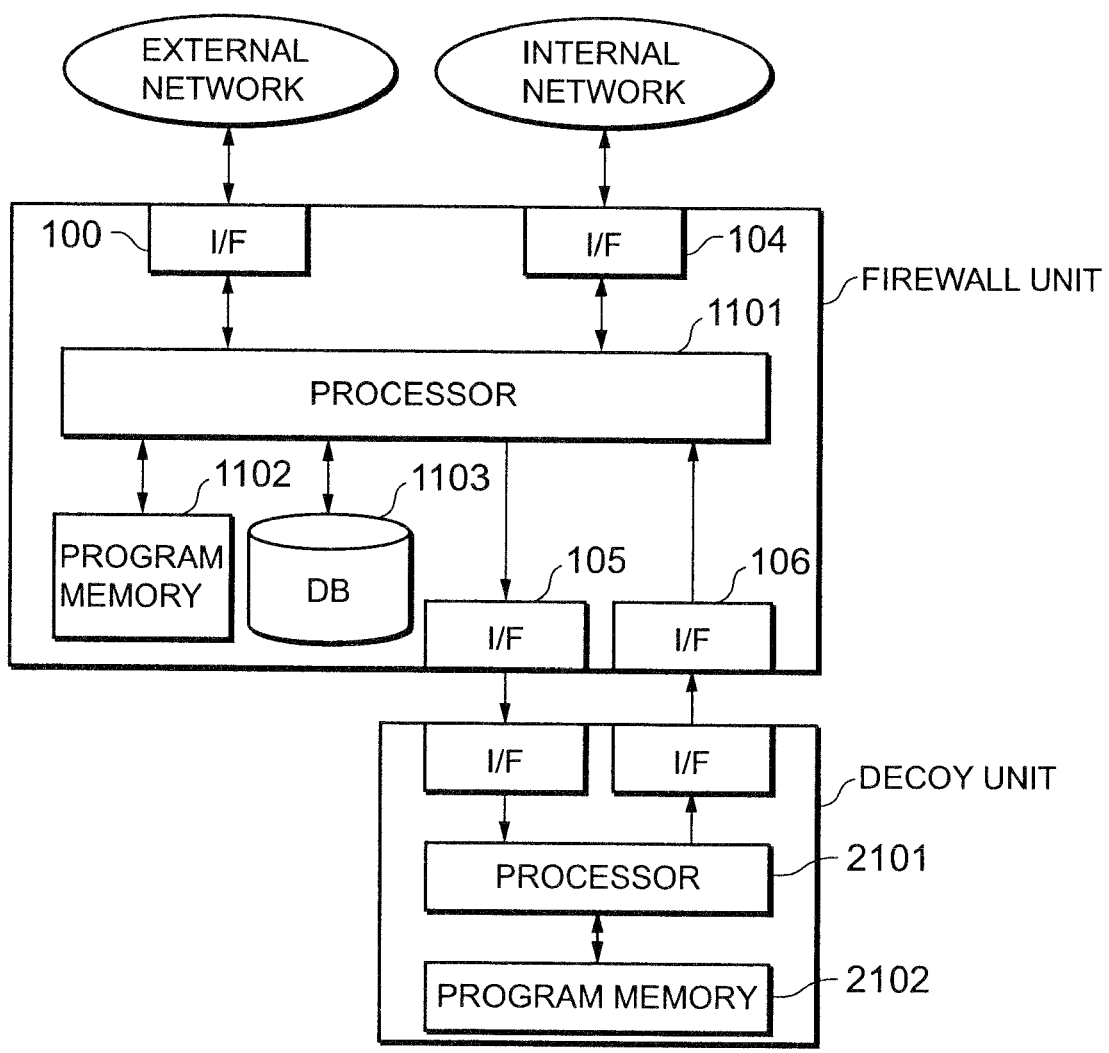
FIG. 31 is a schematic diagram showing an attack defending system according to a tenth embodiment of the invention.

FIG. 31 shows an attack defending system according to a tenth embodiment of the invention. A firewall unit of the tenth embodiment is provided with a program-controlled processor 1101, a program memory 1102 storing a set of programs realizing the functions in each of the above-described embodiments, a database 1103 storing the access control list database and the defense rule determination database, and various interfaces 100 and 104-106. Similarly, the decoy unit of the tenth embodiment is provided with a program-controlled processor 2101, a program memory 2102 storing a set of programs realizing a decoy unit described in the above-described first embodiment, and interfaces between the decoy unit and the firewall unit. A desired one of the attack defending systems according to the embodiments can be implemented by setting a corresponding set of programs in the program memory.

Eleventh Embodiment

In the above first to tenth embodiments, a firewall unit and a decoy unit are separately provided as individual units. However, the invention is not limited to such architecture. It is possible to design an attack defense system in one unit in terms of hardware. Such a single unit structure has advantages such as being easy to handle and easy to downsize.

Figure 32:
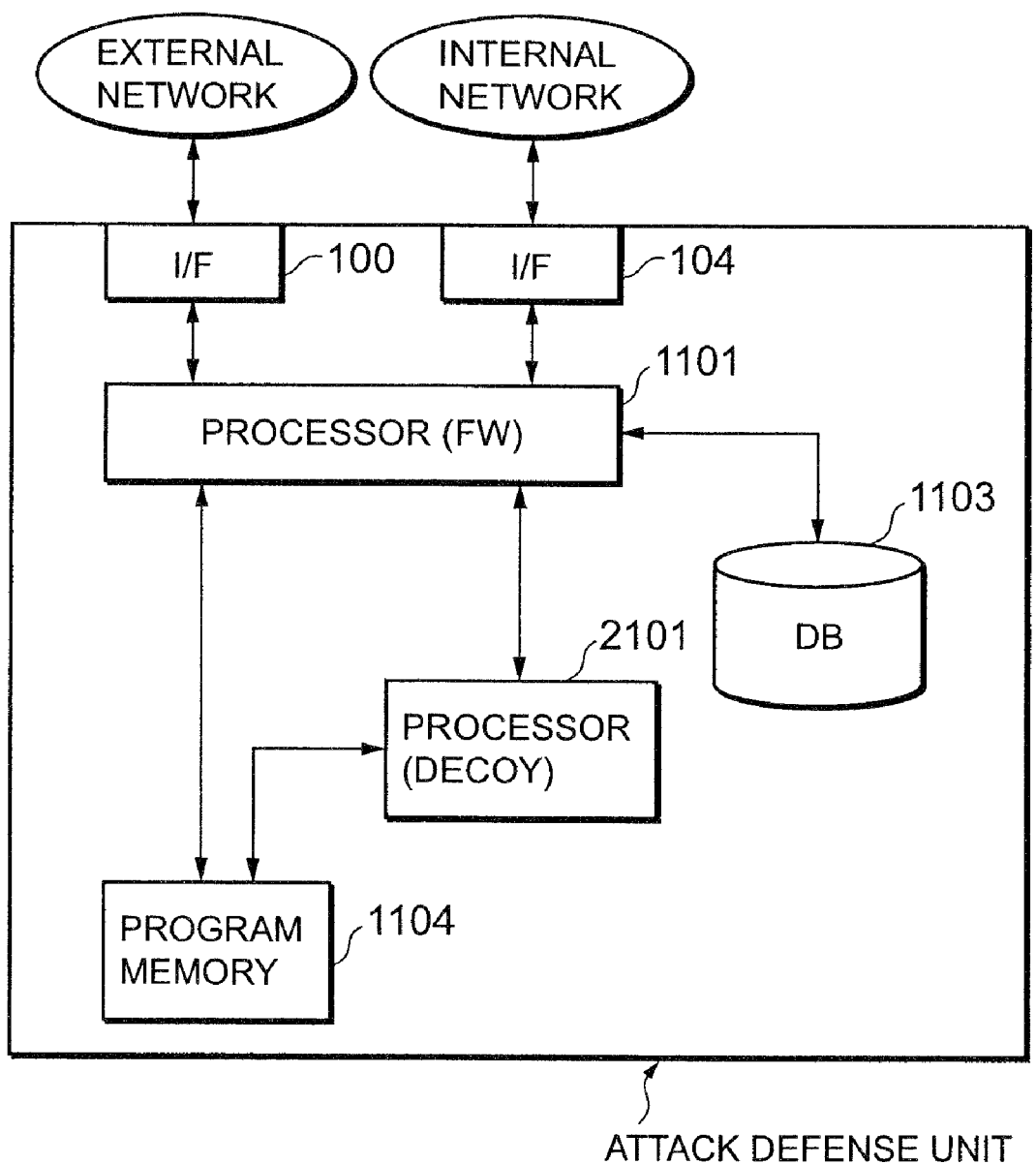
FIG. 32 is a schematic diagram showing an attack defending unit according to an eleventh embodiment of the invention.

FIG. 32 shows an attack defending unit according to an eleventh embodiment of the invention. The attack defending unit of the eleventh embodiment is provided with the program-controlled processor 1101 for a firewall, a program-controlled processor 2101 for a decoy, the database 1103 storing the access control list database and the defense rule determination database, a program memory 1104 storing a set of programs realizing the functions in each of the above-described embodiments, and various interfaces 100 and 104. A desired one of the attack defending systems according to the embodiments can be implemented by setting a corresponding set of programs in the program memory. Furthermore, the processor 1101 and the processor 2101 may be structured in one single processor.

Twelfth Embodiment 12.1) Structure

Figure 33:
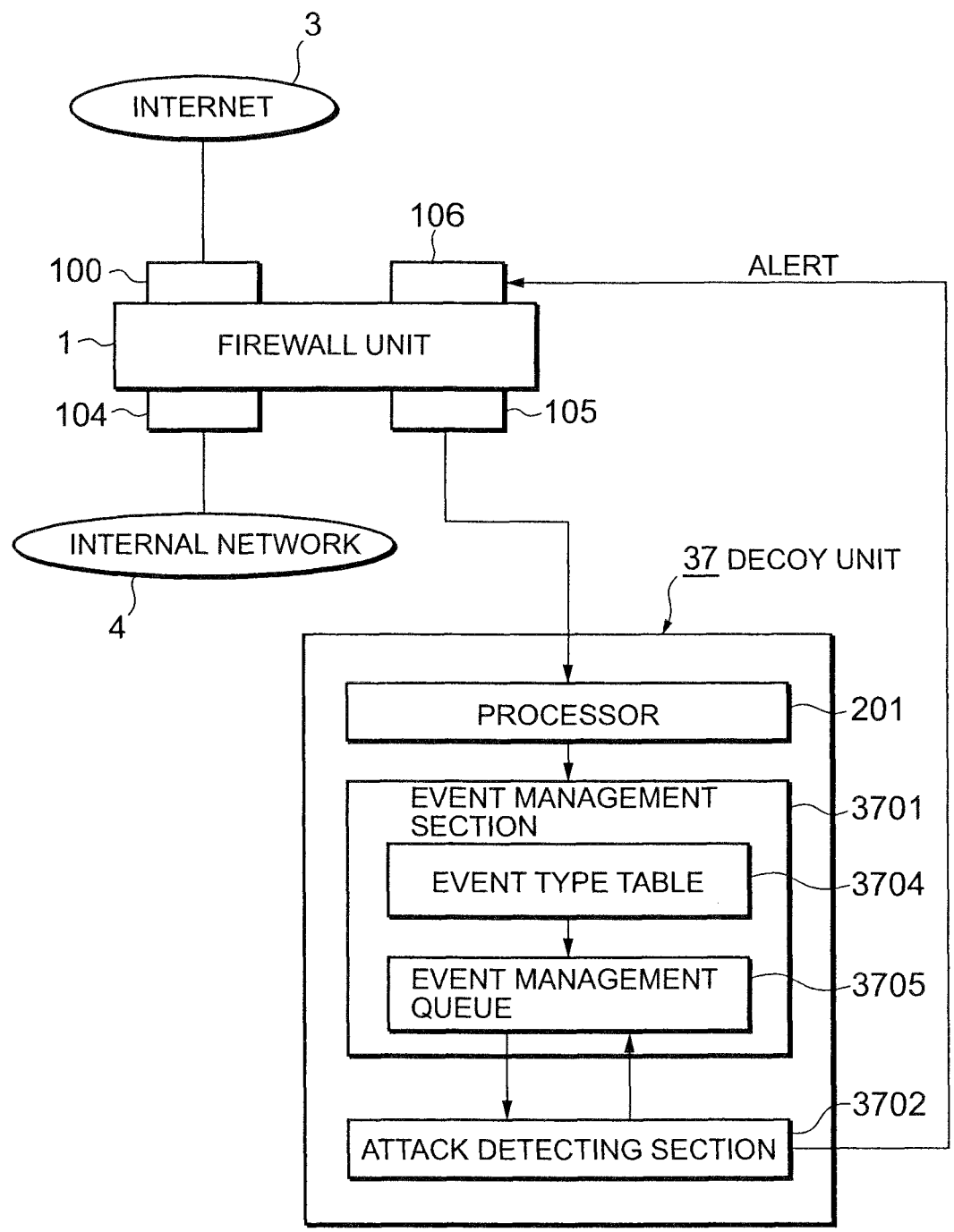
FIG. 33 is a block diagram showing the structure of a decoy unit according to a twelfth embodiment of the invention.

FIG. 33 shows a decoy unit 37 according to a twelfth embodiment of the invention. The decoy unit 37 is provided with an event management section 3701 and an attack detecting section 3702, instead of the attack detecting section 202 of the decoy unit 2 as described in the first to tenth embodiments.

The event management section 3701 inputs a processing status (hereinafter referred to as "event") from the processor 201 and stores it temporarily in a queue provided therein. In parallel, the event management section 3701 carries out linking between the event and the past event meeting a predetermined condition and outputs the event and the link to the attack detecting section 3702. In addition, when having received a link from the attack detecting section 3702, the event management section 3701 returns an event as the destination of the link or an event as the origin of the link, to the attack detecting section 3702.

The attack detecting section 3702 receives a combination of an event and a corresponding link from the event management section 3701 and compares the combination of event and link with predetermined attack detection rules to determine the presence or absence of attack while, as necessary, tracing links using the event management section 3701. When an attack is present, the attack detecting section 3702 transmits an alert to the firewall unit to notify of the presence of the attack.

12.2) Operation

Figure 34:
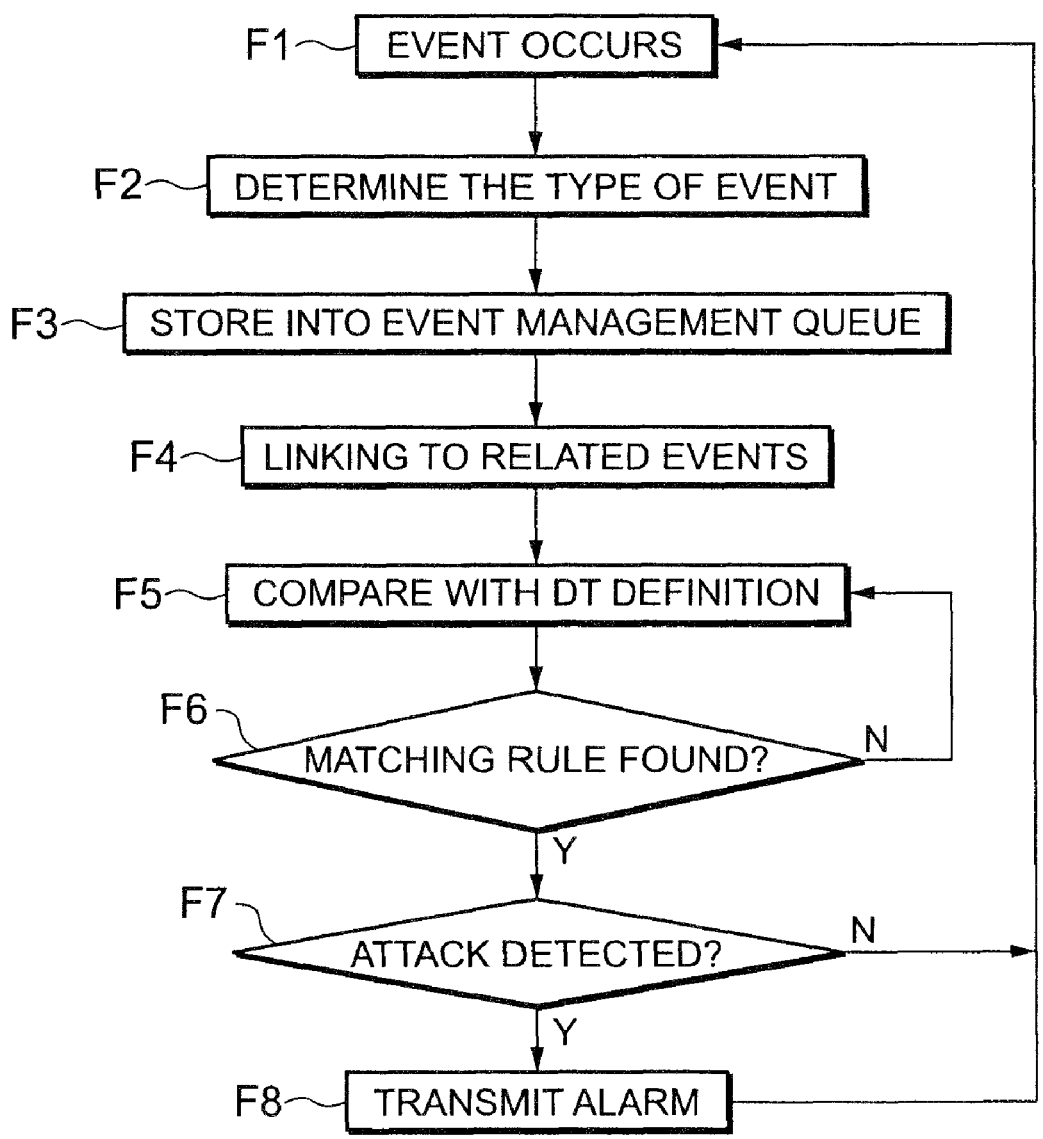
FIG. 34 is a flowchart showing the whole operation of the decoy unit according to the twelfth embodiment.

FIG. 34 shows the operation of the decoy unit 37 in the twelfth embodiment of the invention.

12.2.1) Event Transmission

First, when an input IP packet has been transferred from the firewall unit 1, a program for providing counterfeit services starts running on the processor 201. In contrast to the decoy unit 2 as described in the first to tenth embodiments, the counterfeit services provides network input/output, generation and termination of process and file input/output, which are the completely same as those in the regular service provision.

The processor 201 executes the program and further outputs events relating to network input/output, process generation/termination and file input/output to the event management section 3701 at any time (Step F1). An event includes at least the event name, the value of argument, a returned value of the event, and the process ID of a process having issued the event. In addition, the time the event has occurred may be included.

12.2.2) Determination of Event Type

When having received an event, the event management section 3701 determines the type of the event according to an event type determination rule (Step F2). The event type determination rule is used to permit a distinction among at least network input/output, process generation/termination and file input/output. For example, the event management section 3701 is previously provided with a table (see FIG. 35) defining a correspondence between the names of events received from the processor 201 and their types. Every time an event has been received, the event management section 3701 searches this table to determine the type of the event.

12.2.3) Addition to Event Management Queue

Subsequently, the event management section 3701 stores the event into the queue (Step F3). A single queue may be possible. A plurality of queues may be provided in order to facilitate parallel processing and the following processing. Here, it is assumed that one queue is provided for each event type (see FIG. 36). In this case, when an event type is obtained according to the event type determination rule, a corresponding queue is selected and the event is added to the tail end of the queue.

12.2.4) Linking Events

Furthermore, the event management section 3701 links the added event (current event), which is added to the tail end of the queue, with the related events according to a predetermined linking rule (Step F4). It is essential that the linking rule is used to generate a link from the generation event of a process that is the source of events to the relevant event (see FIG. 43).

12.2.4.1) Basic Linking Rule

Figure 37:
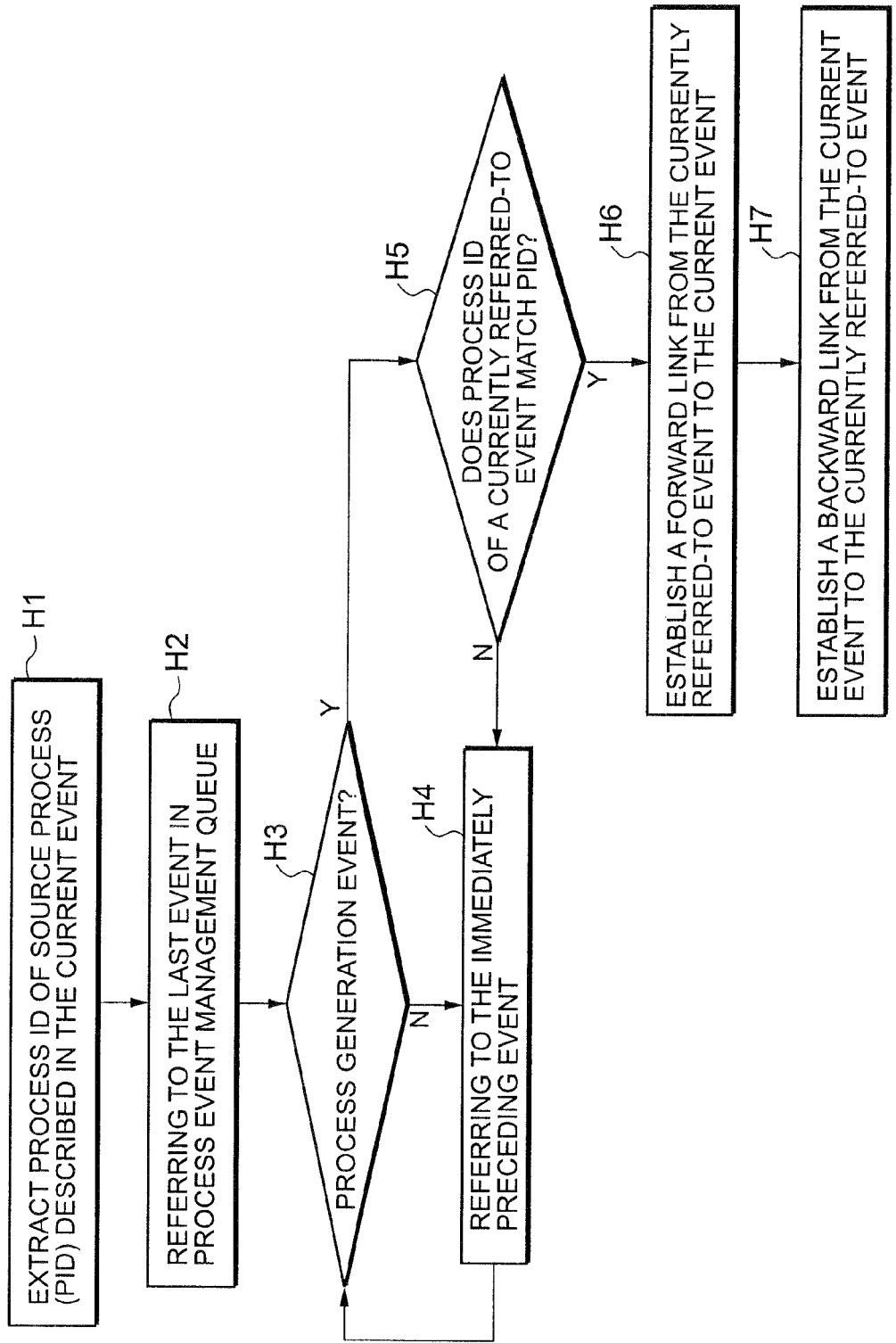
FIG. 37 is a flowchart showing an example of a linking process executed by an event management section in the twelfth embodiment.

A more basic linking rule will be described with reference to FIG. 37. In FIG. 37, first, the source process ID of a source process generating the current event is extracted from the current event (Step H1), and thereafter the event at the tail end of the process event management queue is referred to (Step H2).

Next, it is determined whether the event currently being referred to is a process generation event (Step H3). More specifically, for example, it is checked to see that the event name described in the event currently being referred to matches the name of the predetermined event. If it is determined that the event is not a process generation event (N of Step H3), an event to be referenced is shifted to an immediately preceding event and the control goes back to the Step H3 (Step H4).

On the other hand, when the event is a process generation event (Y of Step H3), the process ID of the event currently being referred to is compared to the source process ID (Step H5). If they match (Y of Step H5), then the control goes to Step H6 and, if not (N of Step H5), then the control is returned to the Step H4.

In the case where the current event is a process creation event, the event referred to in Step H2 is the current event itself. However, in any operating system, more than one same process IDs can never be assigned when a process is generated. Therefore, in Step H5, the source process ID of the current event and the process ID of the current event do not match and the control is returned to Step H4.

Figure 43:
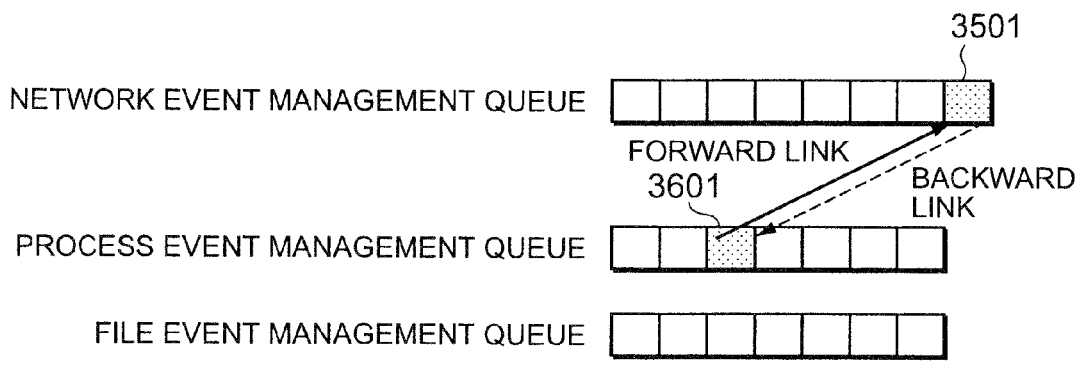
FIG. 43 is a schematic diagram showing a specific example of linking executed by the event management section of the decoy unit in the twelfth embodiment.

Then, a forward link from the process generation event to the current event is added to the process generation event (Step H6). Furthermore, a backward link from the current event to the process generation event is added to the current event (Step H7). Examples of the forward link and the backward link are shown in FIG. 43.

The forward link, as described above, is used to hold the events in time sequence and the backward link is used to hold the events in reverse time sequence. In the subsequent processing, such a time relationship between events is used. Therefore, it is desirable that a forward link and a backward link added to the same event can be distinguished at any time.

12.2.4.2) Transmission of Event-Context Combinations

Thereafter, the event management section 3701 outputs combinations of the current event and its context (event-context combination) to the attack detecting section 3702. As shown in FIG. 38, context indicates a set of all the forward and backward links added to the current event.

12.2.5) Attack Detection

FIG. 39 shows an example of a normal operation definition with a predetermined domain-type constraint (hereinafter referred to as "DT definition") The attack detecting section 3702, when having received an event-context combination, determines the presence or absence of an attack according to the DT definition (Step F5 in FIG. 34).

12.2.5.1) Determination of Rule with Domain-Type Constraint (Components of the Rule with a Domain-Type Constraint)

Each rule with domain-type constraint within the DT definition has at least the following components:

(1) Domain-type constraint (hereinafter referred to as "DT constraint");
(2) Event constraint: and
(3) Determination value.

The DT constraint (1) is obtained by a logical AND operation of domain constraints and type constrains. The domain constraints relate to a source host of an access causing the occurrence of an event or its network domain. The type constrains relate to a process causing the occurrence of an event and its ancestor processes. Only when the event satisfies the DT constraints, determination by the event constraint (2) is performed.

The DT constraint will be described more specifically. For example, it is assumed that the DT constraint is described as follows:

Type Constraint: "program T1", "program T2"
Domain Constraint: "133. 203. 1. 128"

Figure 40:
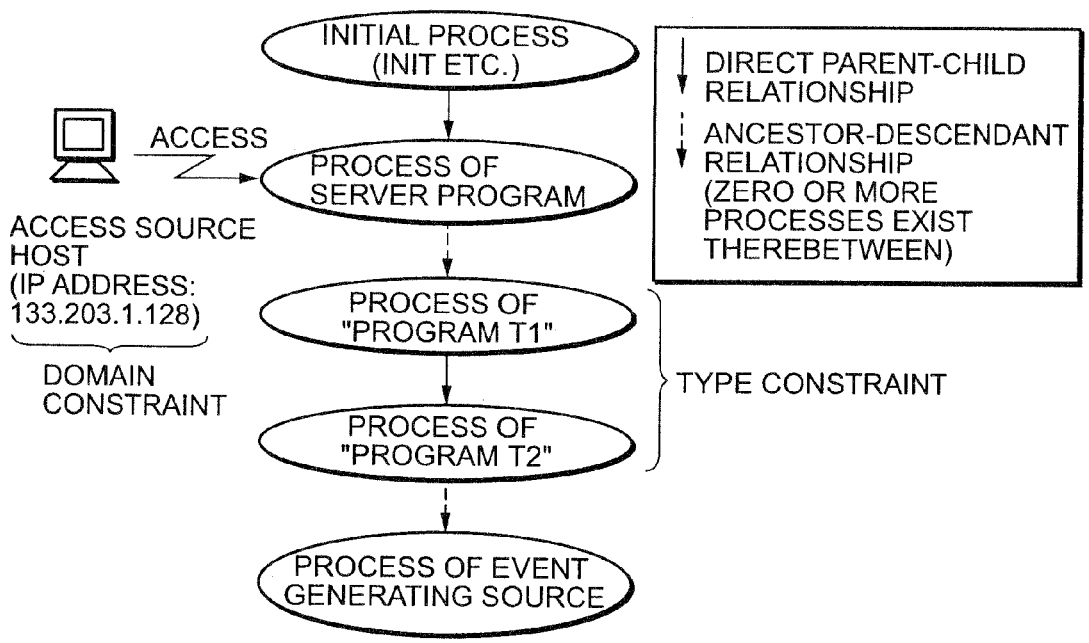
FIG. 40 shows a conceptual diagram showing domain-type constraints interpreted by an attack detecting section in the twelfth embodiment.

As shown in FIG. 40, these constraints designate the following constraints:

A process of "program T2" exists as an ancestor of some process being the source of an event;
A process of "program T1" exists as an parent process of "program T2"; and
"Server program" is being accessed from a host of IP address "133. 203. 1. 128".

Although FIG. 40 shows a case where the "server program" is an ancestor of the "program T1", it is enough that either the process causing the occurrence of an event or its ancestor process is the "server program". For example, the "process T1" or the "process T2" may be the "server program", or the process itself causing the occurrence of the event may be the "server program".

The event constraint (2) and the determination value (3) mean the same meaning as that of the normal operation definition of the decoy unit 2 in the first embodiment. That is, the event constraint (2) is a combination of normal representations for event names and parameter values. The attack detecting section 3702 determines whether they match the event names and the parameter values in the event-context combinations.

The determination value (3) is the value for the attack detecting section 3702 to determine whether the event is a normal event or an attack in the case where the event satisfies the event constraint (2). For example, the determination value for the case where the event is determined to be normal is "ALLOW" and the determination value for the case where it is determined to be an attack is "DENY". As the determination value for the case where it is determined to be an attack, the attack types similar to those of the decoy unit 2 in the first embodiment may be used.

A more specific description example and determination method will be described especially for the DT constraints.

(Example of Domain Constraint)

Domain constraint can be described as, for example, a set of IP addresses. More specifically, one IP address is described as a combination of four (4) decimal three-figure numbers, "xxx.yyy.zzz.www" and elements of the IP address set are listed being punctuated by periods. As an alternative, an expression such as "xxx.yyy.zzz.www/vvv" (vvv denotes a bit mask) may be allowed. Otherwise, the regular expression may be used.

(Example of Type Constraint)

Type constraint can be described using, for example, the regular expression relating the name of an executable file. Further, the names of executable files are coupled to express the parent-child relationship of processes and its regular expression may be used.

More specifically, the parent-child relation of processes can be expressed in a format such as "<F(1)><F(2)>—omitted—<F(N)>" (each F(i) is the name of an executable file). In this case, each "<F(i)>" is a constraint relating to a process and corresponds to a process after starting up an executable file having the matching name. In this expression, a process followed by a subsequent process is the parent of the subsequent process and the subsequent process is the direct child of the process.

Therefore, in the case where Process B corresponding to Executable File "B" as the child of Process A corresponding to Executable File "A" and Process C corresponding to Executable File "C" as the child of Process B are running, the parent-child relations for Processes A, B and C is expressed by a string of characters such as "<A><B><C>".

Such a regular expression relating to a parent-child relation of processes as described above may be defined as a type constraint. More specifically, a type constraint such as "<A>*<C>" is met in the case where Process C corresponding to Executable File "C" is running and its parent process (it may not always be a direct parent) is Executable File "A".

As a special example, in the case of a type constraint starting with "^", it is met when a just subsequently described process is a process generated immediately after starting up an operating system on the processor 201.

In general, an operating system has only one initial process, and all the processes immediately after the starting up are direct children of the initial process. An executable file corresponding to the initial process does not always exist. Therefore, using a specific symbol "^" to express the same can enhance the general versatility of the DT definition.

In another specific example, in the case where a type constraint ends with "$", a process "<F(N)>" designated at immediately before the "$" denotes that it is the source causing the occurrence of the event.

(Comparison of DT Constraint with Event-Context Combination)

In determining DT constraint, a comparison of the event-context combination with the DT constraint is carried out. The comparison method will be described in detail.

In the determination of type constraint, among the backward links contained in the context, a backward link denoting an event in the process event management queue is selected (hereinafter referred to as "process link"). According to the linking rule, an arbitrary event always has a process link denoting a generation event of a process being the source causing the occurrence of the event.

Then, the name of an executable file is accumulated on a stack by tracing the process link and referring to events present ahead of the process link. These steps are repeated until an event in which no process link is present has been reached.

In a common operating system, an initial process exists as an ancestor of an arbitrary process. In the case where such an operating system is running on a processor 201, the repetition of the steps always stops since the initial process does not have any parent process.

If an operating system in which no initial process exists is running on the processor 201, then the event management section 3701 preferably places the generation event of a virtual initial process at the head of the process event management queue.

After the steps have been ended, the sequence of the names of the executable files accumulated on the stack can be obtained as a sequence of processes from the initial process to the process being the source causing the occurrence of the event. Since the process sequence matches a process sequence in which the parent-child relation of processes are arranged in time sequence. Therefore, by comparing the process sequence with the type constraint, it can be determined whether the event series and the type constraint match with each other.

The determination of domain constraint is carried out by sequentially referring to forward links to the network event management queue while tracing the process link similarly to the case for the type constraint. When a reception event of a connection request has been found ahead of the forward links, the source IP address described in the event is regarded as the IP address of the access source host and this retrieval is ended. The IP address is compared with the domain constraint to determine whether they match with each other.

12.2.5.2) Alarm Transmission

In the above manner, the comparison of an event-context combination with each rule described in the DT definition is repeated to determine whether the event-context combination matches all the DT constraint (1) and the event constraint (2) (Step F6 of FIG. 34). If there is no rule matching both of the DT constraint (1) and the event constraint (2), a predetermined determination value set in the DT definition is employed as the default value.

If there is a rule matching both of the constrains, the determination value (3) of the rule is referenced to determine whether the event-context combination is an attack or not (Step F7).

If the employed determination value is other than allowance (ALLOW), then an alarm is immediately created and is transmitted to the firewall unit 1 (Step F8). Similarly to the decoy unit 2 in the first embodiment, the contents of the alarm includes at least the source IP address of the access and the determination value. In addition, the port number of the access source may be included.

12.3) Advantages

The decoy unit 37 of the present embodiment executes an analysis of cause-effect relations between events generated by the processor 201 and their history management in the event management section 3701. These analysis results and history allow the attack detection section 3702 to perform more specific normal operation definition including calling relationships of the access source host and subsystems. This causes the performance of attack detection to a server having a complicated subsystem structure to be improved and an erroneous detection frequency to be reduced during maintenance.

12.4) Examples

The operation of the decoy unit 37 in the present embodiment will be described using a specific example.

12.4.1) Structure

First, it is assumed that a WWW server is operating on the processor 201 of the decoy unit 37 to provide counterfeit services. Then, it is assumed that the content area is determined to be a directory "C:¥Inetpub¥wwwroot" and lower level directories. It is also assumed that the following two (2) CGI modules are provided as a subsystem of the WWW server.

(A) Registration CGI: A CGI for registering customer information to a customer database (Path name: "C:¥Inetpub¥scripts¥regist.exc").

(B) Output CGI: A CGI for converting the contents of the customer database into HTML format to be viewed from a browser (Path name: "C:¥Inetpub¥scripts¥view.exc").

However, it is assumed that the output CGI solely aims at being used as one of the maintenance works and is required to respond to only an access from the management domain, "10. 56. 3. 0/24" of the internal network 4. Updating of the contents through an FTP server is assumed as another maintenance work.

Hereinafter, transmission and reception of IP packets between a client and a server from the start of a connection sequence to the completion of transmission of request data are collectively referred to as "access". Similarly, transmission and reception of IP packets from the start of transmission of response data to the completion thereof are collectively referred to as "response" (to the relevant access).

As an example of a DT definition for the above example, it is assumed that a setting such as that of a file 4101 shown in FIG. 39 has been made. However, a line starting with "#" is a comment line and it is neglected.

12.4.2) Operation Example 1

There will be described, as an example of the operation of the decoy unit 37, the case where a suspicious access has been made from a client (133. 201. 57. 2) on the external network 3 to the WWW server on the internal network 4 and it is finally found that the access is normal.

In this case, the suspicious access is guided to the decoy unit 37 by the firewall unit of any of the first to the tenth embodiments and the counterfeit service processing is started.

In the WWW server on the processor 201 of the decoy unit 37, the following processing including the above reception of suspicious accesses is performed.

(A) Reception of accesses from 133. 201. 57. 2;
(B) Generation of a child process; and
(C) The child process performs, in response to request data in the access, for example,
(C-1) file input/output to the content area; and
(C-2) file input/output for database operation.

The internal operation of the decoy unit 37 will be described for each step.

12.4.2.1) Reception of Suspicious Access

Figure 41:
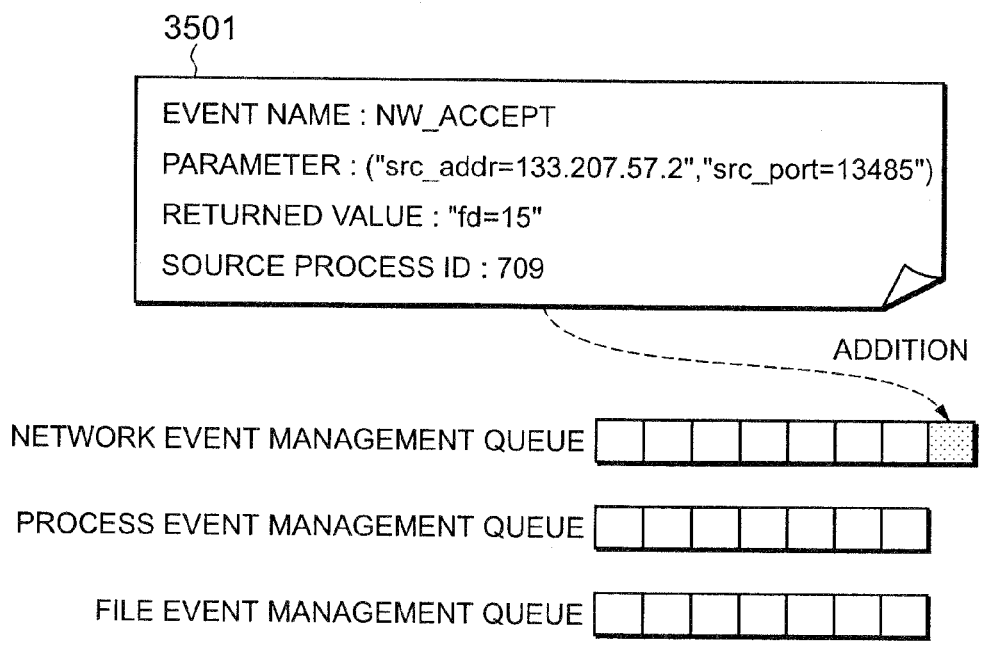
FIG. 41 is a schematic diagram showing a specific example of network event addition executed by the event management section of the decoy unit in the twelfth embodiment.

Immediately after the WWW server on the processor 201 has received a suspicious access, an event 3501 is transmitted from the processor 201 to the event management section 3701 (see FIG. 41).

In the event 3501, at least the event name (NW_ACCEPT), access source IP address (133. 201. 57. 2) and the process ID (709) of the WWW server being the source causing the occurrence of the event are described. In addition to these, information may be included, such as an access source port number, the type of the protocol such as TCP/UDP, and the request data.

Figures 35, 36:
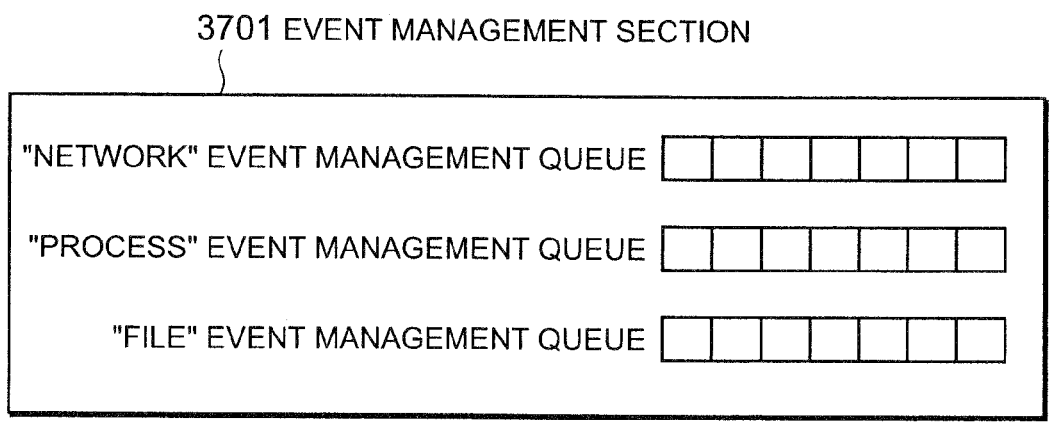
FIG. 35 is a diagram showing an example of a process type determination table used in the twelfth embodiment.
FIG. 36 is a diagram showing an example of an event management queue in the event management section.

When having received the event 3501, the event management section 3701 immediately refers to the reference table as shown in FIG. 35 and thereby determines that the event type of the event name "NW_ACCEPT" is "network", which is added to the event. The event management section 3701 adds the event 3501 to the event management queue corresponding to the event type "network". Thereafter, according to a predetermined linking rule, linking between the event 3501 and related past events is performed.

Figure 42:
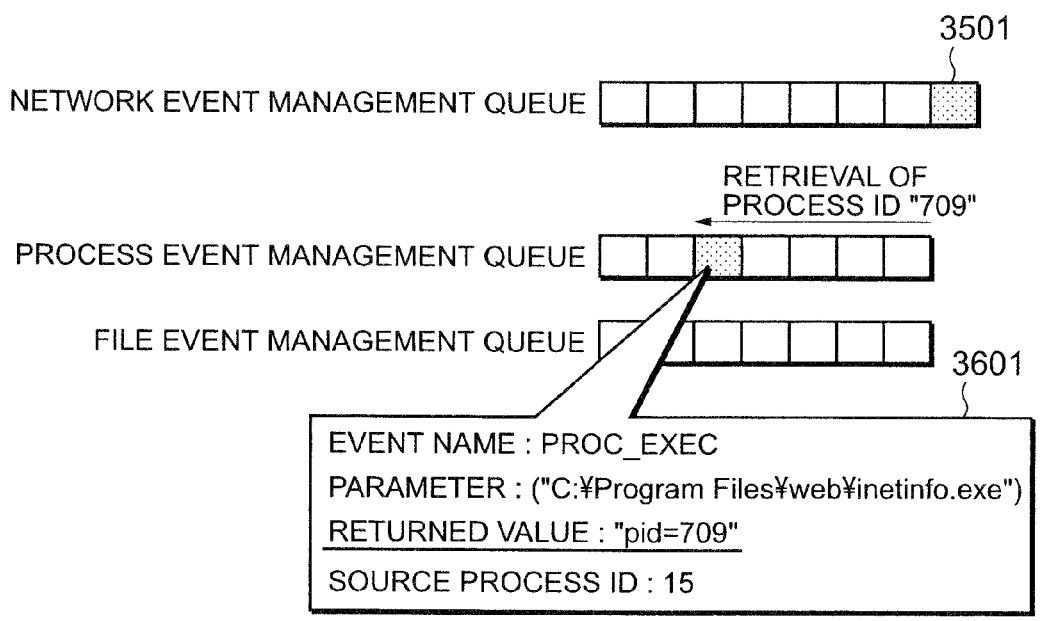
FIG. 42 is a schematic diagram showing a specific example of process event scanning executed by the event management section of the decoy unit in the twelfth embodiment.

Referring to FIG. 42, more specifically, the event management queue corresponding to the event type "process" is searched for an event 3601 having an event name "PROC_EXEC" or "PROC_FORK" corresponding to the process ID (709) described in the event. In this searching, the queue is scanned in the forward direction from its tail end and, when the event 3601 is first found, the processing proceeds to the subsequent processing.

Then, a forward link to the event 3501 (indicated by the solid line in FIG. 43) is added to the event 3601 and a backward link to the event 3601 (indicated by the dotted line in FIG. 43) is added to the event 3501. Hereinafter, the backward link will be omitted when links are shown in figures.

Thereafter, an event-context combination relating to the event 3501 is transmitted to the attack detecting section 3702.

The attack detecting section 3702, first, refers to the predetermined DT definition file 4101 to extract each rule. In this example, a rule is extracted for each line in the forward direction from the head of the DT definition file 4101. The line starting with "#" means a comment and therefore comments and blank lines are skipped.

First, the first rule (rule 1 in FIG. 39) is extracted. In this case, the domain constraint is "0.0.0.0/0" and this matches an arbitrary network domain. The type constraint is "<inetinfo.exe>" and this matches a process or its child process corresponding to the WWW server.

For the purpose of comparing the DT constraint with the event 3501, the attack detecting section 3702 first outputs the backward link in the context of the event 3501 to the event management section 3701 and inputs the event 3601 related to the link.

Next, the attack detecting section 3702 refers to the content of the event 3601 to extract a path name "C:¥Web¥inetinfo.exe" of the program-executable file corresponding to the process ID "709". Furthermore, similarly to the above case, the attack detecting section 3702 tries to obtain a generation event of the parent process, but the generation event does not exist in this example. Therefore, the parent-child relation of processes corresponding to the event 3601 is determined to be "<inetinfo.exe>" and it is verified that the relation matches the type constraint "<inetinfor.exe>".

Next, in order to compare with the domain constraint, the attack detecting section 3702 again refers to the content of the event 3501. First, it verifies that the event type of the event 3501 is "network" and further the event name is "NW_ACCEPT". Thereby, the event 3501 itself becomes the target of the domain constraint. Therefore, it further refers to the source IP address to obtain "133. 201. 57. 2". This value matches the domain constraint "0.0.0.0/0".

Subsequently, determination using the event constraint is performed. The event name "FILE_WRITE" and the event name of the event 3501 "NW_ACCEPT" are compared with each other, however, in this case, they do not match each other. Therefore, the comparison using the rule is ceased and the control goes to the next rule comparison step.

Similarly to the above, the extraction of rules, the comparison of DT constraint and the comparison of event constraint are repeated. However, in this example, since no rule is met, the default rule "DEFAULT:ALLOW" is used and therefore it is determined that the event 3501 is "normal" and the comparison for the whole DT definition is terminated.

12.4.2.2) Generation of Child Process

Next, the WWW server on the processor 201 creates a child process in order to process the request data of the suspicious access. In a server, which executes a parallel processing of a plurality of accesses, the processing of the request data for each access and its response processing are performed by its child process. In contrast, a server that processes accesses one by one immediately performs the processing of the request data. Furthermore, there are cases where a child thread is created instead of a child process. However, in this example, a thread and a process, which is considered in the strict sense, are collectively handled as "a process" (in a broad sense).

Figure 44:
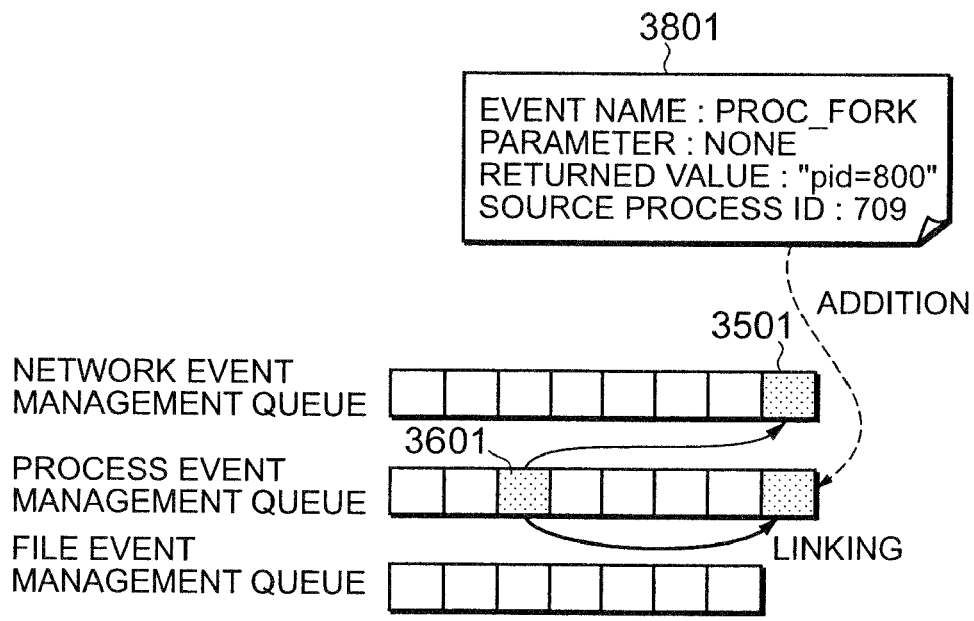
FIG. 44 is a schematic diagram showing a specific example of addition and linking of a child process creation event executed by the event management section of the decoy unit in the twelfth embodiment.

In response to the creation of a child process, the processor 201 transmits an event 3801 (see FIG. 44) to the event management section 3701. In the event 3801, at least an event name "PROC_FORK", the path name of an executable file "C:¥Web¥Inetinfo.exe", the process ID (800) of the created child process, and the process ID (709) being the source causing the occurrence of the event are described. In addition to these, a flag for distinguishing a thread from a process (in the narrow sense) may be provided.

The event management section 3701, when having received the event 3801, determines the event type ("process") of the event 3801 similarly to the case for the event 3501, and adds the event 3801 to the process event management queue. Thereafter, a forward link from the event 3601 to the event 3801 and a backward link from the event 3801 to the event 3601 are formed (see FIG. 44). Then, an event-context combination relating to the event 3801 is transmitted to the attack detecting section 3202.

The attack detecting section 3702 traces the link of the event-context combination relating to the event 3801 and makes the DT determination of the event 3801. As a result, since the event 3801 itself is the event type "process", the backward link destination of the event 3801 is obtained from the event management section 3201 and thereby the event 3601 is obtained. Therefore, the event type of the event 3801 is determined to be "<inetinfo><inetinfo>".

Thereafter, the attack detecting section 3702 again refers to the event 3801. However, since the event type of the event 3801 is not "network", it tries to refer to the forward link of the event 3801. However, since the event 3801 has no forward link to the network event management queue, the backward link destination of the event 3801 is obtained from the event management section 3701. Since the event 3601 has a forward link to the network event management queue, the event 3501 that is the destination of the link is obtained from the event management section 3201. Since the event name of the event 3501 is "NW_ACCEPT" and its source IP address is "133. 201. 57. 2", it is determined that the domain of the event 3801 to be "133. 201. 57. 2".

As in this example, when the domain of the event relating to the creation of a process is determined, a backward link from the event 3801 to the event 3501 may be added by specially informing the event management section 3701 that the determination has been executed. This processing has an advantage such that, even when the WWW server receives a new access while executing a child process, the WWW server can avoid making an error in domain of the successive event occurred by the child process.

Next, a comparison with the DT definition file 4401 is carried out. In this example, similarly to the event 3501, since the event 3801 does not meet any rule completely and the default determination value "DEFAULT:ALLOW" is employed, it is determined to be "normal".

12.4.2.3) File Input/Output to Contents Area

Next, the child process of the WWW server on the processor 201 processes the request data of the suspicious access. In this case, an example of operation will be described, taking as an example the case of the request data being "GET/HTTP/ 1.0".

Figure 45:
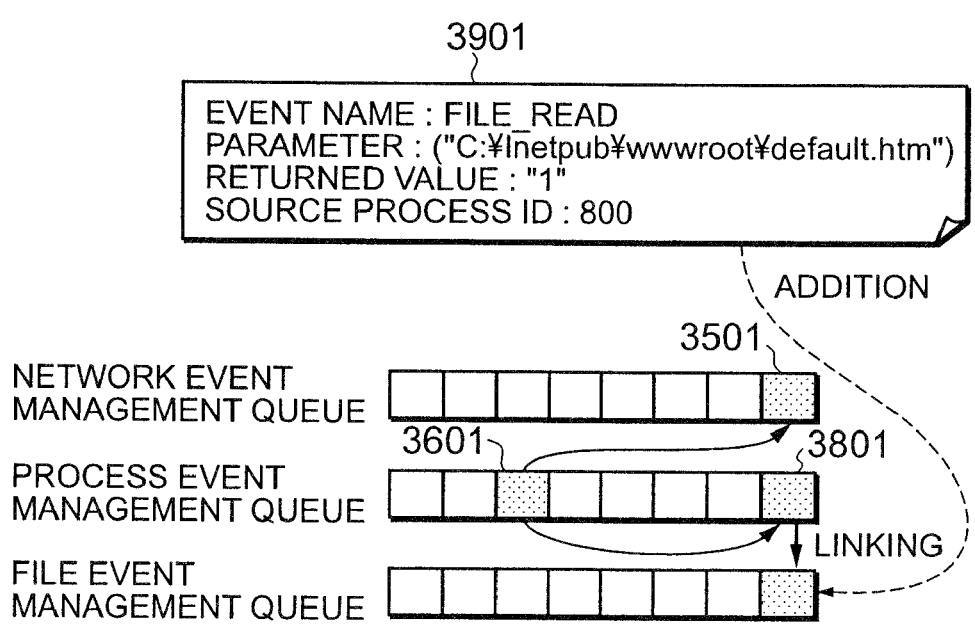
FIG. 45 is a schematic diagram showing a specific example of addition and linking of a file event caused to occur by child process executed by the event management section of the decoy unit in the twelfth embodiment.

For the request data, the child process reads a file "C:¥Inetpub¥wwwroot¥default.htm" within the content area. In response to this operation, the processor 201 transmits an event 3901 (see FIG. 45) to the event management section 3701. In the event 3901, at least the event name "FILE_READ", the path name of file to be read "C:¥Inetpub¥wwwroot¥default.htm" and the process ID (800) of the child process being the source causing the occurrence of the event are described. In addition to these, the contents of a file having been actually read may be included.

Next, the event management section 3701 determines the event type of the event 3901 to be "file" and adds the event 3901 to the file event management queue. Then, a forward link from the event 3801 to the event 3901 and a backward link from the event 3901 to the event 3801 are formed (see FIG. 45). Thereafter, an event-context combination relating to the event 3901 is transmitted to the attack detecting section 3202.

The attack detecting section 3702 executes the DT determination for the event-context combination relating to the event 3901. As a result, it is determined that the type of the event 3901 is "<inetinfo.exe><inetinfo.exe>" and the domain is "133. 201. 57. 2".

Next, the attack detecting section 3702 compares the event 3901 with the DT definition file 4101. In this example, since the event 3901 matches the following rule (Rule 2 in FIG. 39) "0.0.0.0/0, <inetinfo.exe>, FILE_READ, C:¥Inetinfo¥.*; ALLOW" and its determination value is "ALLOW", the event 3901 is determined to be "normal".

12.4.2.4) Operating Database

Taking "GET /cgi-bin/regist.exe/name=someoneHTTP/ 1.0" as an example of request data, the operation will be described.

(A) Starting Up of CGI

For the above request data, the child process first starts up the registration CGI to create a new grandchild process. It is assumed that the URL parameter "name=someone" is stored in an environmental variables "QUERY_STRING".

In response to this operation, the processor 201 transmits an event 4001 (see FIG. 46) to the event management section 3701. In the event 4001, at least the event name, "PROC_EXEC", the path name of an executable file, "C:¥Inetpub¥scripts¥regist.exe", the process ID (801) of the grandchild process and the process ID (800) of the child process being the source causing the occurrence of the event are described. In addition to these, information on the environmental variables may be included.

Figure 46:
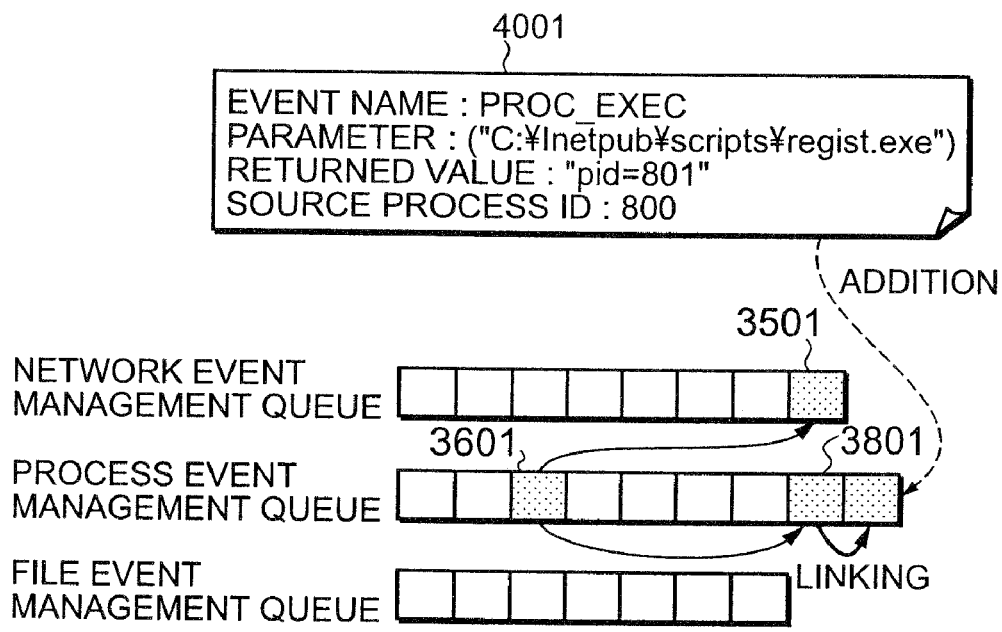
FIG. 46 is a schematic diagram showing a specific example of addition and linking of a grandchild process creation event executed by the event management section of the decoy unit in the twelfth embodiment.

Referring to FIG. 46, the event management section 3701 determines the event type of the event 4001 to be "process" and adds the event 4001 to the process event management queue. Thereafter, a forward link from the event 3801 to the event 4001 and a backward link from the event 4001 to the event 3801 are added and an event-context combination relating to the event 4001 is transmitted to the attack detecting section 3702.

Then, the attack detecting section 3702 executes the DT determination for the event-context combination relating to the event 4001 similarly to the case for the event 3901. As a result, it is determined that the type of the event 4001 is "<inetinfo.exe><inetinfo.exe><regist.exe>" and the domain is "133. 201. 57. 2".

Next, the attack detecting section 3702 compares the event 4001 with the DT definition. In this example, no rule matches the event 4001. Therefore, the determination value of the default rule "ALLOW" is employed and the event 4001 is determined to be normal.

(B) Operation of CGI

Subsequently, the registration CGI executes a database output operation. In this example, it is assumed that the database operated by the registration CGI is a file of "C:¥data¥client.db".

As a specific example of the database output operation, the registration CGI reads a value of the environmental variable "QUERY_STRING" and adds to the tail end of the database the string of characters constituted by adding a line-feed symbol to the value "name=someone".

In response to this operation, the processor 201 transmits an event 4101 (see FIG. 47) to the event management section 3701. In the event 4101, at least the event name "FILE_WRITE", the path name of an executable file "C:¥data¥client.db" and the process ID (801) of the grandchild process being the source causing the occurrence of the event are described. In addition to these, the data written out may be included.

Figure 47:
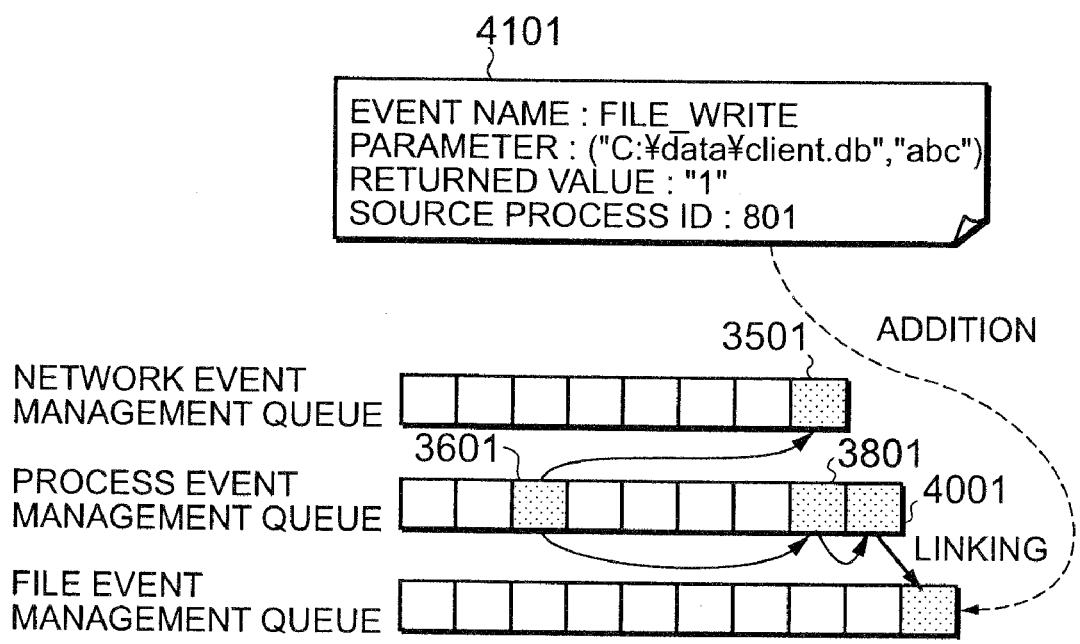
FIG. 47 is a schematic diagram showing a specific example of addition and linking of a file event caused to occur by a grandchild process executed by the event management section of the decoy unit in the twelfth embodiment.

Next, referring to FIG. 47, the event management section 3701 determines that the event type of the event 4101 is "file" and adds the event 4101 to the file event management queue. Then, a forward link from the event 4001 to the event 4101 and a backward link from the event 4101 to the event 4001 are added and an event-context combination relating to the event 4101 is transmitted to the attack detecting section 3702.

Then, the attack detecting section 3702 executes the DT determination for the event-context combination relating to the event 4101. As a result, it is determined that the type of the event 4101 is "<inetinfo.exe><inetinfo.exe><regist.exe>" and the domain is "133. 201. 57. 2".

Next, the attack detecting section 3702 compares the event 4101 with the DT definition file 4101. In this example, since the event matches the following rule (Rule 3 in FIG. 39) "0.0.0.0/0, <Inetinfo.exe><regist.exe>$, FILE_WRITE, C:¥data¥client.db; ALLOW", the determination value "ALLOW" is employed and it is determined to be normal.

12.4.3) Operation Example 2

There will be described, as an example of the operation of the decoy unit 37, the case where a suspicious access has been made from a client (133. 201. 57. 2) on the external network 3 to the WWW server on the internal network 4 and it is finally found that the access is an attack.

In this case, the suspicious access is guided to the decoy unit 37 by the firewall unit of any of the first to the tenth embodiments and the counterfeit service processing is started.

In the WWW server on the processor 201 of the decoy unit 37, the following processing including the above reception of suspicious accesses is performed.

(A) Reception of accesses from 133. 201. 57. 2;

(B) Generation of a child process; and (C) The child process performs, in response to unauthorized request data in the access, predetermined processing, for example, (C-1) unauthorized file input/output to the content area; and (C-2) unauthorized access to database.

Since the above (A) and (B) are the same as those of the above-described operation example 1, a specific example of only an operation when attacked: (C-1) and (C-2), will be described.

12.4.3.1) Writing Unauthorized File to Content Area

It is assumed that vulnerability is present in the WWW server, its subsystems (registration CGI and output CGI) or the like. Here, in the case where vulnerability is present in the registration CGI, there occurs an access described by "GET/cgi-bin/regist.exe?path=C:¥Inetpub¥wwwroot¥default.htm&data=abcd", data "abcd" is written to a file "C:¥Inetpub¥wwwroot¥default.htm" in the content area.

When the unauthorized access has been made, the operation (C-1) is performed and the processor 201 transmits an event 4901 (see FIG. 48) to the event management section 3701. In the event 4901, at least the event name "FILE_WRITE", the path name of an executable file "C:¥Inetpub¥wwwroot¥default.htm", and the process ID (801) of the grandchild process being the source causing the occurrence of the event are described.

Figure 48:
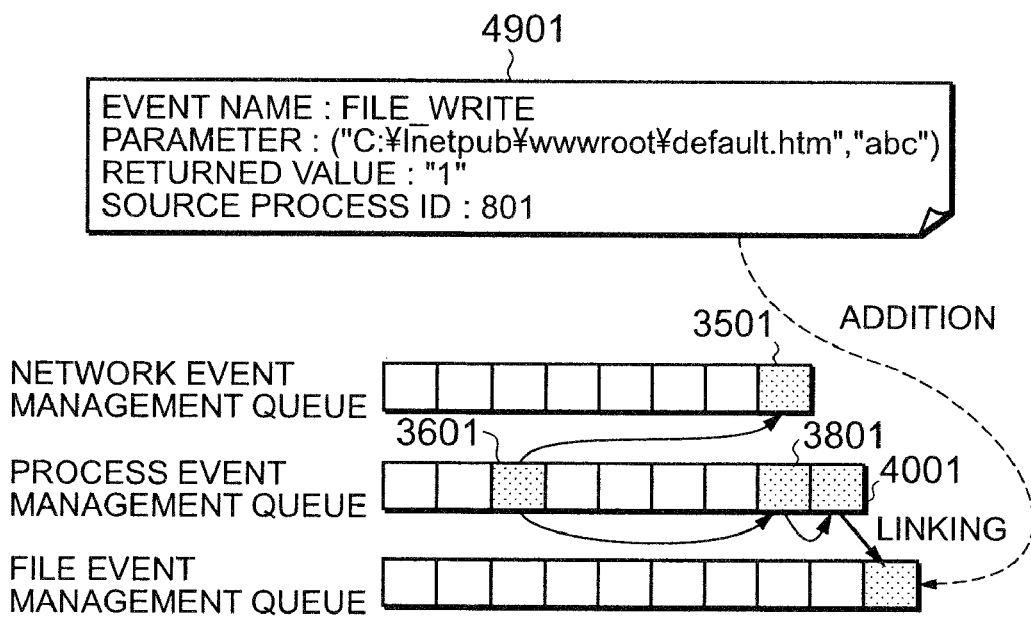
FIG. 48 is a schema-tic diagram showing a specific example showing the status of an event management queue at the time when an attack has occurred in the decoy unit in the twelfth embodiment.

Next, the event management section 3701 determines that the event type of the event 4901 is "file" and adds the event 4901 to the file event management queue (see FIG. 48). Then, a forward link from the event 4001 to the event 4901 and a backward link from the event 4901 to the event 4001 are added and an event-context combination relating to the event 4901 is transmitted to the attack detecting section 3702.

The attack detecting section 3702 executes the DT determination for the event-context combination relating to the event 4901. As a result, it is determined that the type of the event 4901 is "<inetinfo.exe><inetinfo.exe><regist.exe>" and the domain is "133. 201. 57. 2".

Next, the attack detecting section 3702 compares the event 4901 with the DT definition. In this example, since the event 4901 matches the following rule (Rule 6 in FIG. 39): "0.0.0.0/0, <inetinfo.exe>, FILE_WRITE, .*; DENY", its determination value "DENY" is employed and it is determined that the attack occurs.

Immediately, the attack detecting section 3702 creates an alarm including the attack-source host "133. 201. 57. 2" and transmits it to the firewall unit 1.

In the cases where an unauthorized writing operation is executed through the vulnerability of the WWW server or its subsystems, it is also determined that the writing operation is an attack.

In addition, when a writing operation is executed to a content area through a server other than the WWW server such as, for example, an FTP server, unless the writing operation matches the following rule (Rule 5 in FIG. 39), in other words, it is an authorized maintenance work from the management domain:

10.56.192.0/24, ^<ftpd.exec>+$, FILE_WRITE, C:¥Inetpub¥wwwroot¥.*; ALLOW, it is determined to be an attack by the following rule (Rule 8 in FIG. 39):

0.0.00/0, .*, FILE_WRITE, C:¥Inetpub¥wwwroot¥.*; DENY 12.4.3.2) Unauthorized Access to Database It is assumed that vulnerability is present in the WWW server, its subsystems (registration CGI and output CGI) or the like and a customer database is stolen by an access "GET/cgi-bin/..%cl%c9../data/client.db HTTP/1.0".

Figure 49:
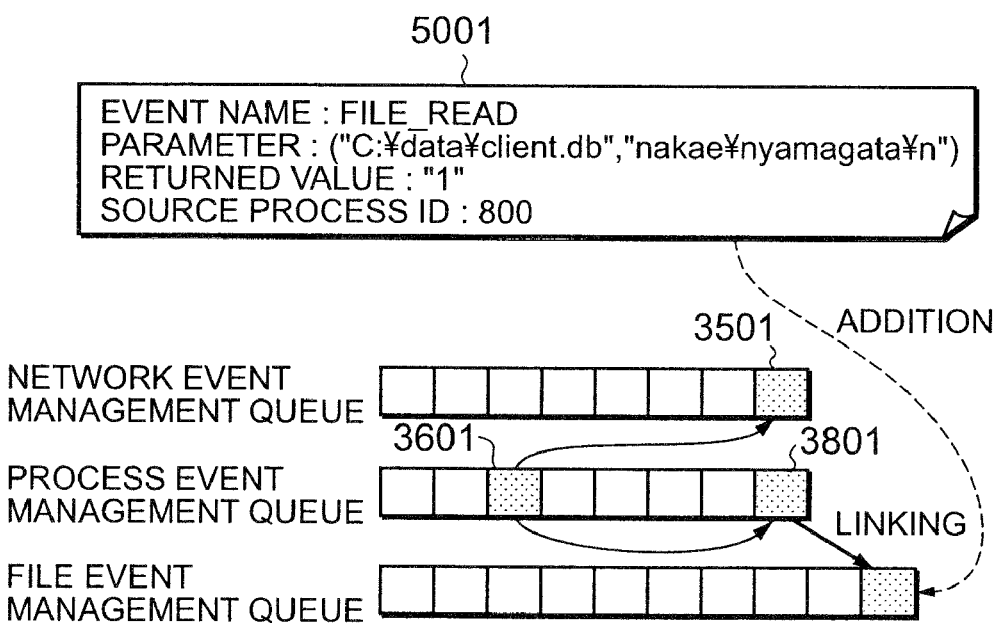
FIG. 49 is a schematic diagram showing a specific example showing the status of an event management queue at the time when an attack has occurred in the decoy unit in the twelfth embodiment.

In the case where the unauthorized access has been made, in response to the above operation having been done, the processor 201 transmits an event 5001 (see FIG. 49) to the event management section 3701. In the event 5001, at least the event name "FILE_READ", the path name of an executable file "C:¥data¥client.db" and the process ID (800) of the child process being the source causing the occurrence of the event are described.

Next, the event management section 3701 determines the event type of the event 5001 to be "file" and adds the event 5001 to the file event management queue. Then, a forward link from the event 3801 to the event 5001 and a backward link from the event 5001 to the event 3801 are added and an event-context combination relating to the event 5001 is transmitted to the attack detecting section 3702.

The attack detecting section 3702 executes the DT determination for the event-context combination of the event 5001. As a result, it is determined that the type of the event 5001 is "<inetinfo.exe><inetinfo.exe>" and the domain is "133. 201. 57. 2".

Next, the attack detecting section 3702 compares the event 5001 with the DT definition. In this example, since the event 5001 matches the following rule (Rule 7 in FIG. 39): "0.0.0.0/ 0, .*, FILE_READ|FILE_WRITE, C:¥data¥.*; DENY, its determination value "DENY" is employed and the attack is determined to be present.

Thereafter, the attack detecting section 3702 immediately creates an alarm including the attack-source host "133. 201. 57. 2" and transmits it to the firewall unit 1.

Thirteenth Embodiment 13.1) Structure

Figure 50:
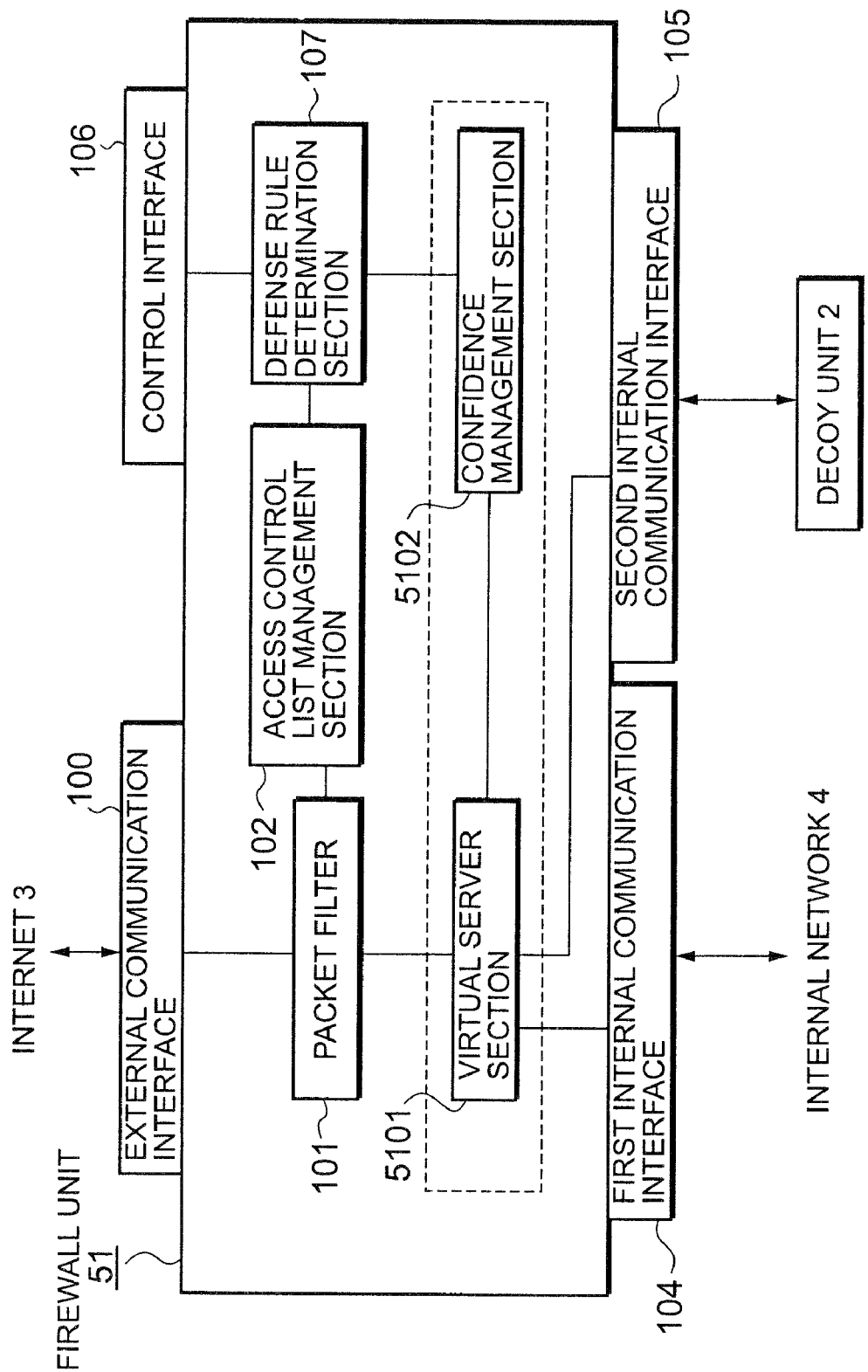
FIG. 50 is a block diagram showing the structure of a firewall unit in a thirteenth embodiment of the invention.

FIG. 50 shows a firewall unit according to a thirteenth embodiment of the invention. A firewall unit 51 in the present embodiment is provided with a virtual server section 5101 and a confidence management section 5102 instead of the guiding section 503 and the confidence management section 502 of the firewall unit 5 in the second embodiment.

Figure 51:
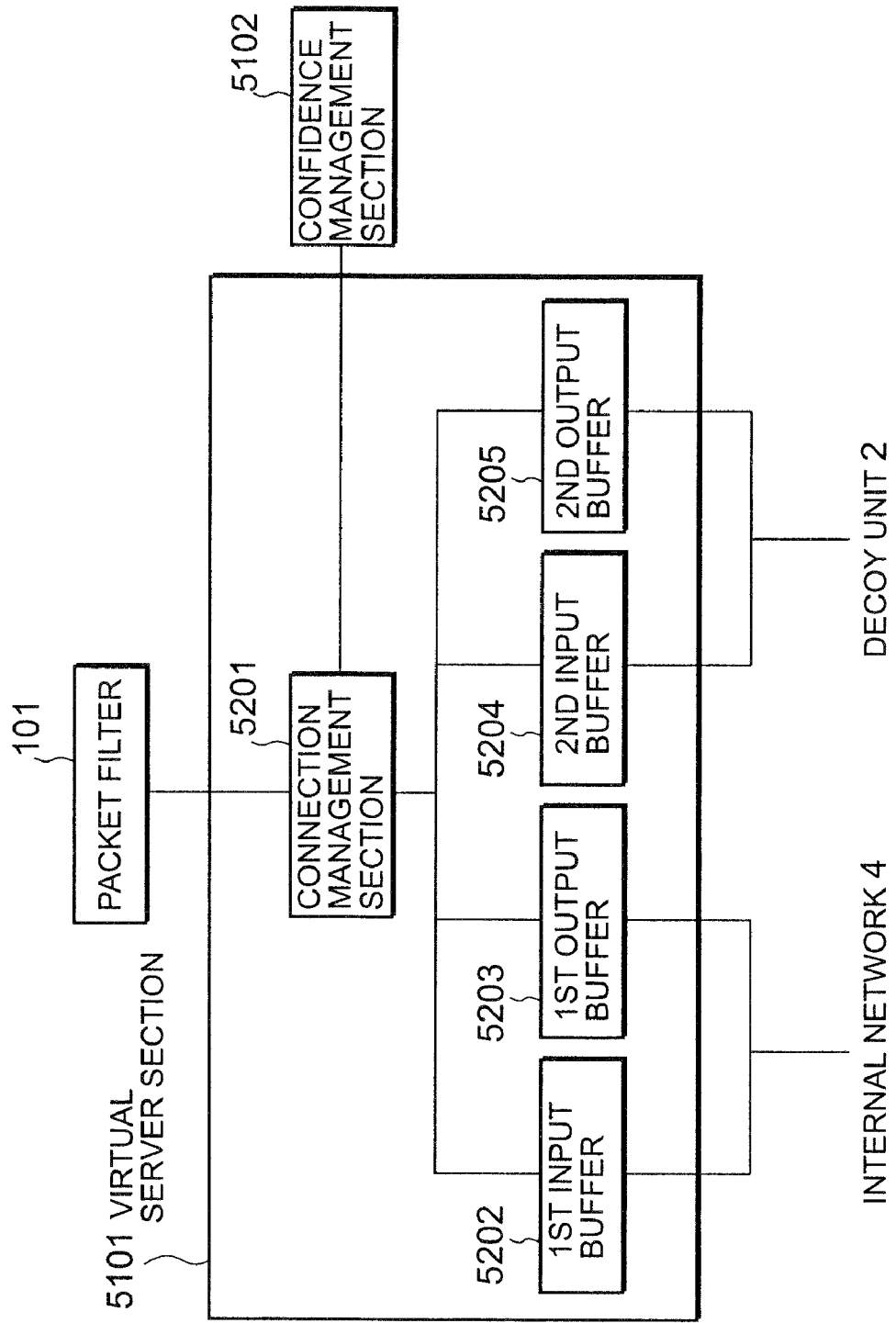
FIG. 51 is a detailed block diagram showing a virtual server section of the firewall unit in the thirteenth embodiment.

Referring to FIG. 51, the virtual server section 5101 has a connection management section 5201, a first input buffer 5202, a first output buffer 5203, a second input buffer 5204 and a second output buffer 5205.

When having inputted accesses from the packet filter 101, the connection management section 5201 outputs the request data contained in each access to the confidence management section 5102 and obtains the confidence level of the request data. Depending on the obtained confidence level, the connection management section 5201 executes transfer of the request data to the first input buffer 5202 or the second input buffer 5204 and reception of response data from the first output buffer 5203 or the second output buffer 5205.

The first input buffer 5202 and the first output buffer 5203 connects the first internal communication interface 104 to the internal network 4 and each stores temporarily the request data to the server and the response data from the server.

The second input buffer 5204 and the second output buffer 5205 are connected with the decoy unit 2 and store temporarily the request data to the decoy unit 2 and the response data from the decoy unit 2 respectively. When having inputted the request data from the connection management section 5201 of the virtual server unit 5101, the confidence management section 5102 outputs the confidence level of the inputted data.

13.2) Operation 13.2.1) Provisional Connection

Figure 52:
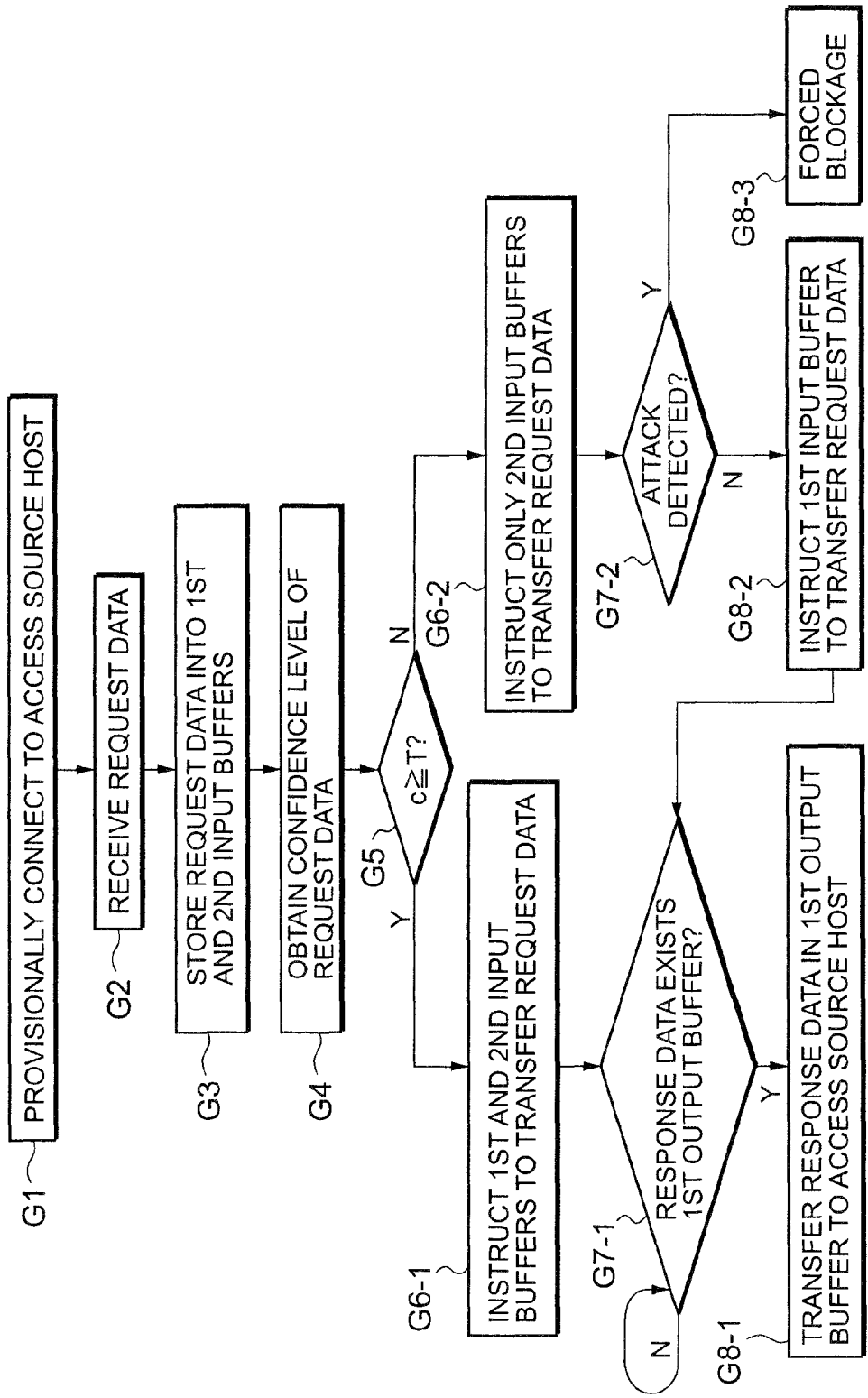
FIG. 52 is a flowchart showing the operation of the firewall unit in the thirteenth embodiment.

Referring to FIG. 52, first, the firewall unit 33 receives an input IP packet requesting a new connection from a host on the Internet 3. The connection management section 5101 of the virtual server 5101 establishes a provisional connection with the host in the case where the passage of the input IP packet is accepted by the packet filter 101 and the access control list management section 102 similarly to the case for the firewall unit 5 in the second embodiment (Step G1).

13.2.2) Temporary Storage of Request Data

Thereafter, the firewall unit 33 receives the request data addressed to a server on the internal network 4 from the host on the Internet 3 (Step G2). Then, the connection management section 5201 transmits the request data to the first input buffer 5202 and the second input buffer 5204, each of which temporarily stores the request data (Step G3).

13.2.3) Determination of Confidence

Then, the connection management section 5201 outputs the request data to the confidence management section 5102 and obtains the confidence level c of the data (Step G4). The obtained confidence level c is compared with a predetermined threshold value T (Step G5).

For example, a confidence calculation method in the confidence management section 5102 is that, regarding the request data as a sequence pattern of byte data, its similarity with "frequently appearing request data" is calculated by a statistical pattern analysis and the similarity is considered as the confidence level c.

Figures 53, 54:
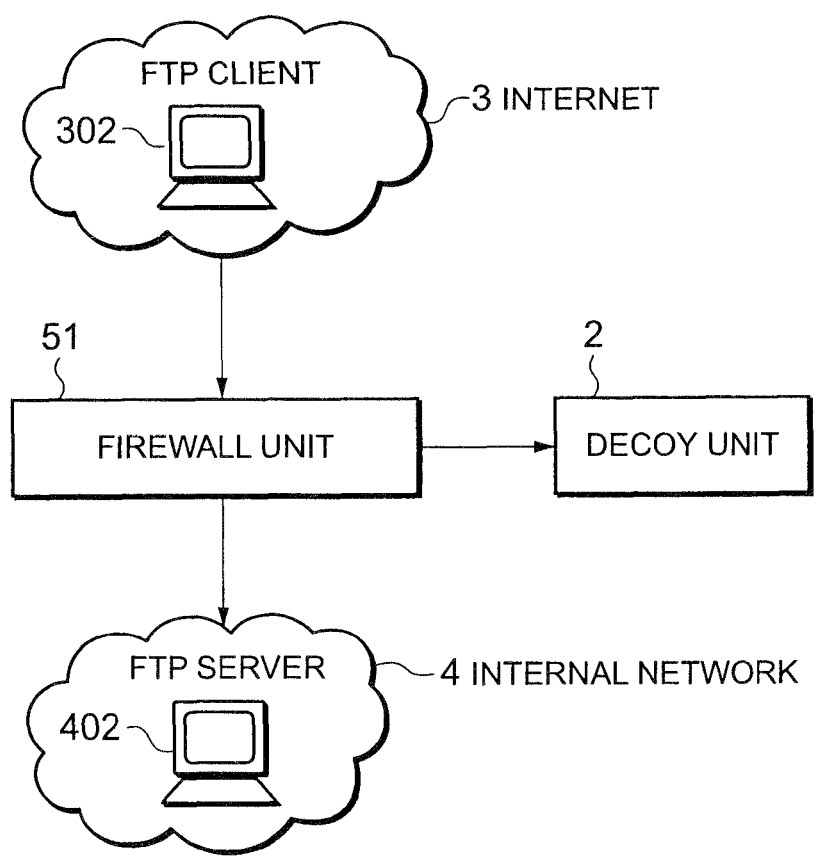
FIG. 53 is a diagram showing an example of a confidence management table stored in the confidence management section of the firewall unit in the thirteenth embodiment.
FIG. 54 is a schematic block diagram showing the attack defending system for describing the operation of the firewall unit in the thirteenth embodiment.

Alternatively, as shown in FIG. 53, a simple method may be employed such that a table for managing combinations of request data inputted in the past and corresponding confidence levels is held, and the table is used to obtain the confidence level every time new request data is inputted. More specifically, the confidence level is set to one only when an event is determined to be normal by the decoy unit 2 in Step C8-2 and the confidence is set to zero in other cases, especially in the case where the event is determined to be an attack in G8-3. This confidence data is reused thereafter.

Furthermore, a method may be used, in which the request data is not stored as it is in the table but the unidirectional hash function value of the request data. In this case, when the request data already known is again inputted, its confidence level can be correctly obtained since its unidirectional hash function value also matches. Furthermore, even in the case where the size of request data can be very large, the memory efficiency becomes high since the unidirectional hash function value always has a constant size. However, there are cases where unidirectional hash function values for different request data coincide (=conflict) with each other. However, it is generally considered to be difficult to find two (2) pieces of request data for which their unidirectional hash function values coincide with each other (especially, when one is normal and the other is an attack). Therefore, the risk in the practical use is extremely small.

13.2.3.1) Trusted Request Data

If $c \geq T$ (Y of Step G5), then the request data is determined to be trustable and therefore the first input buffer 5202 and the second input buffer 5204 are instructed to transfer the request data (Step G6-1). The first input buffer 5202, when having received this instruction, immediately transfers the stored request data to the server on the internal network 4 through the first internal communication interface 104. Similarly, the second input buffer 5104 transfers the stored request data to the decoy unit 2 through the second internal communication interface 105.

13.2.3.2) Verification of Response Data

Thereafter, when having received the response data from the server on the internal network 4 through the first internal communication interface 104, the first output buffer 5203 temporarily stores the response data in it and notifies the connection management section 5201 of reception of the response (Step G7-1).

13.2.3.3) Transfer of Response Data

After being notified of the reception of the data from the first output buffer 5203, the connection management section 5201 immediately transfers the response data stored in the first output buffer 5203 toward the host (Step G8-1).

13.2.4) Suspicious Request Data

On the other hand, after Step G8, if $c<T$ (N of Step G5) the request data is determined to be suspicious and only the second input buffer 5204 to be instructed to transfer the response data (Step G6-2). In response to this instruction, the second input buffer 5204 immediately transfers the request data to the decoy unit 2 through the second internal communication interface 105.

13.2.4.1) Attack Detection

Then, the decoy unit 2 determines whether an attack is present or not similarly to the case for the second embodiment (Step G7-2).

13.2.4.2) When Attack is Detected

In the case where an attack is present (Y of Step G7-2), an alarm for notifying of the presence of attack is created and transmitted to the firewall unit 51. In the firewall unit 51, when having received the alarm through the control interface 106, similarly to the firewall unit 5 in the second embodiment, the defense rule determination section 107 notifies the confidence management section 5102 that the attack has been made from the host and instructs the access control list management section 102 to update the access control rules to block the connection (Step G8-3).

13.2.4.3) When No Attack is Detected

On the other hand, when no attack is detected within a predetermined time-out period (N of Step G7-2), the confidence management section 5102 transmits the alarm to the connection management section 5201. Receiving the alarm, the connection management section 5201 instructs the first input buffer 5202 to transmit the stored request data (Step G8-2).

It is usually enough that the time-out period is set to a time period of around 500 ms. However, it may be adaptively varied to values depending on an average value or the like of time intervals at which input IP packets reach the firewall unit 51.

Thereafter, when the first output buffer 5203 has received the response data from the server on the internal network 4 through the first internal communication interface 104, it temporarily stores the response data and notifies the connection management section 5201 of receiving the response (Step G7-1).

After having been informed of the reception of data from the first output buffer 5203, the connection management 5201 immediately transmits the response data stored in the first output buffer 5203 toward the host (Step G8-1).

13.3) Advantages

In the firewall unit 51 according to the thirteenth embodiment, assuming that one piece of request data r(i) among a plurality pieces of request data r(1), r(2), . . . , r(n) for one connection is considered to be suspicious, if it is determined that no attack to the piece of request data r(i) has been detected from the server operation on the decoy unit 2, then the piece of request data r (i) is surely transmitted to the regular server on the internal network 4. accordingly, it can be guaranteed that all pieces of the request data r(1)-r(n) reach the regular server in the correct order.

On the other hand, when an attack has been detected by the decoy unit 2, the connection is immediately blocked. Therefore it can be guaranteed that no request data thereafter including the piece of request data r(i) will reach the regular server.

Such a property is suitable for the protection of services conforming to a protocol (=stateful protocol) in which a plurality of requests and responses are repeated for one connection as carried out between a WWW server associated with a database (so-called "3-tier system"), the Telnet server or FTP server and their respective clients.

In these services, when the order of the request data sequence is different, the correct services cannot be assured. Furthermore, as described above, in the case where the attacking data is included in the sequence of request data as a part of it, if the order of the request data sequence so far is different, then irregular operation of the server caused by the attacking data cannot be observed sometimes.

Therefore, an attack defending system according to the embodiment composed of a combination of the firewall unit 50 and the decoy unit 2 can determine the normal operation and the irregular operation for the services conforming to the stateful protocol without any error, resulting in secure protection against attacks.

Furthermore, even in the case of a stateless protocol such as provision of static contents by the WWW server, the guiding method according to the embodiment always transfers response data outputted by the regular server to the host on the Internet 3. Therefore, even in the case where tempering of static contents has occurred on the decoy unit 2, the changed contents can never reach the host and the provision of correct contents can be always guaranteed.

13.4) Example 13.4.1) Structure

Referring to FIG. 54, the present example is composed of an FTP client 302 on the Internet 3, an FTP server 402 on the internal network 4, the firewall unit 51 and the decoy unit 2.

The FTP client 302 transmits a plurality of pieces of request data toward the FTP server 402. However, all of them are relayed at the firewall unit 51. The firewall unit 51 transmits the request data received from the FTP client 302 to the decoy unit 2. Furthermore, on the processor 201 of the decoy unit 2, the same FTP services as those of the FTP server 402 are provided.

13.4.2) Operation

The FTP client 302 transmits the request data pieces one by one toward the FTP server 402. However, in this embodiment, an example of operation of the firewall unit 51 will be described in the case where the FTP client 302 executes:

(1) Anonymous login; and (2) Final upload.

It is assumed that both the FTP server 402 and the decoy unit 2 have a common vulnerability in which buffer overflow causes the shell to be operated in an unauthorized way when they have processed a very long file name.

Furthermore, it is assumed that the attack detecting section 202 of the decoy unit 2 is applied with a normal operation definition in which an FTP server operating on the processor 201 is prohibited from starting up a shell.

13.4.2.1) Provisional Connection

First, prior to logging-in to the FTP server 402, the FTP client 302 transmits a SYN packet toward the FTP server 402 in order to establish a predetermined TCP connection.

When the SYN packet reaches the firewall unit 51, the virtual server 5101 of the firewall unit 51, instead of the FTP server 402, responds with a SYN-ACK packet corresponding to the SYN packet.

Therefore, the FTP client 302 transmits an ACK packet toward the FTP server 402. When the ACK packet has reached the firewall unit 51, the virtual server 5101 determines that a new TCP connection has been established.

Then, the connection management section 5201 of the virtual server 5101 establishes separately a TCP connection with the FTP server 402 and the decoy unit 2 instead of the FTP client 302.

13.4.2.2) Anonymous Log-In

Next, the FTP client 302 transmits request data for executing anonymous log-in toward the FTP server 402.

In general, an anonymous log-in to the FTP server needs transmission of the following two (2) pieces of request data:

First request data (r1): denoting a user name and, generally, it is "anonymous"; and Second request data (r2): denoting a password, which is generally a mail address having a format of "user@domain".

When the first request data r1 has reached the firewall unit 51, the connection management section 5201 of the virtual server 5101 first transmits it to the first input buffer 5202 and the second buffer 5204 to be stored therein temporarily.

Figures 55, 56:
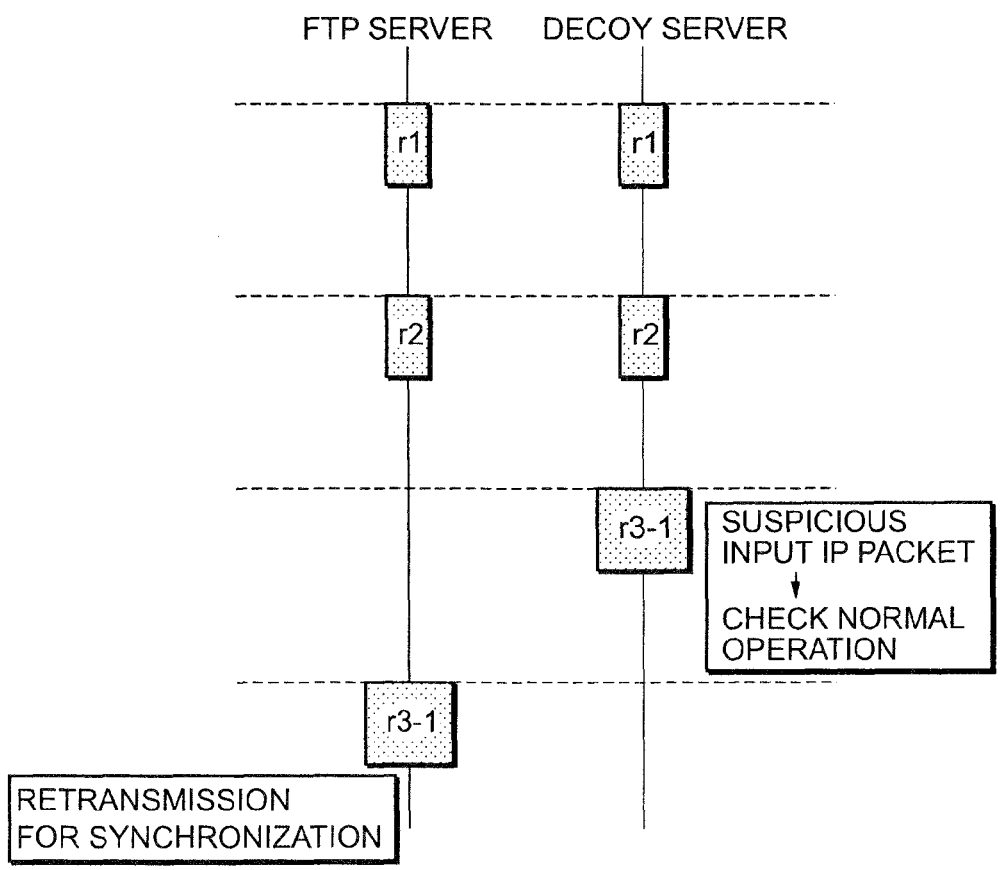
FIG. 55 is a diagram showing a specific example of addition of a new entry to the confidence management table executed by the confidence management section in the thirteenth embodiment.
FIG. 56 is a diagram showing a specific example of the operation of the firewall unit at the time when it verifies the normal operation in the thirteenth embodiment.

Thereafter, the first request data r1 is transferred to the confidence management section 5102 and the confidence level of r1 is obtained. The confidence management section 5102, uses the first request data r1 as a search key to retrieve the confidence level from, for example, the confidence management table as shown in FIG. 53. When an entry of the first request data r1 is found, the confidence management section 5102 outputs a corresponding confidence level c1 to the connection management section 5201. If no entry of r1 is found, the confidence management section 5102 adds a new entry having an initial confidence value of 0 (the shaded area in FIG. 55) and outputs the confidence level 0 to the connection management section 5201. In the embodiment, it is assumed that the entry of the first request data r1 is already present and its confidence level is "1".

Then, the connection management section 5201 compares the confidence level with a predetermined threshold value. In the embodiment, the threshold value is assumed to be 1. Therefore, the connection management section 5201 trusts the first request data r1 and instructs both of the first input buffer 5202 and the second input buffer 5204 to transfer the first request data r1.

The first input buffer 5202 and the second input buffer 5204, which have been instructed, transfer the first request data r1 to the FTP server 402 and the decoy unit 2, respectively.

Thereafter, the FTP server 402, when having received the first request data r1, transmits response data s1 for prompting the password, to the FTP client 302. At the firewall unit 51, the response data s1 is temporarily stored in the first output buffer 5203. Then, the first output buffer 5203 notifies the connection management section 5201 of the reception of new response data.

Thereafter, the connection management section 5201 transfers the response data s1 stored in the first output buffer 5203 toward the FTP client 302. The decoy unit 2 also transmits response data s1, which is stored in the second output buffer 5205, and thereby the connection management section 5201 is notified of the reception of new response data. However, the connection management section 5201 in the present example ignores this notification.

In this manner, the request data r1 transmitted from the FTP client 302 toward the FTP server 402 is forwarded appropriately to the FTP server 402 and the decoy unit 2.

Next, it is assumed that, for request data r2 being the password input, the confidence management section 5102 sets its confidence level to 1. Therefore, similarly to the case of r1, r2 is transferred to the FTP server 402 and the decoy unit 2. In this manner, the FTP client 302 can complete the anonymous log-in to both of the FTP server 402 and the decoy unit 2.

13.4.2.3) File Uploading

When the FTP client 302 has completed the anonymous log-in, the FTP client 302 executes file uploading. The file uploading in an FTP service is executed by including a command in the following format in the request data: "PUT <file name>".

Now, the following two types of request data are considered:
(a) r3-1: "PUT FILE.TXT", and
(b) r3-2: "PUT xxxxxxxx . . . <shell code>".

r3-1 is a request for uploading a file having a name "FILE.TXT" onto the FTP server 402 and it is assumed to be an authorized request. On the other hand, it is assumed that r3-2 is an unauthorized request for causing buffer overflow to the FTP server 402 and causing a shell in the FTP server 402 to execute a shell code included in a part of the file name.

13.4.2.3.1) Arrival of Authorized Request r3-1

When the firewall unit 51 has received the request data r3-1 from the FTP client 302, similarly to the case of the above r1, the request data r3-1 is stored in the first input buffer 5202 and the second input buffer 5204 by the connection management section 5201. The request data r3-1 is further transferred to the confidence management section 5102.

The confidence management section 5102 refers to the confidence management table. Assuming that the entry of r3-1 is not present, the confidence management section 5102 newly adds the entry of r3-1 to the confidence management table. The confidence management section 5102 sets the confidence level of r3-1 to a predetermined initial value of 0 and sends it back to the connection management section 5201.

After obtaining the confidence level of 0 for the request data r3-1, the connection management section 5201 compares it with the threshold value and determines that the confidence level of r1-3 is smaller than the threshold. Therefore, in this stage, the request data r3-1 is regarded as suspicious data. Then, the connection management section 5201 instructs only the second input buffer 5204 to transfer the request data r3-1.

In response to the transfer instruction, the second input buffer 5204 transfers the request data r3-1 to the decoy unit 2.

When having received the request data r3-1, the decoy unit 2 stores the file "FILE.TXT" therein and transmits response data s3-1 informing of the completion of the storage.

When the response data s3-1 reaches the firewall unit 51, it is stored in the second output buffer 5205, which notifies the connection management section 5201 of the completion of the storage of response data. Then, the connection management section 5201 notifies the confidence management section 5102 that the request data r3-1 is normal. The confidence management section 5102 updates the confidence management table to set the confidence level of r3-1 to 1.

Furthermore, the connection management section 5201 instructs the first input buffer 5202 to transfer the request data r3-1, which is transferred to the FTP server 402.

Thereafter, the FTP server 402 stores the file "FILE.TXT" and transmits the response data s3-1 informing of the completion of the storage of the file.

The response data s3-1 from the FTP server 402 is stored in the first output buffer 5203, which notifies the connection management section 5201 of the storage of the data. Then, the connection management section 5201 transfers the response data s3-1 to the FTP client 302 (see FIG. 56).

In the above manner, the file "FILE.TXT" is stored appropriately in the FTP server 402 and in the decoy unit 2.

13.4.2.3.2) Arrival of Unauthorized Request r3-2

When the firewall unit 51 has received the unauthorized request data r3-2 from the FTP client 30, similarly to the case of the above r3-1, the request data r3-2 is stored in the first input buffer 5202 and the second input buffer 5204 by the connection management section 5201 and is transferred to the confidence management section 5102.

The confidence management section 5102 refers to the confidence management table. Assuming that the entry of r3-2 is not present, the confidence management section 5002 newly adds the entry of r3-1 to the confidence management table. The confidence management section 5102 sets the confidence level of r3-2 to a predetermined initial value of 0 and sends it back to the connection management section 5201.

When having obtained the confidence level of 0 for the request data r3-2, the connection management section 5201 compares the received confidence level with the threshold value of 1 and determines that the confidence level is smaller than the threshold value. Therefore, the request data r3-2 is regarded as suspicious data.

Then, the connection management section 5201 instructs only the second input buffer 5204 to transfer the request data r3-2. Receiving the instruction of the transfer, the second input buffer 5204 transfers the request data r3-2 to the decoy unit 2.

When the decoy unit 2 has received the request data r3-2, a (counterfeit) FTP server on the processor 201 starts a shell by buffer overflow and tries to execute an unauthorized shell code contained in the request data r3-2. The attack detecting section 202 of the decoy unit 2 detects an attack from the start of the shell and immediately transmits an alarm to the firewall unit 51.

The firewall unit 51, when having received the alarm, first blocks subsequent accesses from the FTP client 302 by using the defense rule determination section 107, the access control list management section 102, and the packet filter 101, which is similar to the case of the firewall unit 1 in the first embodiment. The defense rule determination section 107 notifies the connection management section 5201 of the reception of the alarm.

The connection management section 5201, when having received the notice of reception of the alarm, immediately disconnects the connection with the FTP client 302. In this case, the request data r3-2 is preferably deleted from the first input buffer 5202.

Figure 57:
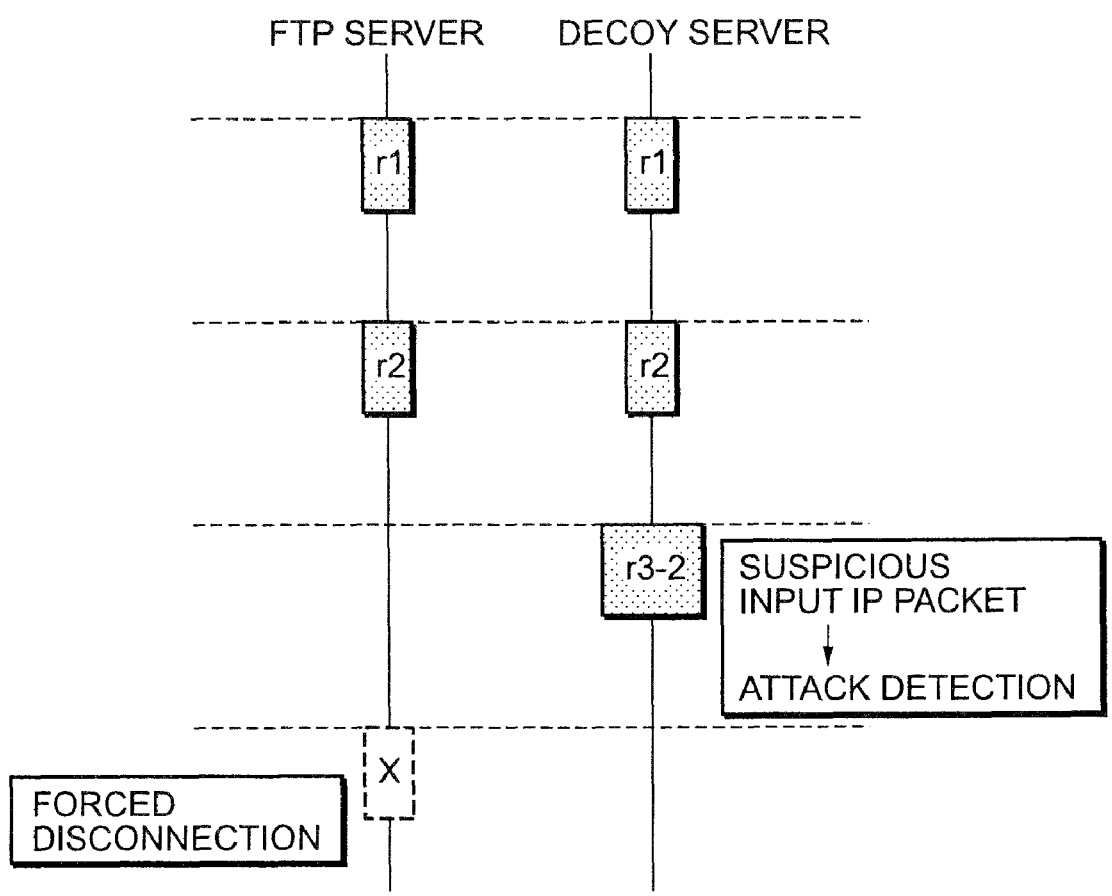
FIG. 57 is a diagram showing a specific example of the operation of the firewall unit at the time when it detects attacks in the thirteenth embodiment.

As described above, the unauthorized request data r3-2 reaches only the decoy unit 2 and does not reach the FTP server 402 (see FIG. 57).

Fourteenth Embodiment

Figure 58:
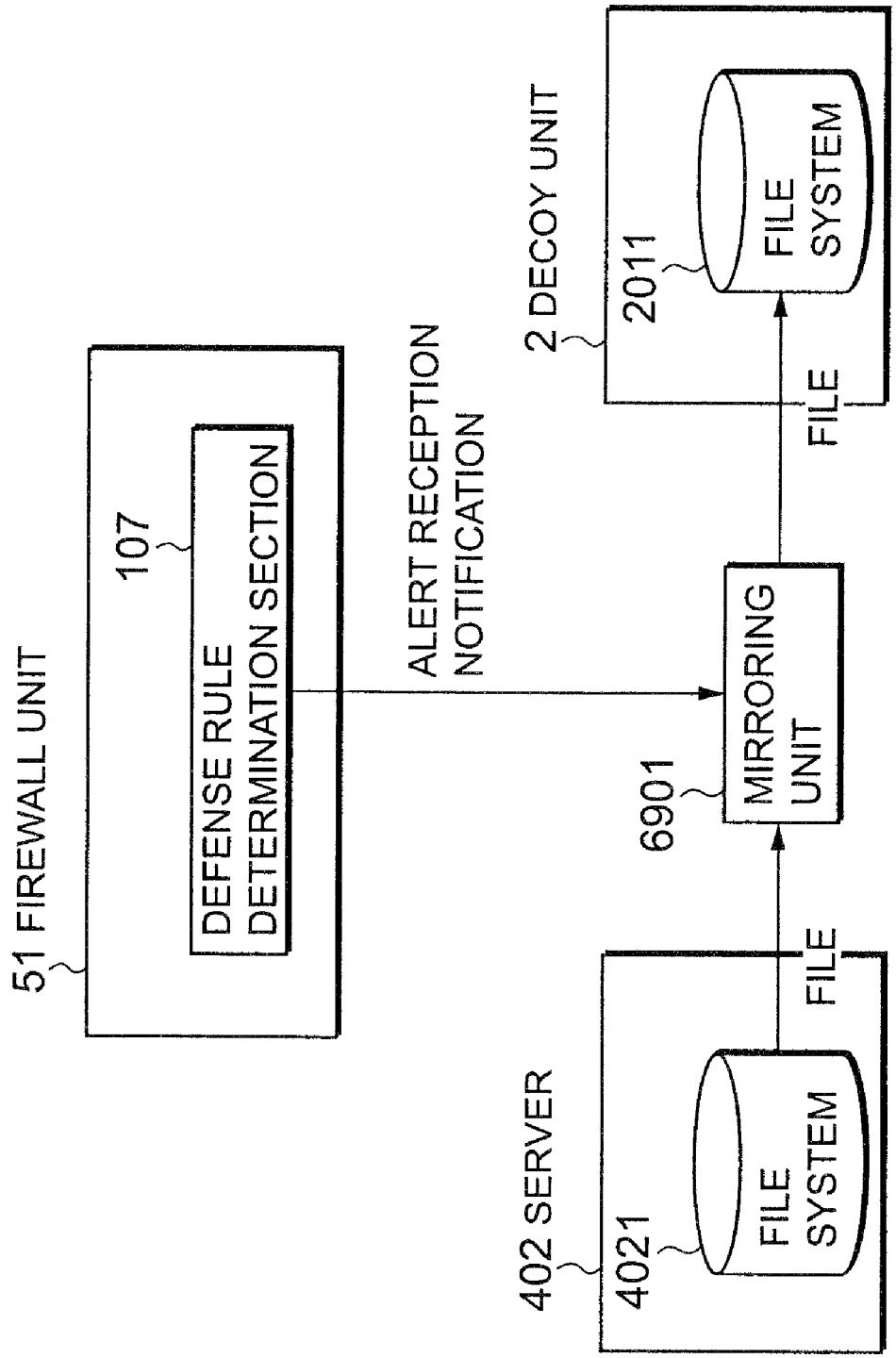
FIG. 58 is a schematic block diagram showing an attack defending system according to a fourteenth embodiment of the invention.

As shown in FIG. 58, an attack defending system according to a fourteenth embodiment of the present invention is further provided with a mirroring unit 6901, which copies the contents of a file system from the server (for example, an FTP server 402) on the internal network 4 to at least the decoy unit 2.

When an attack has been detected by the decoy unit 2 and an alarm has been transmitted to the defense rule determination section 107 of the firewall unit 51, the defense rule determination section 107 further notifies the mirroring unit 6901 of the reception of the alarm.

The mirroring unit 6901, when having received the notice, reads a file system 4021 of the server on the internal network 4 and copies the contents of the file system 4021 to a file system 2011 on the decoy unit 2. Such an arrangement allows real-time recovery of damages that are caused by unauthorized file writing on the decoy unit 2.

The present embodiment has been described taking a file system as a specific example. In addition, the system may be adapted to recover irregularities in a memory by copying the contents of a memory module. Furthermore, the alarm transmitted from the decoy unit 2 may include the path name of the re-written file or memory area. This allows only the damaged portion to be copied.

Fifteenth Embodiment

Figure 59:
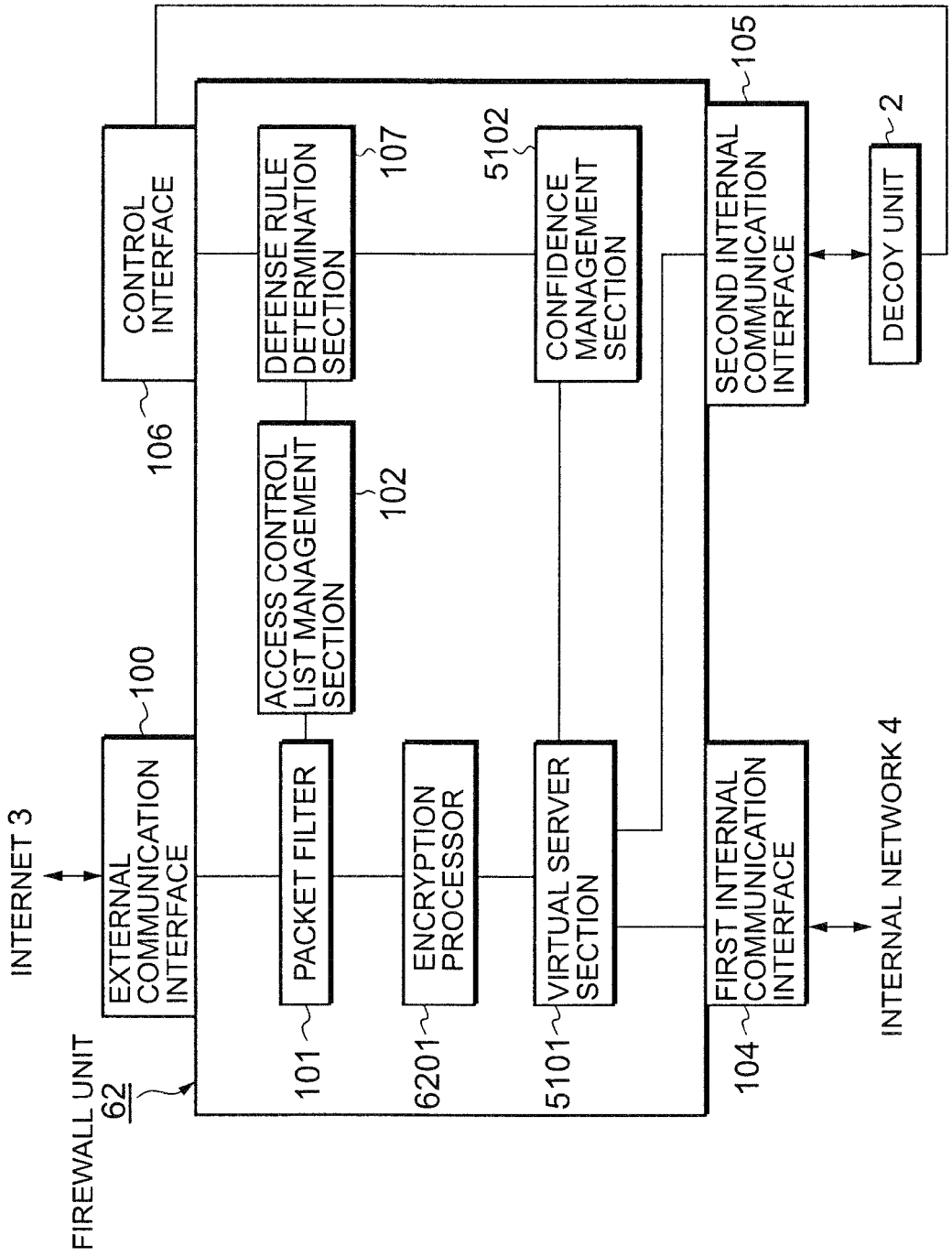
FIG. 59 is a schematic block diagram showing a firewall unit in a fifteenth embodiment of the invention.

FIG. 59 shows a firewall unit in a fifteenth embodiment of the invention. A firewall unit 62 in the embodiment is provided with an encryption processor 6201 placed at the front of the virtual server 5101 of the firewall unit 51 in the thirteenth embodiment.

The encryption processor 6201 decrypts an encrypted input IP packet received from the packet filter 101 to output decrypted input IP packet to the virtual server 5101. In addition, the encryption processor 6201 encrypts an output IP packet received from the virtual server 5101 to output the encrypted output IP packet to the packet filter 101.

In this manner, even when encryption is carried out between the Internet 3 and the internal network 4, input IP packets can be guided to the decoy unit.

Sixteenth Embodiment

In the first to fifteenth embodiments, the firewall unit is structured such that the guiding section (or the virtual server), the defense rule determination section, the packet filter, and the access control list management section are contained in a single unit. However, the invention is not be limited to such a structure.

For example, the firewall unit may be designed in two units in terms of hardware and the two units may be connected to each other through a network. The two units are as follows:
A firewall unit having at least a packet filter and an access control list management section; and
A switch having at least a guiding section (or a virtual server) and a defense rule determination section.

A conventional firewall unit in most cases has a function of remotely updating its access control list. Therefore, by installing the above switch in addition to the firewall unit already installed, the same function as that of the single-unit firewall in the first to the fourteenth embodiments can be advantageously obtained.

Figure 60:
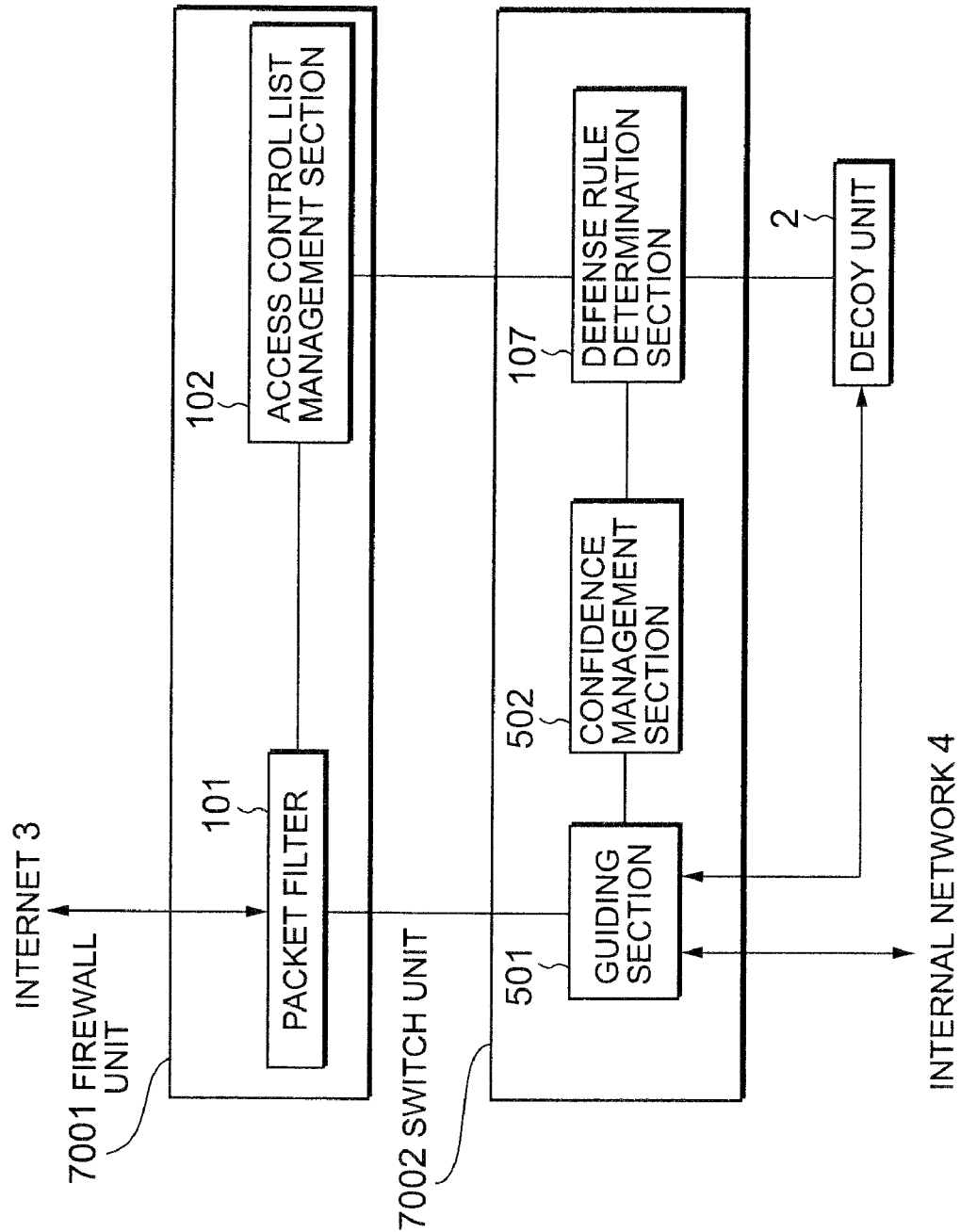
FIG. 60 is a schema-tic diagram showing an attack defending system according to a sixteenth embodiment of the invention.

FIG. 60 shows an attack defending system according to a sixteenth embodiment of the invention. In the embodiment, a firewall unit 7001 is provided with the packet filter 101 and the access control list management section 102, and a switch 7002 is provided with the guiding section 501, the confidence management section 502 and the defense rule determination section 107. The attack defending system according to the first to the fifteenth embodiments can be realized by using a network to connect the packet filter 101 to the guiding section 501, and the access control list management section 102 to the defense rule determination section 107.

Seventeenth Embodiment 17.1) Structure

Figures 61, 62:
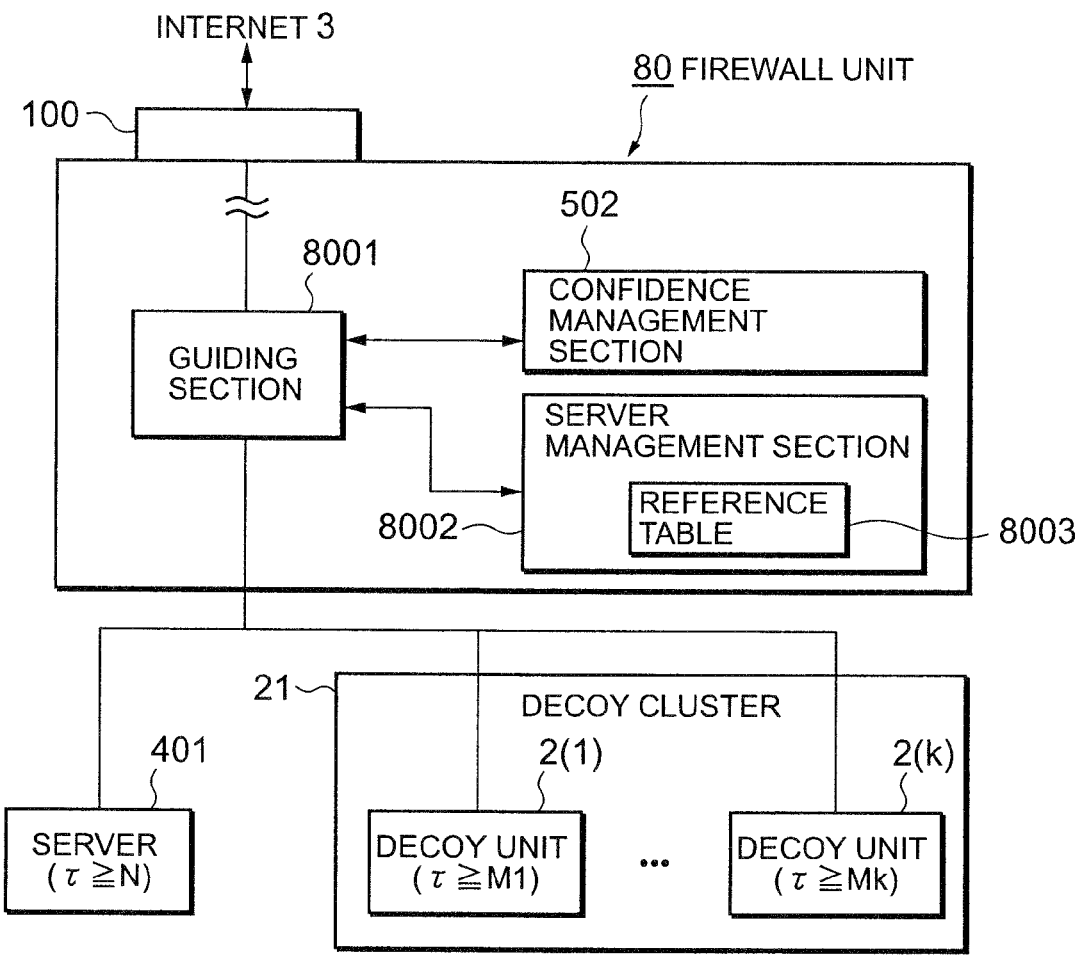
FIG. 61 is a schematic diagram showing an attack defending system according to a seventeenth embodiment of the invention.
FIG. 62 is a schematic diagram showing an example of a reference table 8003 in the server management section 8002.

FIG. 61 shows an attack defending system according to a seventeenth embodiment of the present invention. The attack defending system is provided with a firewall unit 80, a server 401, and a decoy cluster 21 composed of a plurality of decoy units 2(1)-2(k).

The firewall unit 80 is provided with at least a guiding section 8001, a server management section 8002, and a confidence management section 502. The guiding section 8001, as described before, receives the confidence level associated with a newly received access from the confidence management section 502. The guiding section 8001 further transfers the received confidence level to the server management section 8002 and then received an identifier of an appropriate decoy unit 2(i). The guiding section 8001 forwards the received access to either the decoy unit 2(*i*) identified by the identifier or the internal network.

The server management section 8002 has a reference table 8003 provided therein, which contains a correspondence between the respective identifiers of the decoy units 2(1)-2(*k*) and requisite confidence levels. In response to the confidence level inputted from the guiding section 8001, the server management section 8002 selects an appropriate identifier from the reference table 8003 and transmits it back to the guiding section 8001.

As shown in FIG. 62, the reference table 8003 provided in the server management section 8002 contains a correspondence between the respective server identifiers of the decoy units 2(1)-2(*k*) and the requisite confidence levels M1-Mk.

17.2) Operation

Figure 63:
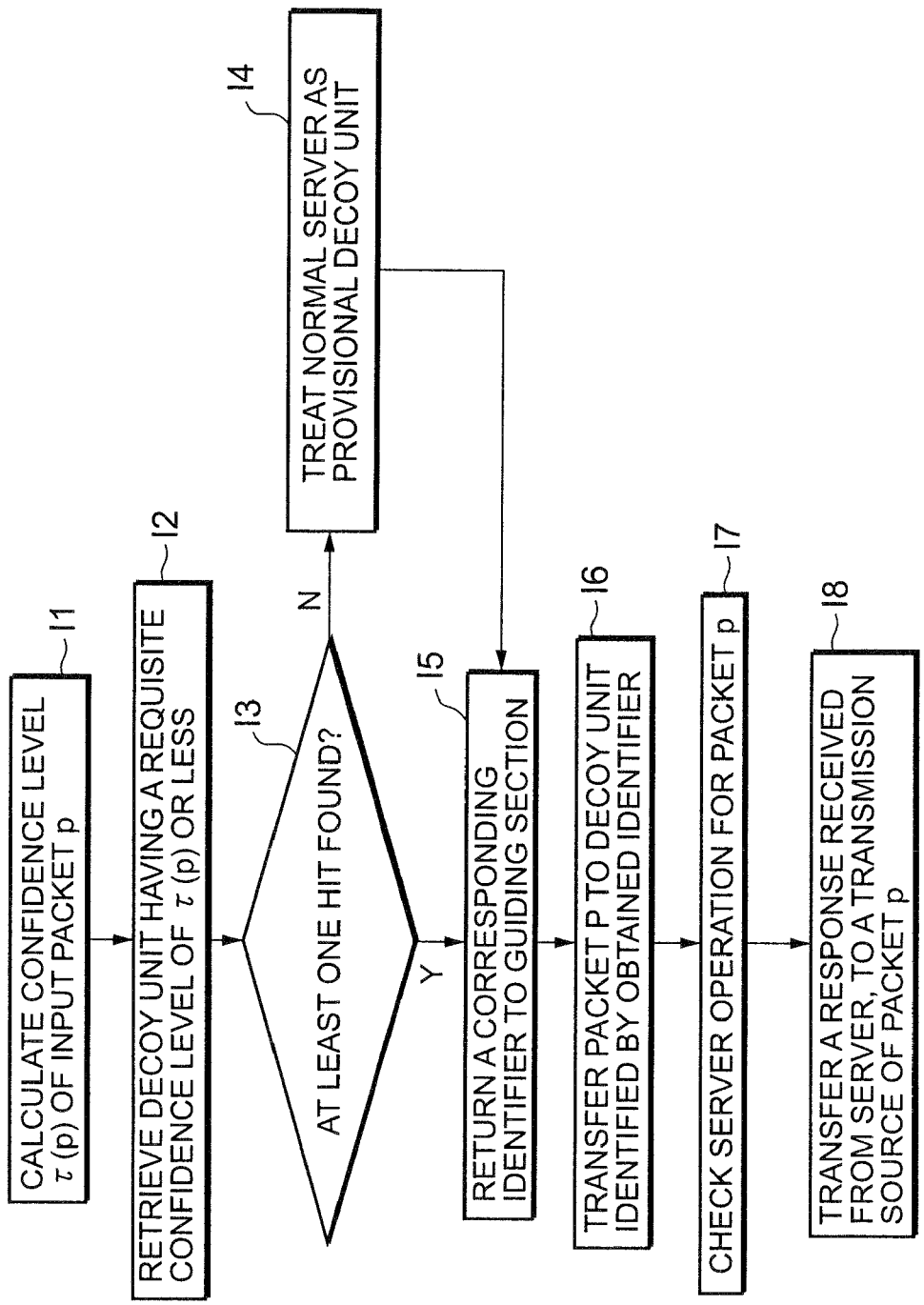
FIG. 63 is a flowchart showing the operation of an attack defending system according to the seventeenth embodiment of the invention.

Referring to FIG. 63, the firewall unit 80 has received a packet p to be forwarded to the server 401, the guiding section 8001 outputs at least the header of the input packet p to the confidence management section 502 and receives a confidence level τ [p] corresponding to the packet p (Step I1).

Thereafter, the guiding section 8001 outputs the confidence level τ [p] to the server management section 8002 and receives at least one identifier. At the server management section 8002, the reference table 8003 is searched for at least one identifier corresponding to a requisite confidence level equal to or smaller than the received confidence level τ [p] (Steps I2 and I3).

When no identifier meeting the condition of a requisite confidence level=<τ [p] is found (N in Step I3), a combination of at least a predetermined identifier and a confidence level, which are assigned to the server 401, is provisionally produced as a search result (Step I4). In this case, the identifiers D1-Dk of all the decoy units on the decoy cluster 21 may be added to the search result. It should be noted that the requisite confidence level N of the server 401 exceeds the maximum of the requisite confidence levels M1-Mk of the reference table 8003: N>max[M1, M2, . . . Mk].

When at least one identifier meeting the condition of a requisite confidence level=<τ [p] is found (Y in Step I3), the found identifier is returned to the guiding section 8001 (Step I5). If two or more identifiers are found, then only one identifier having the maximum requisite confidence level or all of found identifiers may be sent back to the guiding section 8001. the guiding section 8001 forwards the input packet p to either a decoy unit 2 identified by the identifier inputted from the server management section 8002 or the server 401 (Step I6).

When the server 401 has received the packet p, the processing of the packet p is performed according to the server program running on the server 401. On the other hand, when the decoy unit 2 has received the packet p, the server program runs on the processor and its behavior is monitored by the attack detecting section (Step I7).

The server program running on the decoy unit 2 or the server 401, which is the destination of packet transfer, produces a response to the packet p. The response is sent back to the source host of the packet p through the guiding section 8001 (Step I8). In the case where a plurality of decoy units have received the packet p, a plurality of responses each corresponding to the decoy units are produced. In this case, the guiding section forwards only the response received from the decoy unit 2 having the maximum requisite confidence level, to the source of the access in question. However, if the server 401 has received the packet p, then the response received from the server 401 is always selected and sent back to the source host.

As described above, requisite confidence levels are previously assigned to respective ones of the decoy servers. Depending on the previously assigned requisite confidence levels, contents having various importance levels can be distributed among the decoy servers and the regular server. Accordingly, even if some damage has occurred on a decoy server, the magnitude of the damage can be suppressed to an estimated level or less.

Eighteenth Embodiment

The confidence management section employed in the above-described embodiments is designed to adjust the confidence level based on an alert received from the decoy unit 2. The present invention is not limited to these arrangements. The confidence adjustment may be performed using an attack detection notification received from an external general-purpose attack detection system, which allows preventive measures based on attacked cases which occurred on other sites.

18.1) Structure

Figure 64:
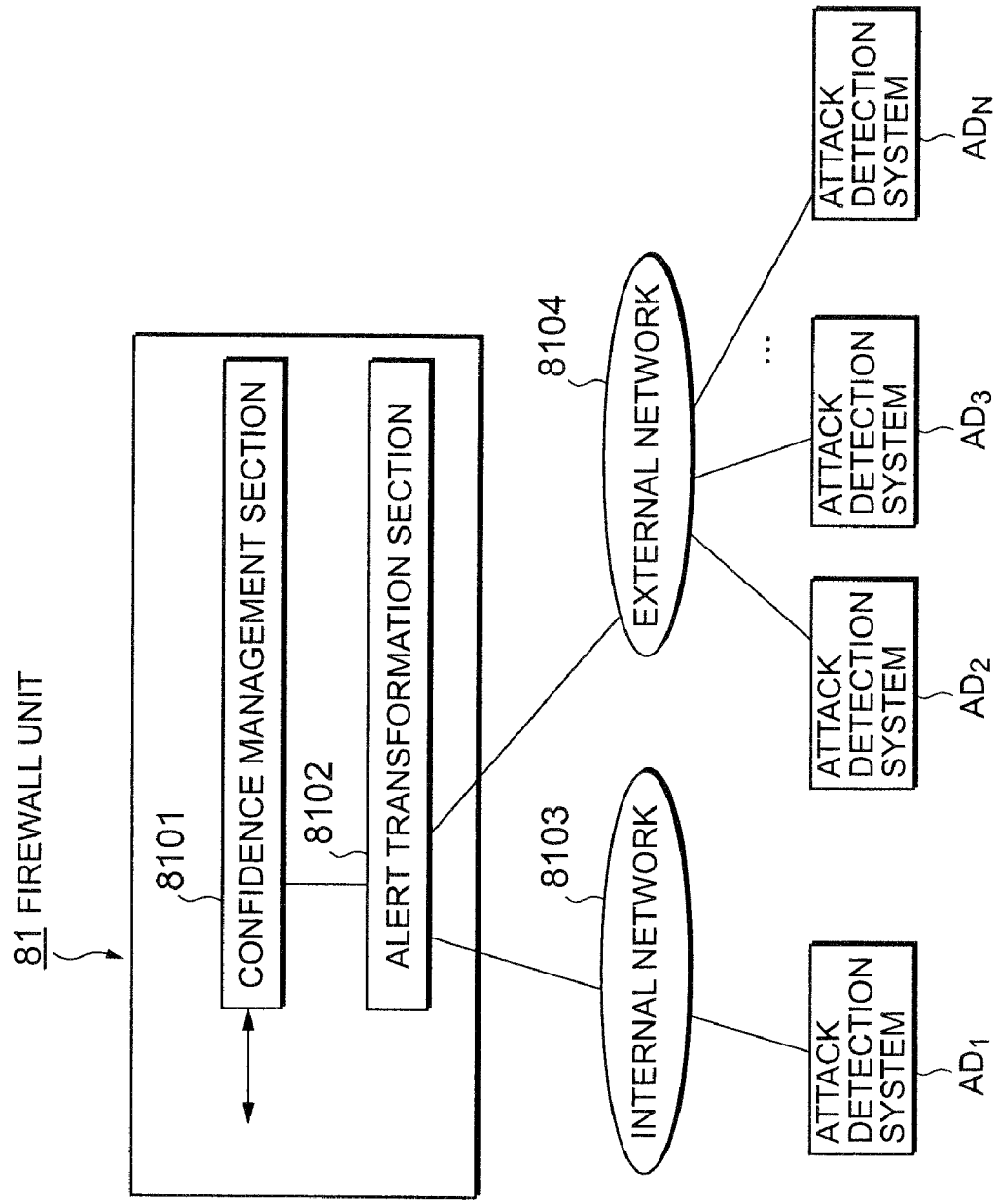
FIG. 64 is a schematic diagram showing an attack defending system according to an eighteenth embodiment of the invention.

Referring to FIG. 64, an attack defending system according to an eighteenth embodiment of the present invention is provided with a firewall unit 81 and one or more attack detecting systems $AD_1$-$AD_N$ on an internal network 8103 and an external network 8104.

The firewall unit 81 has at least a confidence management section 8101 and an alert transformation section 8102 therein. The confidence management section 8101, when having received an alert transformed by the alert transformation section 8102, decreases the confidence level of the subsequent input packet according to the procedure as described before. Each of the attack detecting systems $AD_1$-$AD_N$ transmits an alert having a system-dependent syntax. Therefore, the alert transformation section 8102 is provided with interpretation modules, which interpret alerts received from respective ones of the attack detecting systems.

The alert transformation section 8102 receives system-dependent alerts from the attack detecting systems on the internal network 8103 and the external network 8104 and interpret alert syntaxes to output transformed alerts to the confidence management section 8101.

The attack detecting systems $AD_1$-$AD_N$ monitor network traffic, the operation of a server program, a log file or the like. When an attack is detected, the attack detecting system transmits an alert including at least the IP addresses of attack source and attack destination, to the alert transformation section 8102 of the firewall unit 81.

18.2) Operation

Figure 65:
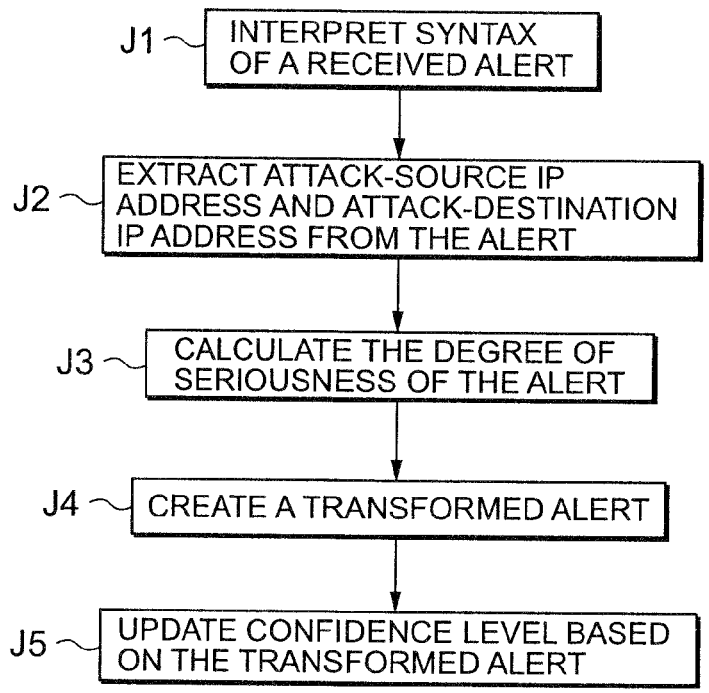
FIG. 65 is a flowchart showing the operation of an attack defending system according to the eighteenth embodiment of the invention.

Referring to FIG. 65, when having received an alert from an attack detecting system on the internal network 8103 and the external network 8104, the alert transformation section 8102 interprets the syntax of the received alert (Step J1). Since the received alert has a system-dependent syntax as described before, an appropriate interpretation module is selected from the interpretation modules each corresponding to the attack detecting systems and the received alert is interpreted by using the selected interpretation module. Selection of interpretation module may be made by identifying the type of an attack detecting system based on the source IP address of the alert. From the interpretation result, at least the source IP address and the destination IP address of the attacking packet are extracted (step J2).

Subsequently, the alert transformation section 8102 calculates the degree of seriousness of the received alert from the interpretation result (Step J3). In the case of an alert issued by an anomaly-type detection system, an anomalous value can be used as the degree of seriousness. In the case of an alert issued by a signature-type detection system, the degree of seriousness may be obtained from an identifier indicating an attack method.

The alert transformation section 8102 creates a set of at least three numerical values: source IP address; destination IP address; and the degree of seriousness, and outputs it as a transformed alert to the confidence management section 8101.

When having received the transformed alert, the confidence management section 8101 performs updating confidence by subtracting the degree of seriousness from the confidence level for the source IP address, the destination IP address, or, if available, attacking data (Step J5).

Nineteenth Embodiment

The above-described firewall unit in the first to eighteenth embodiments has the confidence management section provided therein. The present invention is not limited to this arrangement. The confidence management section can be provided in a separate unit. Such an arrangement allows a small number of confidence management units to control operations of a large number of firewall units, resulting in reduced cost in operations.

19.1) Structure

Figure 66:
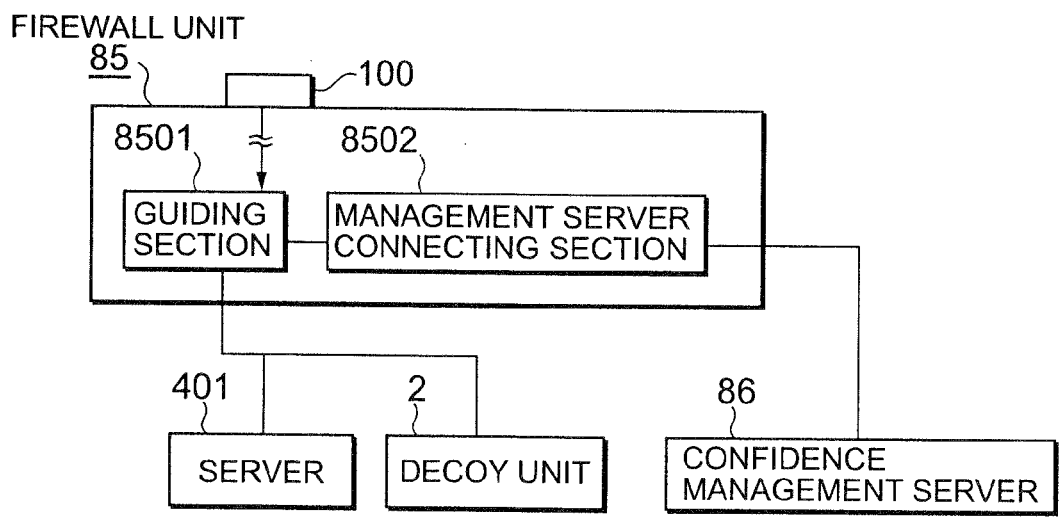
FIG. 66 is a schematic block diagram showing an attack defending system according to a nineteenth embodiment of the invention.

Referring to FIG. 66, an attack defending system according to a nineteenth embodiment of the present invention is provided a firewall unit 85, a confidence management server 86, and at least one decoy unit 2 or attack detecting system. The firewall unit 85 has at least a guiding section 8501 and a management server connecting section 8502. The guiding section 8501 transfers an input IP packet received from the external network to the management server connecting section 8502 and obtains the confidence level, and forwards the input IP packet to either the server 401 or the decoy unit 2 on the internal network.

The management server connecting section 8502 is connected to at least one confidence management server 86 and transmits a confidence request message including the whole or part of an input IP packet received from the guiding section 8501, to the confidence management server 86. When having received a response message including the confidence level from the confidence management server 86, the management server connecting section 8502 returns the confidence level to the guiding section 8501.

When having received the confidence request message from the firewall unit 85, the confidence management server 86 transmits the response message including the confidence level calculated according to a predetermined calculation method back to the firewall unit 85.

19.2) Operation

Referring to FIG. 67, the firewall unit 85 newly receives an input IP packet from the external network and forwards it to the guiding section 8501 (step K1).

When having received the input IP packet from the guiding section 8501, the management server connecting section 8502 creates a confidence request message from the input IP packet and transmits it to the predetermined confidence management server 86 (Step K2). Not only a signal confidence management server 86 but also a plurality of confidence management servers 86 may be provided in the system. The confidence request message may include the whole of the input IP packet or apart such as the header or payload thereof. The information to be included in the confidence request message is determined depending on the confidence calculation method performed in the confidence management server 86. Therefore, in the case where a plurality of confidence management servers 86 are provided, the format of a confidence request message may be determined for each of the confidence management servers.

When having received the confidence request message, the confidence management server 86 extracts the whole or a part of the input IP packet included in the confidence request message (Step K3) and calculates a confidence level $\tau$ [p] for the input IP packet (Step K4). An arbitrary confidence calculation method may be employed such as the operation of the confidence management section as described before as long as a numerical value can be obtained as a confidence level. Alternatively, such a confidence management means may be modularized so as to be dynamically changeable, allowing the provision of so-called "plug-in function" or "update function", which results in enhanced maintainability of the confidence management server.

Subsequently, the confidence management server 86 transmits the response message including the confidence level $\tau$ [p] to the management server connecting section 8502 (Step K5). The response message includes at least a numerical value indicating a confidence level and further may include any other information. The management server connecting section 8502, when having received the response message, extracts the confidence level from the response message and thereafter outputs it to the guiding section 8501 (Step K6).

In the case where response messages are received from a plurality of confidence management servers 86, the management server connecting section 8502 uses a predetermined H function to compile them into a single confidence level and outputs it to the guiding section 8501. An example of H function is a function of returning the smallest one among a plurality of confidence levels, a function of returning the average of the plurality of confidence levels, or the like.

When having received the confidence level, the guiding section 8501 forwards the input IP packet to either the server 401 or the decoy unit 2 depending on a comparison result of the confidence level and a predetermined distribution condition (Step K7).

The invention claimed is:

1. An attack defending system provided at an interface between an internal network and an external network, comprising a decoy device and a firewall device, wherein the firewall device inputs an input IP packet from the external network and forwards it to one of the decoy device and the internal network, wherein
    the firewall device comprises:
    a microprocessor programmed to execute:
    a destination selector for selecting one of the internal network and the decoy device as a destination of the input IP packet based on header information of the input IP packet and a distribution condition; and
    a confidence manager for managing confidence levels for source IP addresses of a plurality of input IP packets,
    wherein the destination selector obtains a confidence level for a source IP address of the input IP packet from the confidence manager and selects a destination of the input IP packet depending on whether the confidence level satisfies the distribution condition,
    the confidence level is calculated based on the header information of the input IP packet and an input history of previous input IP packets.

2. The attack defending system according to claim 1, wherein, when a confidence level for a source IP address is retrieved, the confidence manager updates the confidence level for the source IP address.

3. The attack defending system according to claim 2, wherein the confidence manager updates the confidence level by adding a predetermined value to the confidence level for the source IP address.

4. The attack defending system according to claim 2, wherein the confidence manager updates the confidence level by adding a variable to the confidence level for the source IP address, wherein the variable becomes smaller as a packet size of the input IP packet corresponding to the confidence level becomes larger.

5. The attack defending system according to claim 2, wherein the confidence manager updates the confidence level when the input IP packet is a packet conforming to a predetermined protocol.

6. The attack defending system according to claim 1, wherein the confidence manager comprises:
   a first confidence memory for storing the confidence levels for the source IP addresses of the plurality of input IP packets and latest updated times at which the confidence levels were updated, respectively;
   a second confidence memory for storing a copy of the confidence levels stored in the first confidence memory;
   a first updating processor for updating a confidence level stored in the first confidence memory when the destination selector has obtained the confidence level;
   a copying processor for copying the confidence levels stored in the first confidence memory to the second confidence memory at regular intervals; and
   a second updating processor for searching the second confidence memory for a confidence level corresponding to a latest updated time from which a predetermined time period has elapsed, to update a found confidence level,
   wherein the confidence level is calculated based on the header information of the input IP packet and an input history of previous input IP packets.

7. The attack defending system according to claim 6, wherein the copying processor searches the first confidence memory for a confidence level corresponding to a latest updated time from which a predetermined time period has elapsed and deletes an entry corresponding to a found confidence level from the first confidence memory.

8. The attack defending system according to claim 6, wherein the second updating processor decrease the found confidence level by a predetermined value.

9. The attack defending system according to claim 6, wherein the second updating processor deletes the found confidence level from the second confidence memory.

10. The attack defending system according to claim 1, wherein the decoy device comprises an attack detector for detecting presence or absence of an attack by executing a service process for the input IP packet transferred from the firewall device.

11. The attack defending system according to claim 10, wherein the confidence manager updates a confidence level of a source IP address of the input IP packet transferred to the decoy device depending on whether the attack detector detects an attack based on the input IP packet transferred from the firewall device.

12. The attack defending system according to claim 1, wherein the decoy device comprises:
   an event memory for temporarily storing events related to at least network input/output, file input/output, and process creation/termination; and
   an event manager for analyzing cause-effect relations of the events stored in the event memory to form links among the events.

13. The attack defending system according to claim 1, wherein the decoy device comprises:
   an attack detector for detecting an attack from an execution status of the service process according to a rule having at least one of domain constraint and type constraint added thereto.

14. The attack defending system according to claim 12, wherein the decoy device further comprises:
   an attack detector for detecting an attack from an execution status of the service process according to a rule having at least one of domain constraint and type constraint added thereto.

15. The attack defending system according to claim 14, wherein the attack detector searches the links to extract at least, a generation event of a process generating an event to be inspected and a network reception event by which the event to be inspected is generated, when determination is made based on the domain constraint and the type constraint.

16. The attack defending system according to claim 1, further comprising a mirroring device for copying at least a file system from a server on the internal network to the decoy device, wherein when an attack is detected by the decoy device, the mirroring device copies at least the file system from the server on the internal network to the decoy device.

17. An attack defending method using a decoy device in a firewall device provided at an interface between an internal network and an external network, comprising:
   a microprocessor programmed to execute:
   preparing a filtering condition and a distribution condition for input IP packets;
   holding confidence levels for source IP addresses of a plurality of input IP packets;
   determining whether an input IP packet inputted from the external network is to be accepted, based on header information of the input IP packet and a filtering condition corresponding to the input IP packet;
   selecting one of the internal network and the decoy device as a destination of the input IP packet accepted, based on whether the confidence level satisfies the distribution condition;
   detecting presence or absence of an attack by executing a service process for the input IP packet forwarded to the decoy device; and
   managing the filtering condition corresponding to the input IP packet forwarded to the decoy device depending on whether an attack is detected based on the input IP packet,
   wherein the confidence level is calculated based on the header information of the input IP packet and an input history of previous input IP packets.

18. The attack defending method according to claim 17, wherein the header information of an input IP packet includes at least one of a source IP address and a destination IP address thereof, wherein a destination of the input IP packet is determined depending on whether the header information of the input IP packet satisfies the distribution condition.

19. The attack defending method according to claim 17, wherein the distribution condition is a guiding list containing a set of IP addresses unused in the internal network, wherein the input IP packet is transferred to the decoy device when a destination IP address of the input IP packet matches an unused IP address contained in the guiding list.

20. The attack defending method according to claim 17, wherein the distribution condition is updated depending on whether an attack is detected based on the input IP packet transferred to the decoy device.

21. The attack defending method according to claim 17, wherein the filtering condition managing step comprises:
setting the filtering condition with a limited validity period, corresponding to the header information of the input IP packet forwarded to the decoy device; and
when the limited validity period has elapsed, setting the filtering condition to a default filtering condition.

22. The attack defending method according to claim 17, wherein the filtering condition managing step comprises:
generating a filtering condition corresponding to a combination of an attack category of an attack detected and address information of the input IP packet; and
dynamically updating the filtering condition according to the filtering condition generated.

23. The attack defending method according to claim 17, wherein the attack detecting step comprises:
temporarily storing events related to at least network input/output, file input/output, and process creation/termination; and
analyzing cause-effect relations of the events to form links among the events.

24. The attack defending method according to claim 17, wherein the attack detecting step comprises:
extracting events related to at least network input/output, file input/output, and process creation/termination; and
comparing the extracted events with a rule having domain constraint and type constraint added thereto.

25. The attack defending method according to claim 23, wherein the attack detecting step further comprises:
comparing the events with a rule having domain constraint and type constraint added thereto.

26. The attack defending method according to claim 25, wherein the links are searched to extract at least, a generation event of a process generating an event to be inspected and a network reception event by which the event to be inspected is generated, when determination is made based on the domain constraint and the type constraint.

27. The attack defending method according to claim 24, wherein the rule describes a constraint related to an access source including a network domain and a constrain related to processes processing accesses and its sequence.

28. The attack defending method according to claim 25, wherein the rule describes a constraint related to an access source including a network domain and a constrain related to processes processing accesses and its sequence.

29. An attack defending method using a decoy device in a firewall device provided at an interface between an internal network and an external network, comprising:
preparing a distribution condition of IP packets;
holding confidence levels for source IP addresses of a plurality of input IP packets;
selecting one of the internal network and the decoy device as a destination of the input IP packet depending on whether the confidence level satisfies the distribution condition,
the confidence level is calculated based on the header information of the input IP packet and an input history of previous input IP packets.

30. The attack defending method according to claim 29, wherein the confidence level holding step comprises:
storing the confidence levels for the source IP addresses of the plurality of input IP packets and latest updated times at which the confidence levels were respectively updated, into a real-time confidence database;
updating a confidence level stored in the real-time confidence database each time the confidence level is accessed;
copying the confidence levels stored in the real-time confidence database to a long-term confidence database at regular intervals;
searching the long-term confidence database to find a confidence level corresponding to a latest updated time from which a predetermined time period has elapsed; and
updating a confidence level found.

31. The attack defending method according to claim 29, further comprising:
at the decoy device, detecting presence or absence of an attack by executing a service process for the input IP packet transferred from the firewall device.

32. The attack defending method according to claim 31, further comprising:
updating a confidence level of a source IP address of the input IP packet transferred to the decoy device depending on whether an attack is detected by the decoy device based on the input IP packet transferred from the firewall device.

33. The attack defending method according to claim 31, wherein the attack detecting step comprises:
temporarily storing events related to at least network input/output, file input/output, and process creation/termination; and
analyzing cause-effect relations of the events to form links among the events.

34. The attack defending method according to claim 31, wherein the attack detecting step comprises:
extracting events related to at least network input/output, file input/output, and process creation/termination; and
comparing the extracted events with a rule having domain constraint and type constraint added thereto.

35. The attack defending method according to claim 33, wherein the attack detecting step further comprises:
comparing the events with a rule having domain constraint and type constraint added thereto.

36. The attack defending method according to claim 35, wherein the links are searched to extract at least, a generation event of a process generating an event to be inspected and a network reception event by which the event to be inspected is generated, when determination is made based on the domain constraint and the type constraint.

37. The attack defending method according to claim 34, wherein the rule describes a constraint related to an access source including a network domain and a constrain related to processes processing accesses and its sequence.

38. The attack defending method according to claim 35, wherein the rule describes a constraint related to an access source including a network domain and a constrain related to processes processing accesses and its sequence.

39. A firewall device connected to a decoy device, provided at an interface between an internal network and an external network, wherein the firewall device inputs an input IP packet from the external network and forwards it to one of the decoy device and the internal network, comprising:
a microprocessor programmed to execute:
a destination selector for selecting one of the internal network and the decoy device as a destination of the input IP packet based on header information of the input IP packet and a distribution condition; and
a confidence manager for managing confidence levels for source IP addresses of a plurality of input IP packets,
wherein the destination selector obtains a confidence level for a source IP address of the input IP packet from the confidence manager and selects a destination of the input IP packet depending on whether the confidence level satisfies the distribution condition, the confidence level is calculated based on the header information of the input IP packet and an input history of previous input IP packets.

40. A firewall device connected to a decoy device, provided at an interface between an internal network and an external network, wherein the firewall device inputs an input IP packet from the external network and forwards it to one of the decoy device and the internal network, comprising:
a microprocessor programmed to execute:
a first destination selector;
a second destination selector; and
a confidence manager for managing confidence levels for source IP addresses of a plurality of input IP packets,
wherein the first destination selector selects one of the second destination selector and the decoy device as a destination of the input IP packet based on header information of the input IP packet and a first predetermined condition; and
the second destination selector obtains a confidence level for a source IP address of the input IP packet from the confidence manager and selects a destination of the input IP packet depending on whether the confidence level satisfies a second predetermined condition,
the confidence level is calculated based on the header information of the input IP packet and an input history of previous input IP packets.

41. A firewall device connected to a decoy device, provided at an interface between an internal network and an external network, wherein the firewall device inputs an input IP packet from the external network and forwards it to one of the decoy device and the internal network, comprising:
a microprocessor programmed to execute:
a packet filter for determining whether the input IP packet inputted from the external network is to be accepted, based on header information of the input IP packet and a filtering condition corresponding to the input IP packet;
a destination selector for selecting one of the internal network and the decoy device as a destination of the input IP packet accepted and forwarded by the packet filter, based on the header information of the input IP packet and a distribution condition;
a confidence manager for managing confidence levels for source IP addresses of a plurality of input IP packets; and
a filtering condition manager for managing the filtering condition corresponding to the input IP packet forwarded to the decoy device depending on whether the attack detector detects an attack based on the input IP packet,
wherein the destination selector obtains a confidence level for a source IP address of the input IP packet from the confidence manager and selects a destination of the input IP packet depending on whether the confidence level satisfies the distribution condition,
the confidence level is calculated based on the header information of the input IP packet and an input history of previous input IP packets.

42. A program for implementing an attack defending system on a computer, the attack defending system including a decoy device and a firewall device, which are provided at an interface between an internal network and an external network, the program comprising:
a microprocessor programmed to execute:
preparing a set of filtering conditions and a distribution condition of IP packets;
holding confidence levels for source IP addresses of a plurality of input IP packets;
determining whether an input IP packet inputted from the external network is to be accepted, based on header information of the input IP packet and a filtering condition corresponding to the input IP packet;
selecting one of the internal network and the decoy device as a destination of the input IP packet accepted, based on whether the confidence level satisfies the distribution condition;
detecting presence or absence of an attack by executing a service process for the input IP packet forwarded to the decoy device; and
managing the filtering condition corresponding to the input IP packet forwarded to the decoy device depending on whether an attack is detected based on the input IP packet,
wherein the confidence level is calculated based on the header information of the input IP packet and an input history of previous input IP packets.

43. A program for implementing an attack defending system on a computer, the attack defending system including a decoy device and a firewall device, which are provided at an interface between an internal network and an external network, the program comprising:
a microprocessor programmed to execute:
preparing a distribution condition of IP packets;
holding confidence levels for source IP addresses of a plurality of input IP packets;
selecting one of the internal network and the decoy device as a destination of the input IP packet depending on whether the confidence level satisfies the distribution condition,
wherein the confidence level is calculated based on the header information of the input IP packet and an input history of previous input IP packets.

44. A program for implementing a firewall device on a computer, wherein the firewall is connected to a decoy device and is provided at an interface between an internal network and an external network, the program comprising:
a microprocessor programmed to execute:
preparing a set of filtering conditions and a distribution condition of IP packets;
holding confidence levels for source IP addresses of a plurality of input IP packets;
determining whether an input IP packet inputted from the external network is to be accepted, based on header information of the input IP packet and a filtering condition corresponding to the input IP packet;
selecting one of the internal network and the decoy device as a destination of the input IP packet accepted, based on whether the confidence level satisfies the distribution condition;
instructing the decoy device to detect presence or absence of an attack by executing a service process for the input IP packet forwarded to the decoy device; and
managing the filtering condition corresponding to the input IP packet forwarded to the decoy device depending on whether an attack is detected based on the input IP packet,
wherein the confidence level is calculated based on the header information of the input IP packet and an input history of previous input IP packets.

45. An attack defending system provided at an interface between an internal network and an external network, comprising a decoy device and a firewall device, wherein the firewall device inputs an input IP packet from the external network and forwards it to one of the decoy device and the internal network, wherein the firewall device comprises:
- a microprocessor programmed to execute:
  - a destination selector for selecting one of the internal network and the decoy device as a destination of the input IP packet, based on request data included in the input IP packet and a distribution condition; and
  - a confidence manager for managing a confidence level of request data,
  - wherein the destination selector obtains a confidence level of the request data included in the input IP packet from the confidence manager and determines a destination of the input IP packet depending on whether the obtained confidence level of the request data included in the input IP packet satisfies the distribution condition,
  - the confidence level is calculated based on the header information of the input IP packet and an input history of previous input IP packets.

46. The attack defending system according to claim 45, wherein the destination selector selects both of the internal network and the decoy device as a destination of the input IP packet when the obtained confidence level of the request data included in the input IP packet is not smaller than a predetermined threshold.

47. The attack defending system according to claim 45, wherein the destination selector comprises an input buffer for temporarily storing the input IP packet when the obtained confidence level of the request data included in the input IP packet is smaller than a predetermined threshold,
wherein, when the decoy device verifies that the request data included in the input IP packet is safe, the destination selector automatically transfers the input IP packet from the input buffer to the internal network.

48. The attack defending system according to claim 46, wherein the destination selector comprises an input buffer for temporarily storing the input IP packet when the obtained confidence level of the request data included in the input IP packet is smaller than the predetermined threshold,
wherein, when the decoy device verifies that the request data included in the input IP packet is safe, the destination selector automatically retransfers the input IP packet from the input buffer to the internal network.

49. The attack defending system according to claim 45, wherein the decoy device comprises:
- an event memory for temporarily storing events related to at least network input/output, file input/output, and process creation/termination while executing a server process; and
- an event manager for analyzing cause-effect relations of the events stored in the event memory to form links among the events.

50. The attack defending system according to claim 45, wherein the decoy device comprises:
- an attack detector for detecting an attack from an execution status of a service process according to a rule having at least one of domain constraint and type constraint added thereto.

51. The attack defending system according to claim 49, wherein the decoy device further comprises:
- an attack detector for detecting an attack from an execution status of a service process according to a rule having at least one of domain constraint and type constraint added thereto.

52. The attack defending system according to claim 51, wherein the attack detector searches the links to extract at least, a generation event of a process generating an event to be inspected and a network reception event by which the event to be inspected is generated, when determination is made based on the domain constraint and the type constraint.

53. The attack defending system according to claim 45, wherein the firewall device further comprises:
- an encryption processor for decrypting an encrypted input IP packet and encrypting an output IP packet.

54. The attack defending system according to claim 45, further comprising a mirroring device for copying at least a file system from a server on the internal network to the decoy device, wherein when an attack is detected by the decoy device, the mirroring device copies at least the file system from the server on the internal network to the decoy device.

55. An attack defending method using a decoy device in a firewall device provided at an interface between an internal network and an external network, comprising:
- preparing a set of filtering conditions and a distribution condition of IP packets;
- holding confidence levels for source IP addresses of a plurality of input IP packets;
- determining whether an input IP packet inputted from the external network is to be accepted, based on header information of the input IP packet and a filtering condition corresponding to the input IP packet;
- selecting one of the internal network and the decoy device as a destination of the input IP packet accepted, based on whether the confidence level satisfies the distribution condition;
- detecting presence or absence of an attack by executing a service process for the input IP packet forwarded to the decoy device; and
- managing the filtering condition corresponding to the input IP packet forwarded to the decoy device depending on whether an attack is detected based on the input IP packet,
- wherein the confidence level is calculated based on the header information of the input IP packet and an input history of previous input IP packets.

56. A non-transitory computer readable recording medium with a computer program recorded thereon for implementing an attack detecting system on a computer, wherein the attack detecting system uses a decoy device and a firewall device provided at an interface between an internal network and an external network, the computer program executed by the computer comprising:
- preparing a set of filtering conditions and a distribution condition of IP packets;
- holding confidence levels for source IP addresses of a plurality of input IP packets;
- determining whether an input IP packet inputted from the external network is to be accepted, based on header information of the input IP packet and a filtering condition corresponding to the input IP packet;
- selecting one of the internal network and the decoy device as a destination of the input IP packet accepted, based on whether the confidence level satisfies the distribution condition;
- detecting presence or absence of an attack by executing a service process for the input IP packet forwarded to the decoy device; and
- managing the filtering condition corresponding to the input IP packet forwarded to the decoy device depending on whether an attack is detected based on the input IP packet,
- wherein the confidence level is calculated based on the header information of the input IP packet and an input history of previous input IP packets.

57. The non-transitory computer readable recording medium according to claim 56, wherein the distribution condition is a confidence management table containing a plurality of entries, each of which comprises a combination of request data and its confidence level, wherein the attack defending method further comprises:

when an entry matching the request data included in the input IP packet is found in the confidence management table, extracting a confidence level from the entry; and when no entry matching the request data included in the input IP packet is found in the confidence management table, creating a new entry comprised of a combination of the request data and an initial confidence level in the confidence management table, the confidence level is calculated based on the header information of the input IP packet and an input history of previous input IP packets.

58. The non-transitory computer readable recording medium according to claim 57, wherein, in the destination selecting step, when the confidence level extracted from the confidence management table is not smaller than a predetermined threshold, both of the internal network and the decoy device are selected as a destination of the input IP packet.

59. The non-transitory computer readable recording medium according to claim 57, wherein, in the destination selecting step, when the confidence level extracted from the confidence management table is not smaller than a predetermined threshold, the input IP packet is temporarily stored and, if no attack is detected, then the input IP packet is automatically transferred to the internal network.

60. An attack defending system provided at an interface between an internal network and an external network, comprising:

a firewall device comprising a programmed microprocessor;

a decoy device comprising a programmed microprocessor; and at least one confidence management server comprising a programmed microprocessor, wherein the firewall device transmits a request message including at least a part of data of an input IP packet, to the at least one confidence management server, and the at least one confidence management server generates a confidence level for the input IP packet from data included in the request message in response to the request message, and transmits a response message including at least the confidence level back to the firewall device, the confidence level is calculated based on the header information of the input IP packet and an input history of previous input IP packets, the firewall device uses a destination selector for selecting one of the internal network and the decoy device as a destination of the input IP packet based on header information of the input IP packet and a distribution condition.

61. The attack defending system according to claim 60, wherein the firewall device comprises:

a destination selector for selecting one of the internal network and the decoy device as a destination of the input IP packet, based on header information of the input IP packet and a distribution condition; and a management server connection section for transmitting the request message to the at least one confidence management server and obtaining the confidence level for the input IP packet as a response to the request message, wherein the destination selector selects a destination of the input IP packet depending on whether the confidence level for the input IP packet satisfies the distribution condition.

62. A non-transitory computer readable recording medium with a computer program recorded thereon for implementing an attack detecting system on a computer, wherein the attack detecting system is provided at an interface between an internal network and an external network, the computer program executed by the computer comprising:

assigning at least one requisite confidence level to each of a plurality of decoy devices, which correspond to a server on the internal network;

holding a distribution condition used to distribute an IP packet based on the at least one requisite confidence level and confidence levels for a plurality of IP packets;

when an IP packet is inputted, obtaining a confidence level of the input IP packet; and determining a decoy device having a requisite confidence level, which is not greater than the obtained confidence level, as a destination of the input IP packet, the confidence level is calculated based on the header information of the input IP packet and an input history of previous input IP packets.

63. An attack defending method in an attack defending system provided at an interface between an internal network and an external network, wherein the attack defending system comprises a firewall device, a decoy device, and at least one confidence management server, wherein the firewall device transmits a request message including at least a part of data of an input IP packet, to the at least one confidence management server, and the at least one confidence management server generates a confidence level for the input IP packet from data included in the request message in response to the request message, and transmits a response message including at least the confidence level back to the firewall device, the confidence level is calculated based on the header information of the input IP packet and an input history of previous input IP packets, the firewall device uses a destination selector for selecting one of the internal network and the decoy device as a destination of the input IP packet based on header information of the input IP packet and a distribution condition.

64. The attack defending method according to claim 63, wherein the destination selector selects a destination of the input IP packet depending on whether the confidence level for the input IP packet satisfies the distribution condition.

65. A non-transitory computer readable recording medium with a computer program recorded thereon for implementing an attack detecting system on a computer, wherein the attack detecting system is provided at an interface between an internal network and an external network, wherein the attack defending system comprises a firewall device, a decoy device, and at least one confidence management server, the computer program executed by the computer, comprising:

receiving a request message from the firewall device, wherein the request message includes at least a part of data of an input IP packet;

generates a confidence level for the input IP packet from data included in the request message in response to the request message; and transmitting a response message including at least the confidence level back to the firewall device, the confidence level is calculated based on the header information of the input IP packet and an input history of previous input IP packets, the firewall device using selecting one of the internal network and the decoy device as a destination of the input IP packet based on header information of the input IP packet and a distribution condition.

66. A non-transitory computer readable recording medium with a computer program recorded thereon for implementing an attack detecting system on a computer, wherein the attack detecting system is provided at an interface between an internal network and an external network, wherein the attack defending system comprises at least a decoy device, a firewall device and a confidence management server, the computer program executed by the computer comprising:

transmitting a request message from the firewall device to the confidence management server, wherein the request message includes at least a part of data of an input IP packet;

receiving a response message from the confidence management server, the response message including at least a confidence level of the input IP packet calculated from data included in the request message; and selecting one of the internal network and the decoy device as a destination of the input IP packet depending on whether the confidence level of the input IP packet satisfies a predetermined distribution condition, the confidence level is calculated based on the header information of the input IP packet and an input history of previous input IP packets.

* * * * *